United States Patent
Bowman et al.

(10) Patent No.: US 10,002,146 B1
(45) Date of Patent: *Jun. 19, 2018

(54) DISTRIBUTED DATA SET INDEXING

(71) Applicant: SAS Institute Inc., Cary, NC (US)

(72) Inventors: Brian Payton Bowman, Apex, NC (US); Gordon Lyle Keener, Raleigh, NC (US); Steven E. Krueger, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/838,175

(22) Filed: Dec. 11, 2017

Related U.S. Application Data

(63) Continuation of application No. 15/838,110, filed on Dec. 11, 2017.

(60) Provisional application No. 62/458,162, filed on Feb. 13, 2017.

(51) Int. Cl.
 G06F 17/30 (2006.01)
 G06F 7/20 (2006.01)
 G06F 9/50 (2006.01)
 G06F 7/02 (2006.01)

(52) U.S. Cl.
 CPC ......... *G06F 17/30321* (2013.01); *G06F 7/02* (2013.01); *G06F 7/20* (2013.01); *G06F 9/5027* (2013.01); *G06F 17/30289* (2013.01); *G06F 17/30424* (2013.01); *G06F 17/30575* (2013.01); *G06F 17/30725* (2013.01)

(58) Field of Classification Search
 USPC ........ 707/613, 687, 705, 790, 813, 821, 964
 See application file for complete search history.

(56) References Cited

U.S. PATENT DOCUMENTS

| | | |
|---|---|---|
| 5,960,194 A | 9/1999 | Choy et al. |
| 6,185,552 B1 | 2/2001 | DeLong et al. |
| 6,687,688 B1 | 2/2004 | Fujihara et al. |
| 6,978,265 B2 | 12/2005 | Schumacher |
| 7,685,109 B1 | 3/2010 | Ransil et al. |
| 9,323,767 B2 | 4/2016 | Blanchflower et al. |
| 9,736,147 B1 * | 8/2017 | Mead ................... H04L 63/083 |

(Continued)

OTHER PUBLICATIONS

Palamuttam et al., "SciSpark: Applying In-memory Distributed Computing to Weather Event Detection and Tracking", 2015 IEEE International Conference on Big Data (Big Data), 2015, 7 pages.

(Continued)

*Primary Examiner* — Sana A Al-Hashemi

(57) ABSTRACT

An apparatus including a processor to receive search criteria including a data value for a search within a data field; in response to the receipt of the query instructions, and for each data cell within a super cell, perform the specified search by comparing the data value to ranges of values indicated in a corresponding cell index to determine whether the data cell includes a data record meeting the search criteria, and in response to a determination that the data cell includes such a data record, use a unique values index in the cell index to search the data records of the data cell to identify one or more data records meeting the search criteria; and in response to identifying at least one data record meeting the search criteria, provide an indication that at least the data cell includes at least one data record meeting the search criteria.

30 Claims, 47 Drawing Sheets

(56) References Cited

U.S. PATENT DOCUMENTS

| | | | |
|---|---|---|---|
| 2008/0082490 A1 | 4/2008 | MacLaurin et al. | |
| 2008/0243781 A1 | 10/2008 | Kuhr et al. | |
| 2010/0005151 A1 | 1/2010 | Gokhale | |
| 2010/0114970 A1 | 5/2010 | Marin | |
| 2010/0161614 A1 | 6/2010 | Choi et al. | |
| 2012/0254111 A1 | 10/2012 | Carmichael | |
| 2013/0130686 A1* | 5/2013 | Ikeda | H04W 48/16 455/435.1 |
| 2013/0151535 A1 | 6/2013 | Dusberger et al. | |
| 2013/0198226 A1 | 8/2013 | Dhuse et al. | |
| 2013/0232153 A1 | 9/2013 | Dhuse et al. | |
| 2013/0263289 A1 | 10/2013 | Vijayan et al. | |
| 2013/0304746 A1 | 11/2013 | Dhuse et al. | |
| 2013/0332484 A1 | 12/2013 | Gajic | |
| 2014/0095505 A1 | 4/2014 | Blanchflower et al. | |
| 2015/0126181 A1* | 5/2015 | Breuer | H04K 3/222 455/423 |
| 2015/0154269 A1* | 6/2015 | Miller | G06F 17/30554 715/780 |
| 2017/0322977 A1* | 11/2017 | Naganuma | G06F 17/30483 |

OTHER PUBLICATIONS

"Apache Solr Reference Guide Covering Apache Solr 6.4", Solr, (2013), 763 pages (author unknown).

"Sas® 9.4 SPD Engine: Storing Data in the Hadoop Distributed File System", SAS Institute, Fourth Edition, (2016), 76 pages (author unknown).

Basavaraju et al., "Clustered Distributed Index for Efficient Text Retrieval Using Threads", International Journal of Grid Computing & Applications (IJGCA) vol. 1, No. 2, Dec. 2010, 13 pages.

Lu et al., "Panaché: A Scalable Distributed Index for Keyword Search", (2003), 10 pages.

"Apache Spark support | Elasticsearch for Apache Hadoop [5.2] | Elastic", retrieved Feb. 13, 2017 from <https://www.elastic.co/guide/en/elasticsearch/hadoop/current/spark.html>, 55 pages (author unknown).

"Onix Text Retrieval Toolkit API Reference—Distributed Indexing", retrieved Feb. 13, 2017 at <http://www.lextek.com/manuals/onix/distributedindexing.html>, 2 pages (author unknown).

"High Availability and Scalability Through Distributed Indices", IBM Knowledge Center, retrieved Feb. 13, 2017 from <https://www.ibm.com/support/knowledgecenter/SS8NLW_9.0.0/com.ibm.swg.im.infosphere.dataexpl.engine.tut.di.doc/c_distindexmainintro.html>, 2 pages (author unknown).

Callaghan, Patrick, "New Index Tables with Apache Spark in DataStax Enterprise", DataStax Academy, retrieved Feb. 13, 2017 at <https://academy.datastax.com/resources/datastaxenterprisenewindextablesapachespark>, 2 pages.

Smith, Scott, "Distributed Index Overview", Redstone Content Solutions, retrieved at <http://www.redstonecontentsolutions.com/distributedindexoverview.html>, 2016, 3 pages.

"Distributed indexing", retrieved Feb. 13, 2017 from <http://nlp.stanford.edu/IRbook/html/htmledition/distributedindexing1.html>, 3 pages (author unknown).

"Parallel preprocessing and distributed indexing", IBM Knowledge Center, retrieved Feb. 13, 2017 at <https://www.ibm.com/support/knowledgecenter/SSZLC2_7.0.0/com.ibm.commerce.developer.doc/concepts/csdsearchparallel.htm>, 3 pages (author unknown).

"Distributed computing: index building and use", 2010, 3 pages, (author unknown).

Cihan B., "Indexing Big Data: Global vs. Local Indexes in Distributed Databases", Database Zone, retrieved from <https://dzone.com/articles/fasterindexingandqueryglobalvslocalindexing>, May 16, 2016, 3 pages.

"Teradata Database Indexes", Teradata, retrieved Feb. 13, 2017 from <http://www.info.teradata.com/htmlpubs/DB_TTU_14_00/index.html#page/Database_Management/B035_1094_111A/ch08.049.009.html#ww593281>, 3 pages (author unknown).

"Teradata Database Indexes: The Basics", Teradata, retrieved Feb. 13, 2017 from <http://www.info.teradata.com/htmlpubs/DB_TTU_14_00/index.html#pages/Database_Management/B035_1094_111A/ch08.049.001.html>, (1998-2013), 3 pages (author unknown).

"Teradata Wiki: Primary Index", retrieved Feb. 13, 2017 from <http://www.teradatawiki.net/2013/08/TeradataPrimaryIndex.html>, 5 pages (author unknown).

"Teradata Wiki: Secondary Index", retrieved Feb. 13, 2017 from <http://www.teradatawiki.net/2013/08/TeradataSecondaryIndexes.html>, 3 pages, (author unknown).

"Why Spark SQL considers the support of indexes unimportant?", Stack Overflow, retrieved Feb. 13, 2017 from <http://stackoverflow.com/questions/36938976/whysparksqlconsidersthesupportofindexesunimportant>, 3 pages (author unknown).

"Managing Indexers and Clusters of Indexers", Splunk Enterprise, retrieve Feb. 13, 2017 from <http://docs.splunk.com/Documentation/Splunk/6.5.2/Indexer/Advancedindexingstrategy>, (2005-2017), 5 pages, (author unknown).

"Data Types RDD-based API", Spark 2.1.0 Documentation, retrieved Feb. 13, 2017 from <https://spark.apache.org/docs/latest/mllibdatatypes.html#indexedrowmatrix>, 7 pages, (author unknown).

* cited by examiner

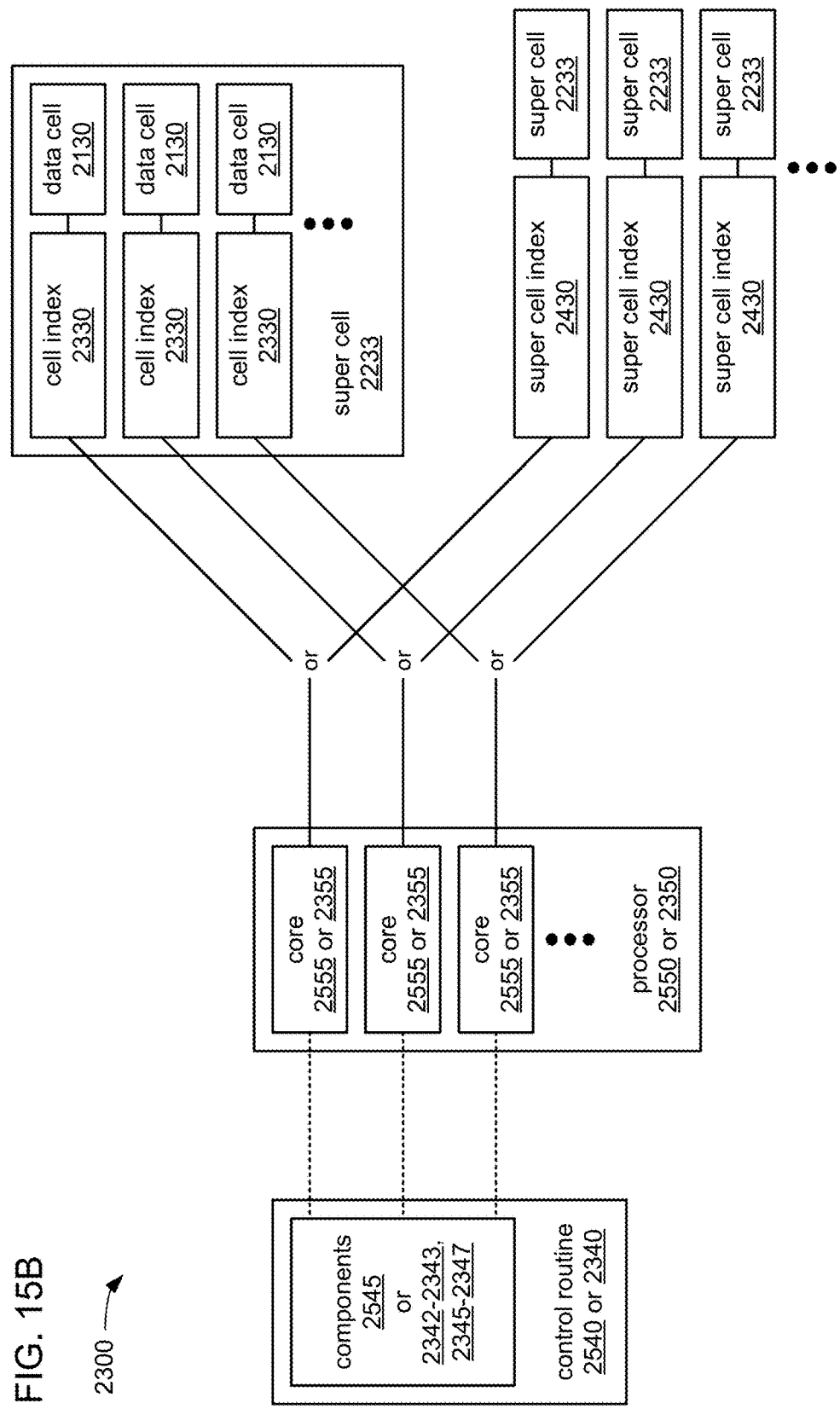

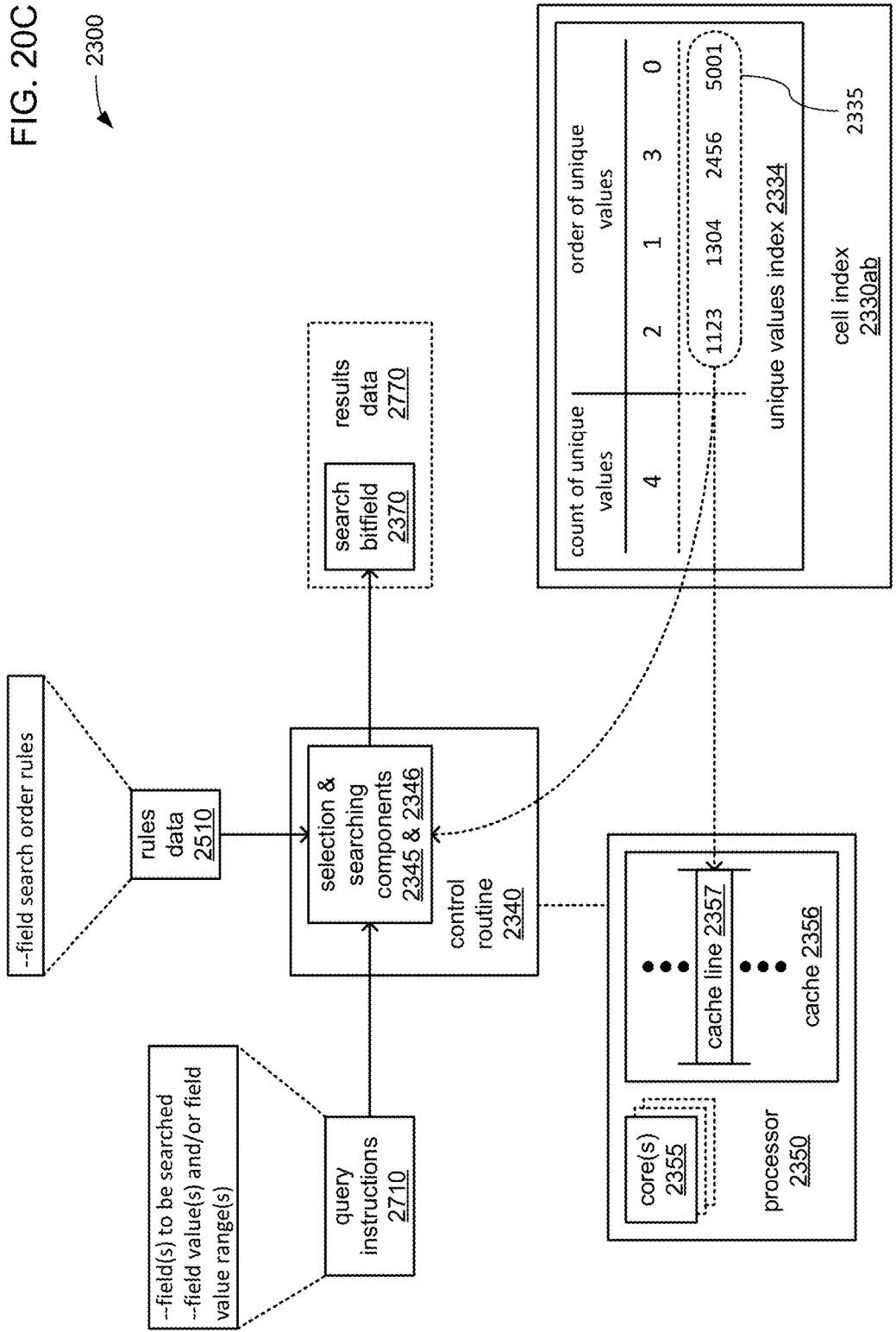

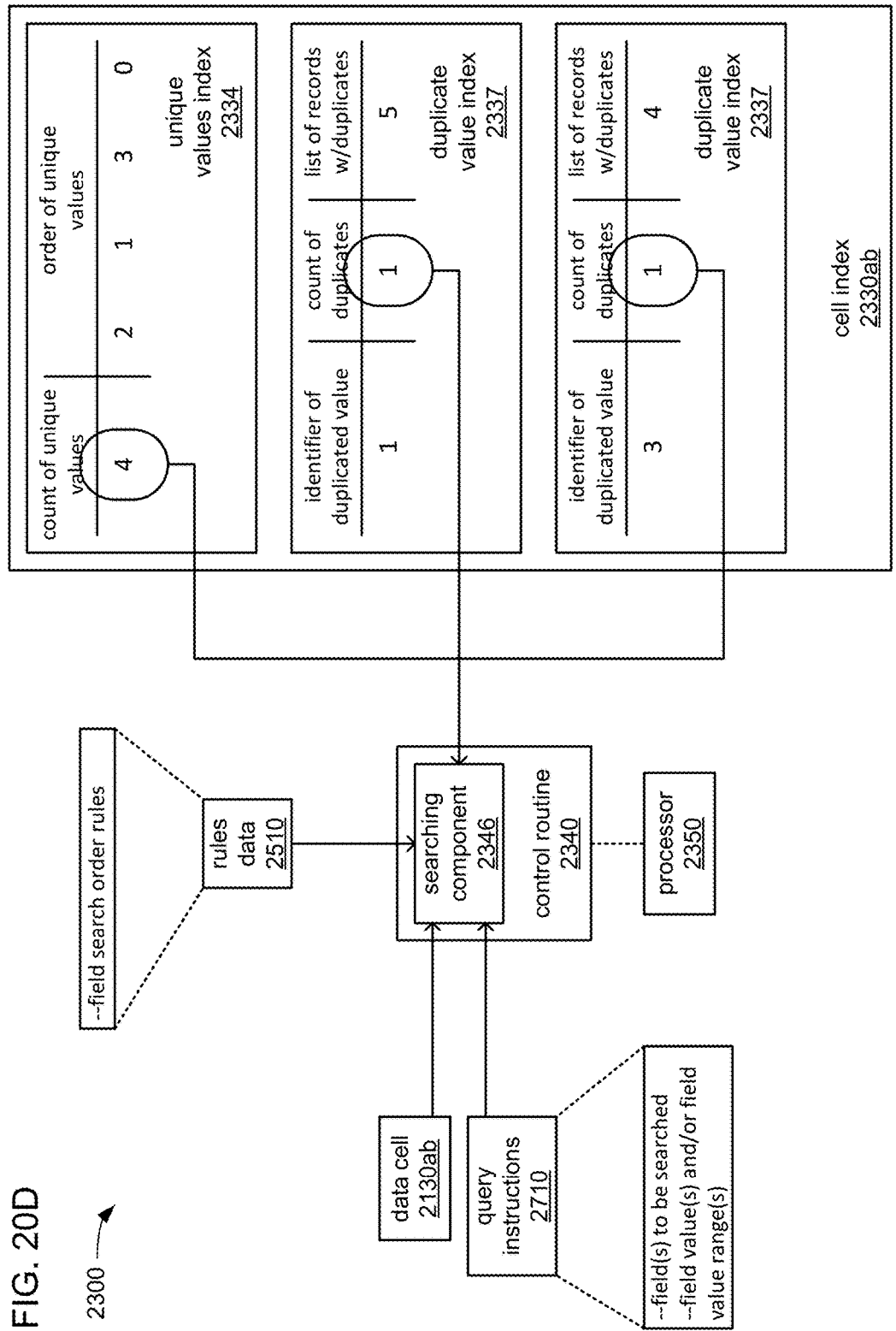

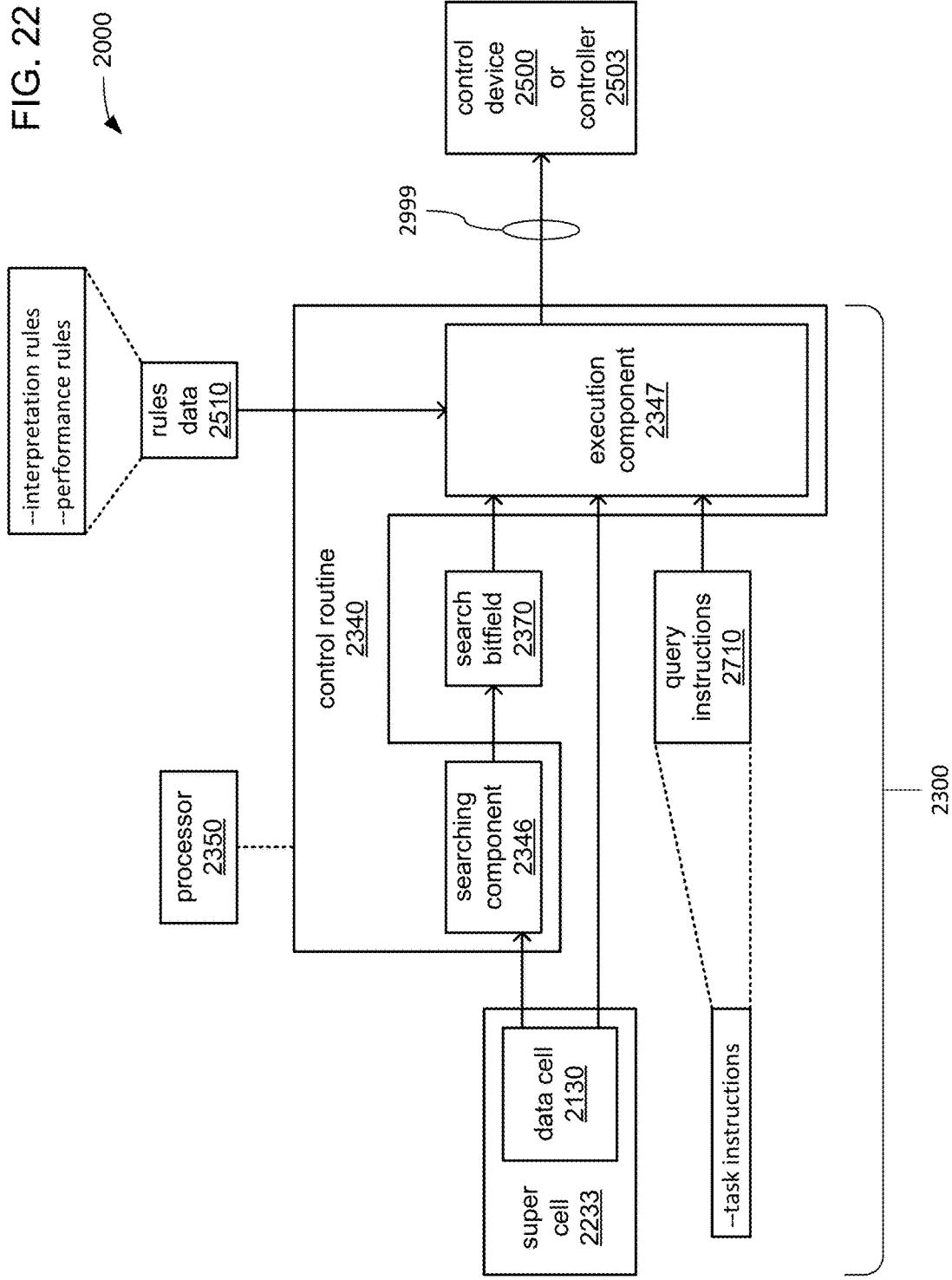

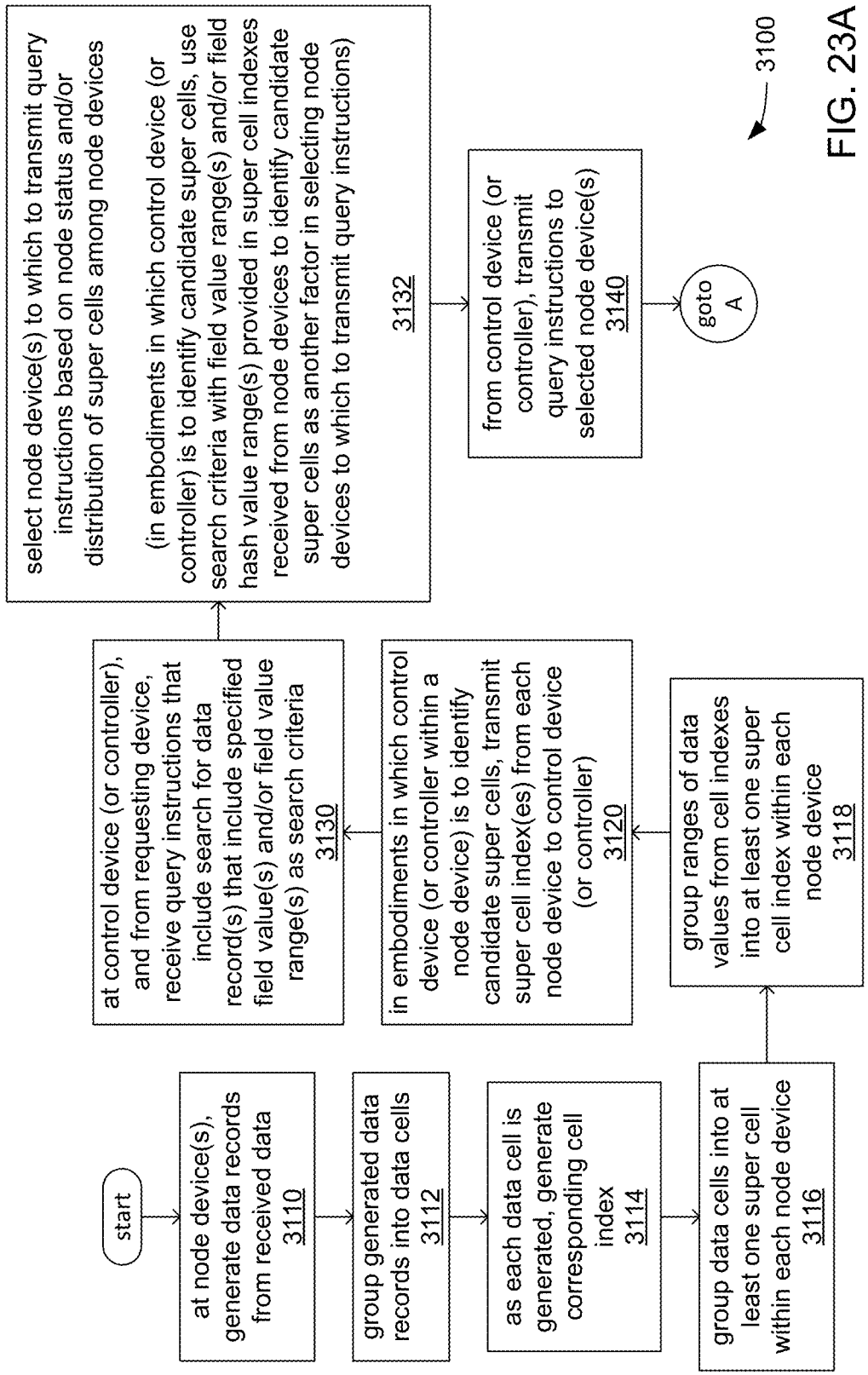

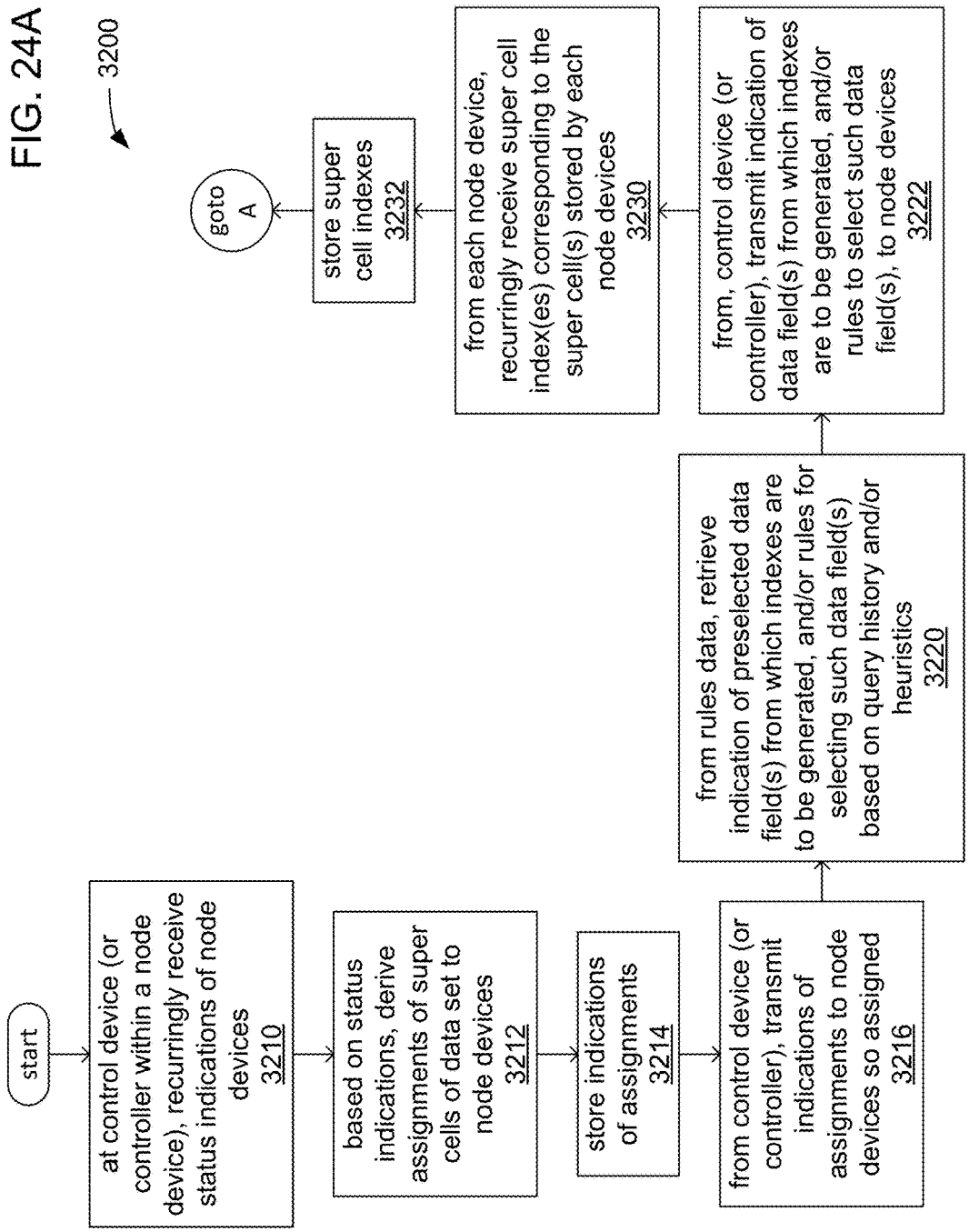

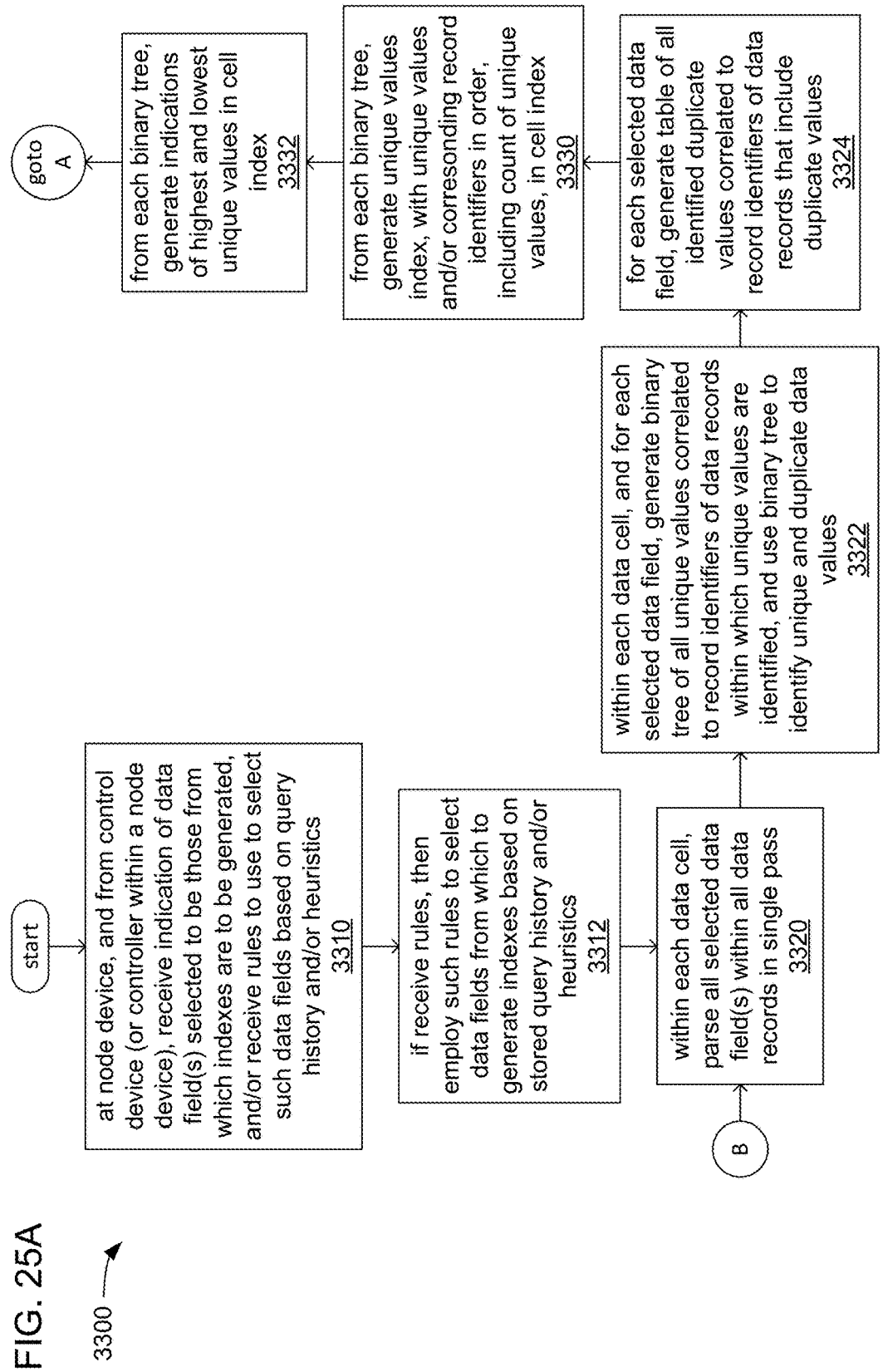

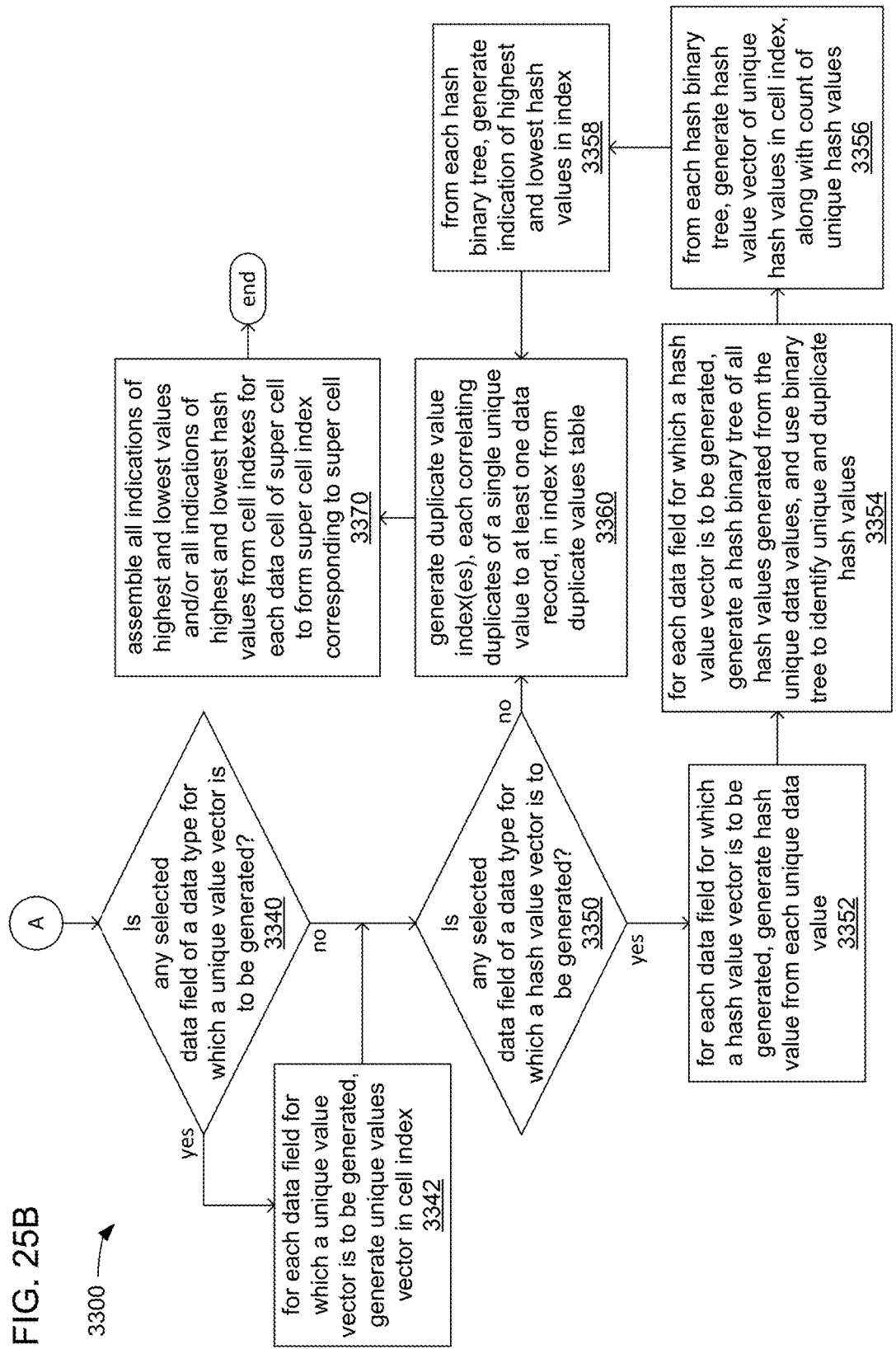

US 10,002,146 B1

DISTRIBUTED DATA SET INDEXING

CROSS-REFERENCE TO RELATED APPLICATIONS

This application is a continuation under the provisions of 35 U.S.C. § 120 of U.S. application Ser. No. 15/838,110 filed Dec. 11, 2017, which is incorporated herein by reference in its entirety for all purposes. This application also claims the benefit of priority under 35 U.S.C. § 119(e) to U.S. Provisional Application Ser. No. 62/458,162 filed Feb. 13, 2017, which is also incorporated herein by reference in its entirety for all purposes.

TECHNICAL FIELD

Various embodiments described herein are generally directed to inter-device coordination to improve distributed indexing of a data set stored by multiple node devices.

BACKGROUND

The performance of analyses of large data sets (e.g., what is commonly referred to as "big data") is becoming increasingly commonplace in such areas as simulations, process monitoring, decision making, behavioral modeling and making predictions. Such analysis are often performed by grids of varying quantities of available node devices, while the data sets are often stored within a separate set of storage devices. This begets the challenge of enabling efficiently generating indexes for such large data sets to enable efficient searching of such large data sets across multiple node devices of a grid to enable specific pieces of data to be efficiently located and retrieved.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes a processor of a first node device of multiple node devices, and a storage of the first node device to store instructions that, when executed by the processor, cause the processor to perform operations including, receive, at the first node device, a super cell of multiple super cells into which a data set is divided from a data file maintained by at least one data device, wherein: the multiple super cells are distributed among the multiple node devices, each super cell includes multiple data cells, each data cell of the multiple data cells includes multiple data records, and each data record of the multiple data records includes a set of fields at which data values of the data set are stored. The processor may also be caused to index, at the first node device, and at least partially in parallel with other node devices of the multiple node devices, the multiple data records within each data cell of the multiple data cells by a first data field and by a second data field of the set of fields in a single read pass through each data cell of the multiple data cells, wherein for each data record within a first data cell of the received super cell, the processor is caused to: retrieve a data value from the first data field and a data value from the second data field; determine, based on the data value retrieved from the first data field, whether the first data field of the data record stores a unique data value, wherein the data value has not yet been retrieved by the processor from the first data field of any data record of the first data cell; in response to a determination that the first data field of the data record stores a unique data value, add an identifier of the data record to a first unique values index of a first cell index corresponding to the first data cell, wherein identifiers of data records within the first unique values index are ordered based on the corresponding unique data values in the first data field to enable use of the first unique values index to perform a search of the data values within the first data field of the data records of the first data cell; determine, based on the data value retrieved from the second data field, whether the second data field of the data record stores a unique data value, wherein the data value has not yet retrieved by the processor from the second data field of any data record of the first data cell; and in response to a determination that the second data field of the data record stores a unique data value, add an identifier of the data record to a second unique values index of the first cell index, wherein identifiers of data records within the second unique values index are ordered based on the corresponding unique data values in the second data field to enable use of the second unique values index to perform a search of the data values within the second data field of the data records of the first data cell. The processor may further be caused to generate, within a super cell index corresponding to the received super cell, an indication of a range of the data values of the first data field within the data records of the first data cell, and an indication of a range of the data values of the second data field within the data records of the first data cell, to enable use of the super cell index to determine whether a value specified in search criteria is present within one of the first and second data fields of any data record of the first data cell; provide, to a control device, a request for a first pointer to a location within the data file at which to store the super cell, the super cell index and the first cell index; receive, at the first node device and from the control device, the first pointer; and transmit, to the at least one data device and at least partially in parallel with other node devices of the multiple node devices, the super cell, the super cell index and the first cell index with an instruction to store the super cell, the super cell index and the first cell index with the super cell stored in the data file starting at the location pointed to by the first pointer, with the super cell index and the first cell index stored in the data file at a location after the super cell.

A computer-program product tangibly embodied in a non-transitory machine-readable storage medium includes instructions operable to cause a processor of a first node device of multiple node devices to perform operations including, receive, at the first node device, a super cell of multiple super cells into which a data set is divided from a data file maintained by at least one data device, wherein: the multiple super cells are distributed among the multiple node devices, each super cell includes multiple data cells, each data cell of the multiple data cells includes multiple data records, and each data record of the multiple data records includes a set of fields at which data values of the data set are stored. The processor may also be caused to index, at the first node device, and at least partially in parallel with other node devices of the multiple node devices, the multiple data records within each data cell of the multiple data cells by a first data field and by a second data field of the set of fields in a single read pass through each data cell of the multiple data cells, wherein for each data record within a first data cell of the received super cell, the processor is caused to:

retrieve a data value from the first data field and a data value from the second data field; determine, based on the data value retrieved from the first data field, whether the first data field of the data record stores a unique data value, wherein the data value has not yet been retrieved by the processor from the first data field of any data record of the first data cell; in response to a determination that the first data field of the data record stores a unique data value, add an identifier of the data record to a first unique values index of a first cell index corresponding to the first data cell, wherein identifiers of data records within the first unique values index are ordered based on the corresponding unique data values in the first data field to enable use of the first unique values index to perform a search of the data values within the first data field of the data records of the first data cell; determine, based on the data value retrieved from the second data field, whether the second data field of the data record stores a unique data value, wherein the data value has not yet retrieved by the processor from the second data field of any data record of the first data cell; and in response to a determination that the second data field of the data record stores a unique data value, add an identifier of the data record to a second unique values index of the first cell index, wherein identifiers of data records within the second unique values index are ordered based on the corresponding unique data values in the second data field to enable use of the second unique values index to perform a search of the data values within the second data field of the data records of the first data cell. The processor may further be caused to generate, within a super cell index corresponding to the received super cell, an indication of a range of the data values of the first data field within the data records of the first data cell, and an indication of a range of the data values of the second data field within the data records of the first data cell, to enable use of the super cell index to determine whether a value specified in search criteria is present within one of the first and second data fields of any data record of the first data cell; provide, to a control device, a request for a first pointer to a location within the data file at which to store the super cell, the super cell index and the first cell index; receive, at the first node device and from the control device, the first pointer; and transmit, to the at least one data device and at least partially in parallel with other node devices of the multiple node devices, the super cell, the super cell index and the first cell index with an instruction to store the super cell, the super cell index and the first cell index with the super cell stored in the data file starting at the location pointed to by the first pointer, with the super cell index and the first cell index stored in the data file at a location after the super cell.

The received super cell may include a second data cell in addition to the first data cell; the processor may be caused to index the multiple data records within the second data cell by the first data field and by the second data field of the set of fields in a single read pass to generate additional unique values indexes within the first cell index to enable a binary search of the data values within at least one of the first data field and the second data field of the data records within the second data cell; a first processor core of the processor may index the multiple data records within the first data cell; and a second processor core of the processor may index the multiple data records within the second data cell at least partially in parallel with the indexing, by the first processor core, of the multiple data records within the first data cell.

The processor may be caused to: for each data cell within the super cell, add a highest data value and a lowest data value of the range of data values of the first data field to a third binary tree; perform an in-order traversal of the third binary tree to identify highest and lowest data values of the first data field among the data cells within the super cell; add indications of the highest and lowest values of the first data field among the data cells within the super cell to the super cell index to specify a range of values of the first data field for the super cell therein; for each data cell within the super cell, add a highest data value and a lowest data value of the range of data values of the second data field to a fourth binary tree; perform an in-order traversal of the fourth binary tree to identify highest and lowest data values of the second data field among the data cells within the super cell; and add indications of the highest and lowest values of the second data field among the data cells within the super cell to the super cell index to specify a range of values of the second data field for the super cell therein.

Following each retrieval of data values from the first data field and the second data field of a data record of the multiple data records, the processor may be caused to perform operations including: search a first binary tree of unique data values of the first data field of the first data cell correlated to the identifier of a data record to determine whether the data value retrieved from the first data field includes a duplicate data value that is already present within the first binary tree; add the data value retrieved from the first data field to the first binary tree in response to a determination that the data value retrieved from the first data field is a unique data value that is not already present within the first binary tree; search a second binary tree of unique data values of the second data field of the first data cell correlated to the identifier of a data record to determine whether the data value retrieved from the second data field includes a duplicate data value that is already present within the second binary tree; and add the data value retrieved from the second data field to the second binary tree in response to a determination that the data value retrieved from the second data field is a unique data value that is not already present within the second binary tree. The processor may also be caused to perform operations including generate the first unique values index based on an in-order traversal of the first binary tree, and generate the second unique values index based on an in-order traversal of the second binary tree.

Following each retrieval of a data value from the first data field of a data record of the multiple data records, the processor may be caused to perform operations including: in response to a determination that the first data field of the data record stores a duplicate data value, search a first set of duplicate value indexes within the first cell index to determine whether a duplicate value index already exists within the first set for the duplicate value; in response to identifying an existing duplicate value index for the duplicate value within the first set, add the identifier of the data record to the identified existing duplicate value index; and in response to determining that there is no existing duplicate value index among the first set of duplicate value indexes for the duplicate value, add a duplicate value index to the first set for the duplicate value and add the identifier of the data record to the added duplicate value index. Following each retrieval of a data value from the second data field of a data record of the multiple data records, the processor may be caused to perform operations including: in response to a determination that the second data field of the data record stores a duplicate data value, search a second set of duplicate value indexes with the first cell index to determine whether a duplicate value index already exists within the second set for the duplicate value; in response to identifying an existing duplicate value index for the duplicate value within the second set, add the identifier of the data record to the identified existing duplicate value index; and in response to determining that there is no existing duplicate value index among the second set of duplicate value indexes for the duplicate value, add a duplicate value index to the second set for the duplicate value and add the identifier of the data record to the added duplicate value index. Each duplicate value index within the first and second sets of duplicate value indexes may include identifiers of data records.

The processor may be caused to transmit an indication of current availability of resources of the first node device to the control device, at least partially in parallel with transmissions by other node devices of the multiple node devices of availability of resources to the control device, to enable the control device to determine whether to assign the super cell to the first node device in lieu of assigning the super cell to another node device of the multiple node devices. The processor may also be caused to perform operations including receive, at the first node device and from the control device, a second pointer to a location within data file from which to retrieve the super cell; and transmit, to the at least on data device and at least partially in parallel with other node devices of the multiple node devices, an instruction to provide the super cell to the first node device.

The processor may be caused to perform operations including: receive, at the first node device, and at least partially in parallel with other node devices of the multiple node devices, query instructions specifying the search criteria of a search to be performed of the data set for data records meeting the search criteria, wherein the search criteria includes at least one data value to be searched for within at least one of the first data field and the second data field; compare the at least one data value to at least one of the range of values of the first data field and the range of values of the second data field specified by the super cell index to determine whether the super cell includes any data records that meet the search criteria; and in response to a determination that at least one data record within at least one data cell of the super cell does include a data record that meets the search criteria, compare the at least one data value to at least one of the range of values of the first data field and the range of values of the second data field specified by the super cell index to determine at least whether the first data cell includes any data records that meet the search criteria.

The processor may be caused to perform operations including: in response to a determination that at least the first data cell does include a data record that meets the search criteria, use at least one of the first unique values index and the second values index to perform a binary search of the data records of the first data cell to identify one or more data records of the first data cell that meet the search criteria; and upon identifying a data record of the first data cell that meets the search criteria, search at least one of the first set of duplicate value indexes and the second set of duplicate value indexes for a duplicate value index that identifies one or more additional data records of the first data cell that meet the search criteria.

The processor is caused to perform operations including: parse the query instructions to determine whether the query instructions include task instructions for the performance of a task with data retrieved from one or more data records identified as meeting the search criteria; and in response to a determination that the query instructions do include task instructions for the performance of a task, execute the instructions to perform the task at least partially in parallel with at least one other node device of the multiple node devices.

A computer-implemented method includes receiving, at a first node device of multiple node devices, a super cell of multiple super cells into which a data set is divided from a data file maintained by at least one data device, wherein: the multiple super cells are distributed among the multiple node devices; each super cell includes multiple data cells; each data cell of the multiple data cells includes multiple data records; and each data record of the multiple data records includes a set of fields at which data values of the data set are stored. The method may also include indexing, at the first node device, and at least partially in parallel with other node devices of the multiple node devices, the multiple data records within each data cell of the multiple data cells by a first data field and by a second data field of the set of fields in a single read pass through each data cell of the multiple data cells, wherein for each data record within a first data cell of the received super cell, the operations including: retrieving a data value from the first data field and a data value from the second data field; determining, based on the data value retrieved from the first data field, whether the first data field of the data record stores a unique data value, wherein the data value has not yet been retrieved from the first data field of any data record of the first data cell; in response to a determination that the first data field of the data record stores a unique data value, adding an identifier of the data record to a first unique values index of a first cell index corresponding to the first data cell, wherein identifiers of data records within the first unique values index are ordered based on the corresponding unique data values in the first data field to enable use of the first unique values index to perform a search of the data values within the first data field of the data records of the first data cell; determining, based on the data value retrieved from the second data field, whether the second data field of the data record stores a unique data value, wherein the data value has not yet retrieved from the second data field of any data record of the first data cell; and in response to a determination that the second data field of the data record stores a unique data value, adding an identifier of the data record to a second unique values index of the first cell index, wherein identifiers of data records within the second unique values index are ordered based on the corresponding unique data values in the second data field to enable use of the second unique values index to perform a search of the data values within the second data field of the data records of the first data cell;

The method may further include: generating, within a super cell index corresponding to the received super cell, an indication of a range of the data values of the first data field within the data records of the first data cell, and an indication of a range of the data values of the second data field within the data records of the first data cell, to enable use of the super cell index to determine whether a value specified in search criteria is present within one of the first and second data fields of any data record of the first data cell; providing, to a control device, a request for a first pointer to a location within the data file at which to store the super cell, the super cell index and the first cell index; receiving, at the first node device and from the control device, the first pointer; and transmitting, to the at least one data device and at least partially in parallel with other node devices of the multiple node devices, the super cell, the super cell index and the first cell index with an instruction to store the super cell, the super cell index and the first cell index with the super cell stored in the data file starting at the location pointed to by the first pointer, with the super cell index and the first cell index stored in the data file at a location after the super cell.

The received super cell may include a second data cell in addition to the first data cell; the method may include indexing the multiple data records within the second data cell by the first data field and by the second data field of the set of fields in a single read pass to generate additional unique values indexes within the first cell index to enable a binary search of the data values within at least one of the first data field and the second data field of the data records within the second data cell; a first processor core of the processor may index the multiple data records within the first data cell; and a second processor core of the processor may index the multiple data records within the second data cell at least partially in parallel with the indexing, by the first processor core, of the multiple data records within the first data cell.

The method may include: for each data cell within the super cell, adding a highest data value and a lowest data value of the range of data values of the first data field to a third binary tree; performing an in-order traversal of the third binary tree to identify highest and lowest data values of the first data field among the data cells within the super cell; adding indications of the highest and lowest values of the first data field among the data cells within the super cell to the super cell index to specify a range of values of the first data field for the super cell therein; for each data cell within the super cell, adding a highest data value and a lowest data value of the range of data values of the second data field to a fourth binary tree; performing an in-order traversal of the fourth binary tree to identify highest and lowest data values of the second data field among the data cells within the super cell; and adding indications of the highest and lowest values of the second data field among the data cells within the super cell to the super cell index to specify a range of values of the second data field for the super cell therein.

The method may include, following each retrieval of data values from the first data field and the second data field of a data record of the multiple data records, performing operations including: searching a first binary tree of unique data values of the first data field of the first data cell correlated to the identifier of a data record to determine whether the data value retrieved from the first data field includes a duplicate data value that is already present within the first binary tree; adding the data value retrieved from the first data field to the first binary tree in response to a determination that the data value retrieved from the first data field is a unique data value that is not already present within the first binary tree; searching a second binary tree of unique data values of the second data field of the first data cell correlated to the identifier of a data record to determine whether the data value retrieved from the second data field includes a duplicate data value that is already present within the second binary tree; and adding the data value retrieved from the second data field to the second binary tree in response to a determination that the data value retrieved from the second data field is a unique data value that is not already present within the second binary tree. The method may also include generating the first unique values index based on an in-order traversal of the first binary tree, and generating the second unique values index based on an in-order traversal of the second binary tree.

The method may include, following each retrieval of a data value from the first data field of a data record of the multiple data records, performing operations including: in response to a determination that the first data field of the data record stores a duplicate data value, searching a first set of duplicate value indexes within the first cell index to determine whether a duplicate value index already exists within the first set for the duplicate value; in response to identifying an existing duplicate value index for the duplicate value within the first set, adding the identifier of the data record to the identified existing duplicate value index; and in response to determining that there is no existing duplicate value index among the first set of duplicate value indexes for the duplicate value, adding a duplicate value index to the first set for the duplicate value and add the identifier of the data record to the added duplicate value index. The method may also include, following each retrieval of a data value from the second data field of a data record of the multiple data records, performing operations including: in response to a determination that the second data field of the data record stores a duplicate data value, searching a second set of duplicate value indexes with the first cell index to determine whether a duplicate value index already exists within the second set for the duplicate value; in response to identifying an existing duplicate value index for the duplicate value within the second set, adding the identifier of the data record to the identified existing duplicate value index; and in response to determining that there is no existing duplicate value index among the second set of duplicate value indexes for the duplicate value, adding a duplicate value index to the second set for the duplicate value and add the identifier of the data record to the added duplicate value index. Each duplicate value index within the first and second sets of duplicate value indexes includes identifiers of data records.

The method may include, transmitting an indication of current availability of resources of the first node device to the control device, at least partially in parallel with transmissions by other node devices of the multiple node devices of availability of resources to the control device, to enable the control device to determine whether to assign the super cell to the first node device in lieu of assigning the super cell to another node device of the multiple node devices. The method may also include receiving, at the first node device and from the control device, a second pointer to a location within data file from which to retrieve the super cell; and transmitting, to the at least on data device and at least partially in parallel with other node devices of the multiple node devices, an instruction to provide the super cell to the first node device.

The method may include: receiving, at the first node device, and at least partially in parallel with other node devices of the multiple node devices, query instructions specifying the search criteria of a search to be performed of the data set for data records meeting the search criteria, wherein the search criteria includes at least one data value to be searched for within at least one of the first data field and the second data field; comparing the at least one data value to at least one of the range of values of the first data field and the range of values of the second data field specified by the super cell index to determine whether the super cell includes any data records that meet the search criteria; and in response to a determination that at least one data record within at least one data cell of the super cell does include a data record that meets the search criteria, comparing the at least one data value to at least one of the range of values of the first data field and the range of values of the second data field specified by the super cell index to determine at least whether the first data cell includes any data records that meet the search criteria.

The method may include in response to a determination that at least the first data cell does include a data record that meets the search criteria, using at least one of the first unique values index and the second values index to perform a binary search of the data records of the first data cell to identify one or more data records of the first data cell that meet the search criteria; and upon identifying a data record of the first data cell that meets the search criteria, searching at least one of the first set of duplicate value indexes and the second set of duplicate value indexes for a duplicate value index that identifies one or more additional data records of the first data cell that meet the search criteria.

The method may include parsing the query instructions to determine whether the query instructions include task instructions for the performance of a task with data retrieved from one or more data records identified as meeting the search criteria; and in response to a determination that the query instructions do include task instructions for the performance of a task, executing the instructions to perform the task at least partially in parallel with at least one other node device of the multiple node devices.

An apparatus may include a processor of a first node device of multiple node devices, and a storage of the first node device to store instructions that, when executed by the processor, cause the processor to perform operations including store, at the first node device, a first super cell of multiple super cells into which a data set is divided from a data file maintained by at least one data device, wherein: the multiple super cells are distributed among the multiple node devices; each super cell includes multiple data cells; each data cell of the multiple data cells includes multiple data records; and each data record of the multiple data records includes a set of fields at which data values of the data set are stored. The processor may also be caused to store, for each data cell within the first super cell, a cell index that corresponds to the data cell, wherein the cell index may include an indication of a range of values stored within a first data field of the set of fields among the data records within the data cell; and a first unique values index that corresponds to the first data field, wherein for each data value that is stored within the first data field among the data records within the data cell, the first unique values index includes an identifier of a single data record within the data cell in which the data value is stored within the first data field. The processor may also be caused to receive, at the first node device, from a control device, and at least partially in parallel with other node devices of the multiple node devices, query instructions specifying search criteria of a search to be performed of the data set for data records that meet the specified search criteria, wherein the search criteria includes at least one data value to be searched for within the first data field. The processor may also be caused to, in response to the receipt of the query instructions, and for each data cell within the first super cell, the processor is caused to perform operations of the specified search, the operations including compare the data value to the range of values indicated in the corresponding cell index to determine whether the data cell includes at least one data record that meets the specified search criteria; and in response to a determination that the data cell includes at least one data record that meets the specified search criteria, use at least the first unique values index to perform a search of the data records of the data cell to identify one or more data records that meet the search criteria. The processor may also be caused to, in response to identifying at least one data record that meets the specified search criteria, the processor is caused to perform operations including: generate results data indicative of the first super cell including at least one data record that meets the specified search criteria; and provide the results data to the control device.

A computer-program product tangibly embodied in a non-transitory machine-readable storage medium may include instructions operable to cause a processor of a first node device of multiple node devices to perform operations including store, at the first node device, a first super cell of multiple super cells into which a data set is divided from a data file maintained by at least one data device, wherein: the multiple super cells are distributed among the multiple node devices; each super cell includes multiple data cells; each data cell of the multiple data cells includes multiple data records; and each data record of the multiple data records includes a set of fields at which data values of the data set are stored. The processor may also be caused to store, for each data cell within the first super cell, a cell index that corresponds to the data cell, wherein the cell index may include an indication of a range of values stored within a first data field of the set of fields among the data records within the data cell; and a first unique values index that corresponds to the first data field, wherein for each data value that is stored within the first data field among the data records within the data cell, the first unique values index includes an identifier of a single data record within the data cell in which the data value is stored within the first data field. The processor may also be caused to receive, at the first node device, from a control device, and at least partially in parallel with other node devices of the multiple node devices, query instructions specifying search criteria of a search to be performed of the data set for data records that meet the specified search criteria, wherein the search criteria includes at least one data value to be searched for within the first data field. The processor may also be caused to, in response to the receipt of the query instructions, and for each data cell within the first super cell, the processor is caused to perform operations of the specified search, the operations including compare the data value to the range of values indicated in the corresponding cell index to determine whether the data cell includes at least one data record that meets the specified search criteria; and in response to a determination that the data cell includes at least one data record that meets the specified search criteria, use at least the first unique values index to perform a search of the data records of the data cell to identify one or more data records that meet the search criteria. The processor may also be caused to, in response to identifying at least one data record that meets the specified search criteria, the processor is caused to perform operations including: generate results data indicative of the first super cell including at least one data record that meets the specified search criteria; and provide the results data to the control device.

The multiple data cells of the first super cell may include a first data cell and a second data cell; the processor may be caused to perform the specified search within the first data cell on a first thread of execution; and the processor may be caused to perform the specified search within the second data cell on a second thread of execution. The processor may also be caused to allocate a separate processor core of the processor to each of the first and second threads of execution.

A cell index corresponding to a data cell of the first super cell may include a first set of duplicate value indexes, wherein for at least one data value that is stored within the first data field of a data record identified in the first unique values index, a duplicate value index of the first set of duplicate value indexes includes at least one identifier of an additional data record within the data cell in which the data value is also stored within the first data field. The processor may be caused, in response to identifying at least one data record within the data cell that meets the specified search criteria, to perform operations including: search within the first set of duplicate value indexes for a duplicate value index that identifies one or more additional data records of the data cell that also meet the specified search criteria; and generate the results data to be indicative of the one or more additional data records.

The cell index may include a second unique values index that corresponds to a second data field of the set of fields within the data records of the data cell; for each data value that is stored within the second data field among the data records within the data cell, the second unique values index includes an identifier of a single data record within the data cell in which the data value is stored within the second data field; the cell index may include a second set of duplicate value indexes, wherein for at least one data value that is stored within the second data field of a data record identified in the second unique values index, a duplicate value index of the second set of duplicate value indexes includes at least one identifier of an additional data record within the data cell in which the data value is also stored within the first data field; the first unique values index may include a count of identifiers of data records included in the first unique values index; the second unique values index may include a count of identifiers of data records included in the second unique values index; each duplicate value index within the first set of duplicate value indexes may include a count of identifiers of data records included in the duplicate value index; each duplicate value index within the second set of duplicate value indexes may include a count of identifiers of data records included in the duplicate value index; and the search criteria may include at least one data value that to be searched for within the second data field. The processor may be caused to perform operations including: analyze the count of identifiers of data records within the first unique values index, the second unique values index, each duplicate value index within the first set of duplicate value indexes and each duplicate value index within the second set of duplicate value indexes to determine relative degrees of cardinality of the data values of the first data field and the second data field; and determine whether to begin the performance of the specified search of the data records within the data cell with the first unique values index or the second unique values index based on the relative degrees of cardinality of the data values of the first data field and the second data field.

The processor is caused to perform operations including parse the query instructions to determine whether the query instructions include task instructions for the performance of a task with data retrieved from one or more data records identified as meeting the search criteria; and in response to a determination that the query instructions do include task instructions for the performance of a task, the processor may be caused to perform operations including execute the instructions to perform the task at least partially in parallel with at least one other node device of the multiple node devices, and generate the results data to include results of the performance of the task as the indication that the super cell includes at least one data record that meets the specified search criteria.

The processor may be caused to perform operations including: store, at the first node device, a first super cell index corresponding to the first super cell, wherein the first super cell index may include an indication of a range of values stored within the first data field within the multiple data cells of the first super cell; in response to the receipt of the query instructions, compare the at least one data value of the search criteria to the range of values indicated in the first super cell index to determine whether the first super cell includes at least one data record within at least one data cell of the first super cell that meets the specified search criteria; and condition the performance of the operations of the specified search for each data cell within the first super cell on a determination that the first super cell does include at least one data record within at least one data cell of the first super cell that meets the specified search criteria.

The first node device may include a controller, and the controller may include a controller processor and a controller storage to store other instructions that, when executed by the controller processor, cause the controller processor to perform operations to serve as the control device. The operations may include: receive, at the first node device and from a second node device of the multiple node devices, a second super cell index corresponding to a second super cell stored by the second node device, wherein the second super cell index may include an indication of a range of values stored within the first data field within the at least one data cell of the second super cell; in response to the receipt of the query instructions, compare the data value to the range of values indicated in the second super cell index to determine whether the second super cell includes at least one data record within at least one data cell of the second super cell that meets the specified search criteria; and in response to a determination that the second super cell includes at least one data record that meets the specified search criteria, transmit the query instructions to the second node device to enable the second node device to perform the specified search within the at least one data cell of the second super cell.

The processor may be caused to perform operations including: store, within each cell index corresponding to a data cell of the multiple data cells within the first super cell, a unique values vector that may include a single instance of each data value that is stored within the first data field among the data records within the corresponding data cell, wherein the single instances of data values within the unique values vector within each cell index are sorted by value; in response to the receipt of the query instructions, compare the at least one data value of the search criteria to at least one of the single instances of data values within the unique values vector within each cell index to determine whether the first super cell includes at least one data cell that meets the specified search criteria; and condition the performance of the operations of the specified search for each data cell within the first super cell on a determination that the first super cell does include at least one data cell that meets the specified search criteria.

The processor is caused to receive, at the first node device, the first super cell from a data file maintained by at least one data device. The processor may also be caused to index, at the first node device, and at least partially in parallel with other node devices of the multiple node devices, the multiple data records within each data cell of the multiple data cells by the first data field of the set of fields in a single read pass through each data cell of the multiple data cells, wherein for each data record within the data cell, the processor may be caused to: retrieve a data value from the first data field; determine, based on the data value retrieved from the first data field, whether the first data field of the data record stores a unique data value that has not yet retrieved by the processor from the first data field of any data record of the data cell; and in response to a determination that the first data field of the data record stores a unique data value, add an identifier of the data record to the first unique values index, wherein identifiers of data records within the first unique values index are ordered into a vector of identifiers based on an ordering of the corresponding unique data values in the first data field that is selected to enable use of the first unique values index to perform the search of the data records of the data cell. The processor may be further caused to generate, within a super cell index corresponding to the super cell, an indication of a range of the data values of the first data field within the data records of the data cell to enable use of the super cell index to determine whether the at least one data value of the search criteria is are present within the first data field of any data record of the data cell.

A computer-implemented method may include storing, at a first node device of multiple node devices, a first super cell of multiple super cells into which a data set is divided from a data file maintained by at least one data device, wherein: the multiple super cells are distributed among the multiple node devices; each super cell may include multiple data cells; each data cell of the multiple data cells may include multiple data records; and each data record of the multiple data records may include a set of fields at which data values of the data set are stored. The method may also include: storing, for each data cell within the first super cell, a cell index that corresponds to the data cell, wherein the cell index includes: an indication of a range of values stored within a first data field of the set of fields among the data records within the data cell; and a first unique values index that corresponds to the first data field, wherein for each data value that is stored within the first data field among the data records within the data cell, the first unique values index includes an identifier of a single data record within the data cell in which the data value is stored within the first data field. The method may also include receiving, at the first node device, from a control device, and at least partially in parallel with other node devices of the multiple node devices, query instructions specifying search criteria of a search to be performed of the data set for data records that meet the specified search criteria, wherein the search criteria may include at least one data value to be searched for within the first data field. The method may further include, in response to the receipt of the query instructions, and for each data cell within the first super cell, performing operations of the specified search, the operations including: comparing the at least one data value of the search criteria to the range of values indicated in the corresponding cell index to determine whether the data cell includes at least one data record that meets the specified search criteria; and in response to a determination that the data cell includes at least one data record that meets the specified search criteria, using at least the first unique values index to perform a search of the data records of the data cell to identify one or more data records that meet the search criteria. The method may further include, in response to identifying at least one data record that meets the specified search criteria, performing operations including generating results data indicative of the first super cell including at least one data record that meets the specified search criteria, and providing the results data to the control device.

The multiple data cells of the first super cell may include a first data cell and a second data cell, and the method may include: performing the specified search within the first data cell on a first thread of execution of a processor of the first node device and performing the specified search within the second data cell on a second thread of execution of the processor. The method may also include allocating a separate processor core of the processor to each of the first and second threads of execution.

A cell index corresponding to a data cell of the first super cell may include a first set of duplicate value indexes, wherein for at least one data value that is stored within the first data field of a data record identified in the first unique values index, a duplicate value index within the first set of duplicate value indexes includes at least one identifier of an additional data record within the data cell in which the data value is also stored within the first data field. The method may include, in response to identifying at least one data record within the data cell that meets the specified search criteria, performing operations including: searching within the first set of duplicate value indexes for a duplicate value index that identifies one or more additional data records of the data cell that also meet the specified search criteria; and generating the results data to be indicative of the one or more additional data records.

The cell index may include a second unique values index that corresponds to a second data field of the set of fields within the data records of the data cell; for each data value that is stored within the second data field among the data records within the data cell, the second unique values index includes an identifier of a single data record within the data cell in which the data value is stored within the second data field; the cell index may include a second set of duplicate value indexes, wherein for at least one data value that is stored within the second data field of a data record identified in the second unique values index, a duplicate value index of the second set of duplicate value indexes includes at least one identifier of an additional data record within the data cell in which the data value is also stored within the first data field; the first unique values index may include a count of identifiers of data records included in the first unique values index; the second unique values index may include a count of identifiers of data records included in the second unique values index; each duplicate value index within the first set of duplicate value indexes may include a count of identifiers of data records included in the duplicate value index; each duplicate value index within the second set of duplicate value indexes may include a count of identifiers of data records included in the duplicate value index; and the search criteria may include at least one data value that to be searched for within the second data field. The method may include: analyzing the count of identifiers of data records within the first unique values index, the second unique values index, each duplicate value index within the first set of duplicate value indexes and each duplicate value index within the second set of duplicate value indexes to determine relative degrees of cardinality of the data values of the first data field and the second data field; and determining whether to begin the performance of the specified search of the data records within the data cell with the first unique values index or the second unique values index based on the relative degrees of cardinality of the data values of the first data field and the second data field.

The method may include parsing the query instructions to determine whether the query instructions include task instructions for the performance of a task with data retrieved from one or more data records identified as meeting the search criteria; and in response to a determination that the query instructions do include task instructions for the performance of a task, performing operations including executing, at the first node device, the instructions to perform the task at least partially in parallel with at least one other node device of the multiple node devices, and generating the results data to include results of the performance of the task as the indication that the super cell includes at least one data record that meets the specified search criteria.

The method may include: storing, at the first node device, a first super cell index corresponding to the first super cell, wherein the first super cell index may include an indication of a range of values stored within the first data field within the multiple data cells of the first super cell; in response to the receipt of the query instructions, comparing the at least one data value of the search criteria to the range of values indicated in the first super cell index to determine whether the first super cell includes at least one data record within at least one data cell of the first super cell that meets the specified search criteria; and conditioning the performance of the operations of the specified search for each data cell within the first super cell on a determination that the first super cell does include at least one data record within at least one data cell of the first super cell that meets the specified search criteria.

The first node device may include a controller, and the controller may include a controller processor and a controller storage to store other instructions that, when executed by the controller processor, cause the controller processor to perform operations to serve as the control device. The operations may include: receiving, at the first node device and from a second node device of the multiple node devices, a second super cell index corresponding to a second super cell stored by the second node device, wherein the second super cell index may include an indication of a range of values stored within the first data field within the at least one data cell of the second super cell; in response to the receipt of the query instructions, comparing the at least one data value of the search criteria to the range of values indicated in the second super cell index to determine whether the second super cell includes at least one data record within at least one data cell of the second super cell that meets the specified search criteria; and in response to a determination that the second super cell includes at least one data record that meets the specified search criteria, transmitting the query instructions to the second node device to enable the second node device to perform the specified search within the at least one data cell of the second super cell.

The method may include: storing, within each cell index corresponding to a data cell of the multiple data cells within the first super cell, a unique values vector that may include a single instance of each data value that is stored within the first data field among the data records within the corresponding data cell, wherein the single instances of data values within the unique values vector within each cell index are sorted by value; in response to the receipt of the query instructions, comparing the at least one data value of the search criteria to at least one of the single instances of data values within the unique values vector within each cell index to determine whether the first super cell includes at least one data cell that meets the specified search criteria; and conditioning the performance of the operations of the specified search for each data cell within the first super cell on a determination that the first super cell does include at least one data cell that meets the specified search criteria.

The method may include receiving, at the first node device, the first super cell from a data file maintained by at least one data device. The method may also include indexing, at the first node device, and at least partially in parallel with other node devices of the multiple node devices, the multiple data records within each data cell of the multiple data cells by the first data field of the set of fields in a single read pass through each data cell of the multiple data cells, wherein for each data record within the data cell, the method may include: retrieving a data value from the first data field; determining, based on the data value retrieved from the first data field, whether the first data field of the data record stores a unique data value that has not yet retrieved by a processor of the first node device from the first data field of any data record of the data cell; and in response to a determination that the first data field of the data record stores a unique data value, adding an identifier of the data record to the first unique values index, wherein identifiers of data records within the first unique values index are ordered into a vector of identifiers based on an ordering of the corresponding unique data values in the first data field that is selected to enable use of the first unique values index to perform the search of the data records of the data cell. The method may further include generating, within a super cell index corresponding to the super cell, an indication of a range of the data values of the first data field within the data records of the data cell to enable use of the super cell index to determine whether the at least one data value of the search criteria is are present within the first data field of any data record of the data cell.

An apparatus may include a processor of a first node device of multiple node devices, and a storage of the first node device to store instructions that, when executed by the processor, cause the processor to perform operations including store, at the first node device, a super cell of multiple super cells into which a data set is divided from a data file maintained by at least one data device, wherein: the multiple super cells are distributed among the multiple node devices; each super cell may include multiple data cells; each data cell of the multiple data cells may include multiple data records; and each data record of the multiple data records may include a set of data fields at which data values of the data set are stored. The processor may also be caused to perform operations including: index, at the first node device, the multiple data records within a first data cell of a super cell by a first data field and by a second data field of the set of data fields in a single read pass through the first data cell, wherein for each data record within the first data cell, the processor is caused to: retrieve data values from the first data field and the second data field; perform operations to generate a first binary tree of unique data values of the first data field of the first data cell to determine whether the data value retrieved from the first data field may include a unique value or a duplicate value, the operations including search the first binary tree to determine whether the data value retrieved from the first data field may include a duplicate data value that is already present within the first binary tree or a unique value that is not already present within the first binary tree, and add the data value retrieved from the first data field to the first binary tree in response to a determination that the data value retrieved from the first data field is a unique value; and perform operations to generate a second binary tree of unique data values of the second data field of the first data cell to determine whether the data value retrieved from the second data field may include a unique value or a duplicate value, the operations including search the second binary tree to determine whether the data value retrieved from the second data field may include a duplicate data value that is already present within the second binary tree or a unique value that is not already present within the second binary tree, and add the data value retrieved from the second data field to the second binary tree in response to a determination that the data value retrieved from the second data field is a unique value. The processor may be further caused to perform operations including: generate a first unique values index of the indexes of the data records associated with the unique data values within the first binary tree based on an in-order traversal of the first binary tree to enable use of the first unique values index to perform a binary search of the data values within the first data field of the data records of the first data cell; generate a second unique values index of the indexes of the data records associated with the unique data values within the second binary tree based on an in-order traversal of the second binary tree to enable use of the second unique values index to perform a binary search of the data values within the second data field of the data records of the first data cell; generate, within a super cell index corresponding to the super cell, and from the in-order traversals of the first and second binary trees, an indication of a range of the data values of the first data field within the data records of the first data cell, and an indication of a range of the data values of the second data field within the data records of the first data cell; and provide the super cell index to a control device to enable use of the super cell index by the control device.

A computer-program product tangibly embodied in a non-transitory machine-readable storage medium, the computer-program product including instructions operable to cause a processor of a first node device of multiple node devices to perform operations including store, at the first node device, a super cell of multiple super cells into which a data set is divided from a data file maintained by at least one data device, wherein: the multiple super cells are distributed among the multiple node devices; each super cell may include multiple data cells; each data cell of the multiple data cells may include multiple data records; and each data record of the multiple data records may include a set of data fields at which data values of the data set are stored. The processor may also be caused to perform operations including: index, at the first node device, the multiple data records within a first data cell of a super cell by a first data field and by a second data field of the set of data fields in a single read pass through the first data cell, wherein for each data record within the first data cell, the processor is caused to: retrieve data values from the first data field and the second data field; perform operations to generate a first binary tree of unique data values of the first data field of the first data cell to determine whether the data value retrieved from the first data field may include a unique value or a duplicate value, the operations including search the first binary tree to determine whether the data value retrieved from the first data field may include a duplicate data value that is already present within the first binary tree or a unique value that is not already present within the first binary tree, and add the data value retrieved from the first data field to the first binary tree in response to a determination that the data value retrieved from the first data field is a unique value; and perform operations to generate a second binary tree of unique data values of the second data field of the first data cell to determine whether the data value retrieved from the second data field may include a unique value or a duplicate value, the operations including search the second binary tree to determine whether the data value retrieved from the second data field may include a duplicate data value that is already present within the second binary tree or a unique value that is not already present within the second binary tree, and add the data value retrieved from the second data field to the second binary tree in response to a determination that the data value retrieved from the second data field is a unique value. The processor may be further caused to perform operations including: generate a first unique values index of the indexes of the data records associated with the unique data values within the first binary tree based on an in-order traversal of the first binary tree to enable use of the first unique values index to perform a binary search of the data values within the first data field of the data records of the first data cell; generate a second unique values index of the indexes of the data records associated with the unique data values within the second binary tree based on an in-order traversal of the second binary tree to enable use of the second unique values index to perform a binary search of the data values within the second data field of the data records of the first data cell; generate, within a super cell index corresponding to the super cell, and from the in-order traversals of the first and second binary trees, an indication of a range of the data values of the first data field within the data records of the first data cell, and an indication of a range of the data values of the second data field within the data records of the first data cell; and provide the super cell index to a control device to enable use of the super cell index by the control device.

The super cell may include a second data cell in addition to the first data cell; the processor may be caused to index, on a first thread of execution, the multiple data records within the first data cell to generate a first cell index that corresponds to the first data cell; and the processor may be caused to index, on a second thread of execution at least partially in parallel with the indexing of the multiple data records of the first data cell, the multiple data records within the second data cell by the first data field and the by the second data field of the set of data fields in a single read pass to generate a second cell index that corresponds to the second data cell, wherein the second cell index includes unique values indexes to enable a binary search of the data values within at least one of the first data field and the second data field of the data records within the second data cell. The processor may be caused to allocate a separate processor core of the processor to each of the first and second threads of execution.

The processor may be caused to perform operations including: for each data cell within the super cell, add a highest data value and a lowest data value of the range of data values of the first data field to a third binary tree; perform an in-order traversal of the third binary tree to identify highest and lowest data values of the first data field among the data cells within the super cell; add indications of the highest and lowest values of the first data field among the data cells within the super cell to the super cell index to specify a range of values of the first data field for the super cell therein; for each data cell within the super cell, add a highest data value and a lowest data value of the range of data values of the second data field to a fourth binary tree; perform an in-order traversal of the fourth binary tree to identify highest and lowest data values of the second data field among the data cells within the super cell; and add indications of the highest and lowest values of the second data field among the data cells within the super cell to the super cell index to specify a range of values of the second data field for the super cell therein.

The processor may be caused to perform operations including: analyze a data type and a data size of the first data field to determine whether to generate a unique values vector within a first cell index that corresponds to the first data cell; and in response to a determination to generate the unique values vector, the processor is caused to retrieve the unique values within the first binary tree via an in-order traversal of the first binary tree, and generate the unique values vector to include the unique values within the first binary tree sorted as sorted by the in-order traversal.

The processor may be caused to perform operations including: analyze a data type and a data size of the first data field to determine whether to generate a hash values vector within a first cell index that corresponds to the first data cell; and in response to a determination to generate the hash values vector, the processor is caused to generate a hash value from each unique value within the first binary tree, and generate the hash values vector to include the hash values sorted by value.

Following each retrieval of a data value from the first data field of a data record of the multiple data records, the processor is caused to perform operations including: in response to a determination that the first data field of the data record stores a duplicate data value, search a first set of duplicate value indexes within the first cell index to determine whether a duplicate value index already exists within the first set for the duplicate value; in response to identifying an existing duplicate value index for the duplicate value within the first set, add the identifier of the data record to the identified existing duplicate value index; and in response to determining that there is no existing duplicate value index among the first set of duplicate value indexes for the duplicate value, add a duplicate value index to the first set for the duplicate value and add the identifier of the data record to the added duplicate value index. Following each retrieval of a data value from the second data field of a data record of the multiple data records, the processor is caused to perform operations including: in response to a determination that the second data field of the data record stores a duplicate data value, search a second set of duplicate value indexes with the first cell index to determine whether a duplicate value index already exists within the second set for the duplicate value; in response to identifying an existing duplicate value index for the duplicate value within the second set, add the identifier of the data record to the identified existing duplicate value index; and in response to determining that there is no existing duplicate value index among the second set of duplicate value indexes for the duplicate value, add a duplicate value index to the second set for the duplicate value and add the identifier of the data record to the added duplicate value index. The first unique values index may a vector of identifiers of data records; the second unique values index may include a vector of identifiers of data records; and each duplicate value index within the first and second sets of duplicate value indexes may include a vector of identifiers of data records.

The first unique values index may include a count of indexes of data records included in the first unique values index; the second unique values index may include a count of indexes of data records included in the second unique values index; each duplicate value index within the first set of duplicate value indexes may include a count of indexes of data records included in the duplicate value index; and each duplicate value index within the second set of duplicate value indexes may include a count of indexes of data records included in the duplicate value index.

The processor may be caused to perform operations including: receive, at the first node device, and at least partially in parallel with other node devices of the multiple node devices, query instructions specifying search criteria of a search to be performed of the data set for data records meeting the search criteria, wherein the search criteria may include at least one data value to be searched for within at least one of the first data field and the second data field; compare the at least one data value to at least one of the range of values of the first data field and the range of values of the second data field specified by the super cell index to determine whether the super cell includes any data records that meet the search criteria; and in response to a determination that at least one data record within at least one data cell of the super cell does include a data record that meets the search criteria, compare the at least one data value to at least one of the range of values of the first data field and the range of values of the second data field specified by the super cell index to determine at least whether the first data cell includes any data records that meet the search criteria.

The processor may be caused to perform operations including: in response to a determination that at least the first data cell does include a data record that meets the search criteria, use at least one of the first unique values index and the second values index to perform a binary search of the data records of the first data cell to identify one or more data records of the first data cell that meet the search criteria; and upon identifying a data record of the first data cell that meets the search criteria, search at least one of the first set of duplicate value indexes and the second set of duplicate value indexes for a duplicate value index that identifies one or more additional data records of the first data cell that meet the search criteria.

A computer-implemented method includes storing, at the first node device, a super cell of multiple super cells into which a data set is divided from a data file maintained by at least one data device, wherein: the multiple super cells are distributed among the multiple node devices; each super cell includes multiple data cells; each data cell of the multiple data cells includes multiple data records; and each data record of the multiple data records includes a set of data fields at which data values of the data set are stored. The method may also include indexing, at the first node device, the multiple data records within a first data cell of a super cell by a first data field and by a second data field of the set of data fields in a single read pass through the first data cell, wherein the operations may include, for each data record within the first data cell: retrieving data values from the first data field and the second data field; performing operations to generate a first binary tree of unique data values of the first data field of the first data cell to determine whether the data value retrieved from the first data field may include a unique value or a duplicate value, the operations including searching the first binary tree to determine whether the data value retrieved from the first data field may include a duplicate data value that is already present within the first binary tree or a unique value that is not already present within the first binary tree; and adding the data value retrieved from the first data field to the first binary tree in response to a determination that the data value retrieved from the first data field is a unique value; and perform operations to generate a second binary tree of unique data values of the second data field of the first data cell to determine whether the data value retrieved from the second data field may include a unique value or a duplicate value, the operations including searching the second binary tree to determine whether the data value retrieved from the second data field may include a duplicate data value that is already present within the second binary tree or a unique value that is not already present within the second binary tree and adding the data value retrieved from the second data field to the second binary tree in response to a determination that the data value retrieved from the second data field is a unique value. The method may further include: generating a first unique values index of the indexes of the data records associated with the unique data values within the first binary tree based on an in-order traversal of the first binary tree to enable use of the first unique values index to perform a binary search of the data values within the first data field of the data records of the first data cell; generating a second unique values index of the indexes of the data records associated with the unique data values within the second binary tree based on an in-order traversal of the second binary tree to enable use of the second unique values index to perform a binary search of the data values within the second data field of the data records of the first data cell; generating, within a super cell index corresponding to the super cell, and from the in-order traversals of the first and second binary trees, an indication of a range of the data values of the first data field within the data records of the first data cell, and an indication of a range of the data values of the second data field within the data records of the first data cell; and providing the super cell index to a control device to enable use of the super cell index by the control device.

The super cell may include a second data cell in addition to the first data cell; and the method may include: indexing, on a first thread of execution, the multiple data records within the first data cell to generate a first cell index that corresponds to the first data cell; and indexing, on a second thread of execution at least partially in parallel with the indexing the multiple data records of the first data cell, the multiple data records within the second data cell by the first data field and the by the second data field of the set of data fields in a single read pass to generate a second cell index that corresponds to the second data cell, wherein the second cell index includes unique values indexes to enable a binary search of the data values within at least one of the first data field and the second data field of the data records within the second data cell. The method may also include allocating a separate processor core of the processor to each of the first and second threads of execution.

The method may include: for each data cell within the super cell, adding a highest data value and a lowest data value of the range of data values of the first data field to a third binary tree; performing an in-order traversal of the third binary tree to identify highest and lowest data values of the first data field among the data cells within the super cell; adding indications of the highest and lowest values of the first data field among the data cells within the super cell to the super cell index to specify a range of values of the first data field for the super cell therein; for each data cell within the super cell, adding a highest data value and a lowest data value of the range of data values of the second data field to a fourth binary tree; performing an in-order traversal of the fourth binary tree to identify highest and lowest data values of the second data field among the data cells within the super cell; and adding indications of the highest and lowest values of the second data field among the data cells within the super cell to the super cell index to specify a range of values of the second data field for the super cell therein.

The method may include: analyzing a data type and a data size of the first data field to determine whether to generate a unique values vector within a first cell index that corresponds to the first data cell; and in response to a determination to generate the unique values vector, the processor is caused to perform operations including retrieving the unique values within the first binary tree via an in-order traversal of the first binary tree, and generating the unique values vector to include the unique values within the first binary tree sorted as sorted by the in-order traversal.

The method may include: analyzing a data type and a data size of the first data field to determine whether to generate a hash values vector within a first cell index that corresponds to the first data cell; and in response to a determination to generate the hash values vector, the processor is caused to perform operations including generating a hash value from each unique value within the first binary tree, and generating the hash values vector to include the hash values sorted by value.

The method may include, following each retrieval of a data value from the first data field of a data record of the multiple data records, performing operations including: in response to a determination that the first data field of the data record stores a duplicate data value, searching a first set of duplicate value indexes within the first cell index to determine whether a duplicate value index already exists within the first set for the duplicate value; in response to identifying an existing duplicate value index for the duplicate value within the first set, adding the identifier of the data record to the identified existing duplicate value index; and in response to determining that there is no existing duplicate value index among the first set of duplicate value indexes for the duplicate value, adding a duplicate value index to the first set for the duplicate value and add the identifier of the data record to the added duplicate value index. The method may also include, following each retrieval of a data value from the second data field of a data record of the multiple data records, performing operations including: in response to a determination that the second data field of the data record stores a duplicate data value, searching a second set of duplicate value indexes with the first cell index to determine whether a duplicate value index already exists within the second set for the duplicate value; in response to identifying an existing duplicate value index for the duplicate value within the second set, adding the identifier of the data record to the identified existing duplicate value index; and in response to determining that there is no existing duplicate value index among the second set of duplicate value indexes for the duplicate value, adding a duplicate value index to the second set for the duplicate value and add the identifier of the data record to the added duplicate value index. The first unique values index may include a vector of identifiers of data records; the second unique values index may include a vector of identifiers of data records; and each duplicate value index within the first and second sets of duplicate value indexes may include a vector of identifiers of data records.

The first unique values index may include a count of indexes of data records included in the first unique values index; the second unique values index may include a count of indexes of data records included in the second unique values index; each duplicate value index within the first set of duplicate value indexes may include a count of indexes of data records included in the duplicate value index; and each duplicate value index within the second set of duplicate value indexes may include a count of indexes of data records included in the duplicate value index.

The method may include: receiving, at the first node device, and at least partially in parallel with other node devices of the multiple node devices, query instructions specifying search criteria of a search to be performed of the data set for data records meeting the search criteria, wherein the search criteria may include at least one data value to be searched for within at least one of the first data field and the second data field; comparing the at least one data value to at least one of the range of values of the first data field and the range of values of the second data field specified by the super cell index to determine whether the super cell includes any data records that meet the search criteria; and in response to a determination that at least one data record within at least one data cell of the super cell does include a data record that meets the search criteria, comparing the at least one data value to at least one of the range of values of the first data field and the range of values of the second data field specified by the super cell index to determine at least whether the first data cell includes any data records that meet the search criteria.

The method may include: in response to a determination that at least the first data cell does include a data record that meets the search criteria, using at least one of the first unique values index and the second values index to perform a binary search of the data records of the first data cell to identify one or more data records of the first data cell that meet the search criteria; and upon identifying a data record of the first data cell that meets the search criteria, searching at least one of the first set of duplicate value indexes and the second set of duplicate value indexes for a duplicate value index that identifies one or more additional data records of the first data cell that meet the search criteria.

An apparatus includes a processor of a first node device of multiple node devices, and a storage of the first node device to store instructions that, when executed by the processor, cause the processor to perform operations including store, at the first node device, a first super cell of multiple super cells into which a data set is divided from a data file maintained by at least one data device, wherein: the multiple super cells are distributed among the multiple node devices; each super cell includes multiple data cells; each data cell of the multiple data cells includes multiple data records; and each data record of the multiple data records includes a set of data fields at which data values of the data set are stored. The processor may also be caused to store, for each data cell within the first super cell, a cell index that corresponds to the data cell, wherein the cell index may include a first hash values vector that corresponds to a first data field of the set of data fields, and that may include hash values generated from each unique value among the data values stored within the first data field; and receive, at the first node device, from a control device, and at least partially in parallel with other node devices of the multiple node devices, query instructions specifying search criteria of a search to be performed of the data set for data records that meet the search criteria, wherein the search criteria may include at least one data value to be searched for within the first data field. The processor may also be caused to, in response to the receipt of the query instructions, and for each data cell within the first super cell, the processor is caused to perform operations of the search, the operations including: generate a first hash value from a first data value of the at least one data value of the search criteria; compare the first hash value to the hash values within the first hash values vector in the corresponding cell index to determine whether the data cell includes at least one data record that meets the search criteria for at least the first data value; and in response to a determination that the data cell includes at least one data record that meets the search criteria, search the data records of the data cell to identify one or more data records that meet the search criteria. The processor may further be caused to, in response to identifying at least one data record within at least one data cell of the first super cell that meets the search criteria for at least the first data value, the processor is caused to perform operations including: generate results data indicative of the first super cell including at least one data record that meets the search criteria for at least the first data value; and provide the results data to the control device.

A computer-program product tangibly embodied in a non-transitory machine-readable storage medium may include instructions operable to cause a processor of a first node device of multiple node devices to perform operations including store, at the first node device, a first super cell of multiple super cells into which a data set is divided from a data file maintained by at least one data device, wherein: the multiple super cells are distributed among the multiple node devices; each super cell includes multiple data cells; each data cell of the multiple data cells includes multiple data records; and each data record of the multiple data records includes a set of data fields at which data values of the data set are stored. The processor may also be caused to store, for each data cell within the first super cell, a cell index that corresponds to the data cell, wherein the cell index may include a first hash values vector that corresponds to a first data field of the set of data fields, and that may include hash values generated from each unique value among the data values stored within the first data field; and receive, at the first node device, from a control device, and at least partially in parallel with other node devices of the multiple node devices, query instructions specifying search criteria of a search to be performed of the data set for data records that meet the search criteria, wherein the search criteria may include at least one data value to be searched for within the first data field. The processor may also be caused to, in response to the receipt of the query instructions, and for each data cell within the first super cell, the processor is caused to perform operations of the search, the operations including: generate a first hash value from a first data value of the at least one data value of the search criteria; compare the first hash value to the hash values within the first hash values vector in the corresponding cell index to determine whether the data cell includes at least one data record that meets the search criteria for at least the first data value; and in response to a determination that the data cell includes at least one data record that meets the search criteria, search the data records of the data cell to identify one or more data records that meet the search criteria. The processor may further be caused to, in response to identifying at least one data record within at least one data cell of the first super cell that meets the search criteria for at least the first data value, the processor is caused to perform operations including: generate results data indicative of the first super cell including at least one data record that meets the search criteria for at least the first data value; and provide the results data to the control device.

Each of the cell indexes corresponding to the data cells within the first super cell may include a second hash values vector that corresponds to a second data field of the set of data fields, wherein the second hash values vector may include hash values generated from each unique value among the data values stored within the second data field. In response to identifying at least one data record within at least one data cell of the first super cell that meets the search criteria for at least the first data value, and for each data cell within the at least one data cell, the processor may be caused to perform operations of the search, the operations including: generate a second hash value from a second data value of the at least one data value of the search criteria; compare the second hash value to the hash values within the second hash values vector in the corresponding cell index to determine whether the data cell includes at least one data record that meets the search criteria for at least the first data value and the second data value; and in response to a determination that the data cell includes at least one data record that meets the search criteria for at least the first data value and the second data value, search the data records of the data cell to identify one or more data records that meet the search criteria for at least the first data value and the second data value. The processor may also be caused to condition the generation and transmission of results on identification of at least one data record within at least one data cell of the first super cell that meets the search criteria for the first data value and the second data value.

The processor may be caused to perform operations including perform the search corresponding to the first data field on a first thread of execution, and perform the search corresponding to the second data field on a second thread of execution at least partially in parallel with the performance of the search on the first thread. The processor may also caused to allocate a separate processor core of the processor to each of the first and second threads of execution.

Each of the cell indexes corresponding to the data cells within the first super cell may include a unique values vector that corresponds to the first data field, wherein the unique values vector may include a single instance of each data values present within the first data field among the data records of the corresponding data cell, wherein the single instances of each data value are sorted by value. In response to identifying at least one data record within at least one data cell of the first super cell that meets the search criteria for at least the first data value, and for each data cell within the at least one data cell, the processor may be caused to perform operations of the search, the operations including: compare the first data value of the at least one data value of the search criteria to the single instances of data values within the unique values vector to determine whether the data cell includes at least one data record that meets the search criteria for at least the first data value; and condition the search of the data records of the data cell on a determination, via the comparison with the first hash values vector and the comparison with the unique values vector that the data cell that includes at least one data record that meets the search criteria.

The processor may be caused to perform operations including: parse the query instructions to determine whether the query instructions include task instructions for the performance of a task with data retrieved from one or more data records identified as meeting the search criteria; and in response to a determination that the query instructions do include task instructions for the performance of a task, perform operations including: execute the instructions to perform the task at least partially in parallel with at least one other node device of the multiple node devices; and generate the results data to include results of the performance of the task as the indication that the super cell includes at least one data record that meets the search criteria.

The processor may be caused to perform operations including: store, at the first node device, a first super cell index corresponding to the first super cell, wherein the first super cell index may include an indication of a range of values stored within the first data field within the multiple data cells of the first super cell; in response to the receipt of the query instructions, compare the at least one data value of the search criteria to the range of values indicated in the first super cell index to determine whether the first super cell includes at least one data record within at least one data cell of the first super cell that meets the search criteria; and condition the performance of the operations of the search for each data cell within the first super cell on a determination that the first super cell does include at least one data record within at least one data cell of the first super cell that meets the search criteria.

The first node device may include a controller, and the controller may include a controller processor and a controller storage to store other instructions that, when executed by the controller processor, cause the controller processor to perform operations to serve as the control device. The operations may include: receive, at the first node device and from a second node device of the multiple node devices, a second super cell index corresponding to a second super cell stored by the second node device, wherein the second super cell index may include an indication of a range of values stored within the first data field within the at least one data cell of the second super cell; in response to the receipt of the query instructions, compare the data value to the range of values indicated in the second super cell index to determine whether the second super cell includes at least one data record within at least one data cell of the second super cell that meets the search criteria; and in response to a determination that the second super cell includes at least one data record that meets the search criteria, transmit the query instructions to the second node device to enable the second node device to perform the search within the at least one data cell of the second super cell.

The processor may be caused to receive, at the first node device, the first super cell from a data file maintained by at least one data device. The processor may also be caused to index, at the first node device, and at least partially in parallel with other node devices of the multiple node devices, the multiple data records within each data cell of the multiple data cells by the first data field of the set of fields in a single read pass through each data cell of the multiple data cells, wherein for each data record within the data cell, the processor is caused to perform operations including: retrieve a data value from the first data field; determine, based on the data value retrieved from the first data field, whether the first data field of the data record stores a unique data value that has not yet retrieved by the processor from the first data field of any data record of the data cell; and in response to a determination that the first data field of the data record stores a unique data value, add an identifier of the data record to a first unique values index, wherein identifiers of data records within the first unique values index are ordered based on an ordering of the corresponding unique data values in the first data field that is selected to enable use of the first unique values index to perform the search of the data records of the data cell. The processor may be further caused to generate, within a super cell index corresponding to the super cell, an indication of a range of the data values of the first data field within the data records of the data cell to enable use of the super cell index to determine whether the at least one data value of the search criteria is present within the first data field of any data record of the data cell.

The processor is caused to perform operations including: receive, at the first node device, and at least partially in parallel with other node devices of the multiple node devices, a stream of data values of the first super cell from at least one data device; generate, at the first node device, at least partially in parallel with other node devices of the multiple node devices, and according to at least one rule, the multiple data cells of the first super cell from the stream of data values, wherein the at least one rule is selected from group consisting of a rule selected from a group consisting of a minimum data size for a data cell, a maximum data size for a data cell, a minimum quantity of data records for a data cell, a maximum quantity of data records for a data cell, and a specification of the set of data fields; and index, at the first node device, and at least partially in parallel with other node devices of the multiple node devices, the multiple data records within each data cell of the multiple data cells of the first super cell.

A computer-implemented method includes storing, at a first node device of multiple node devices, a first super cell of multiple super cells into which a data set is divided from a data file maintained by at least one data device, wherein: the multiple super cells are distributed among the multiple node devices; each super cell comprises multiple data cells; each data cell of the multiple data cells comprises multiple data records; and each data record of the multiple data records comprises a set of data fields at which data values of the data set are stored. The method may also include storing, for each data cell within the first super cell, a cell index that corresponds to the data cell, wherein the cell index comprises a first hash values vector that corresponds to a first data field of the set of data fields, and that comprises hash values generated from each unique value among the data values stored within the first data field; and receiving, at the first node device, from a control device, and at least partially in parallel with other node devices of the multiple node devices, query instructions specifying search criteria of a search to be performed of the data set for data records that meet the search criteria, wherein the search criteria comprises at least one data value to be searched for within the first data field. The method may also include, in response to the receipt of the query instructions, and for each data cell within the first super cell, performing operations of the search, the operations including: generating a first hash value from a first data value of the at least one data value of the search criteria; comparing the first hash value to the hash values within the first hash values vector in the corresponding cell index to determine whether the data cell includes at least one data record that meets the search criteria for at least the first data value; and in response to a determination that the data cell includes at least one data record that meets the search criteria, searching the data records of the data cell to identify one or more data records that meet the search criteria. The method may further include, in response to identifying at least one data record within at least one data cell of the first super cell that meets the search criteria for at least the first data value, performing operations including generating results data indicative of the first super cell including at least one data record that meets the search criteria for at least the first data value, and providing the results data to the control device.

Each of the cell indexes corresponding to the data cells within the first super cell may include a second hash values vector that corresponds to a second data field of the set of data fields, wherein the second hash values vector comprises hash values generated from each unique value among the data values stored within the second data field. The method may include: in response to identifying at least one data record within at least one data cell of the first super cell that meets the search criteria for at least the first data value, and for each data cell within the at least one data cell, the performing operations of the search, the operations including: generating a second hash value from a second data value of the at least one data value of the search criteria; comparing the second hash value to the hash values within the second hash values vector in the corresponding cell index to determine whether the data cell includes at least one data record that meets the search criteria for at least the first data value and the second data value; and in response to a determination that the data cell includes at least one data record that meets the search criteria for at least the first data value and the second data value, searching the data records of the data cell to identify one or more data records that meet the search criteria for at least the first data value and the second data value. The method may also include conditioning the generation and transmission of results on identification of at least one data record within at least one data cell of the first super cell that meets the search criteria for the first data value and the second data value.

The method may include performing the search corresponding to the first data field on a first thread of execution, and performing the search corresponding to the second data field on a second thread of execution at least partially in parallel with the performance of the search on the first thread. The method may also include allocating a separate processor core of a processor to each of the first and second threads of execution.

Each of the cell indexes corresponding to the data cells within the first super cell may include a unique values vector that corresponds to the first data field, wherein the unique values vector comprises a single instance of each data values present within the first data field among the data records of the corresponding data cell, wherein the single instances of each data value are sorted by value. The method may include, in response to identifying at least one data record within at least one data cell of the first super cell that meets the search criteria for at least the first data value, and for each data cell within the at least one data cell, the perform operations of the search, the operations including: comparing the first data value of the at least one data value of the search criteria to the single instances of data values within the unique values vector to determine whether the data cell includes at least one data record that meets the search criteria for at least the first data value; and conditioning the search of the data records of the data cell on a determination, via the comparison with the first hash values vector and the comparison with the unique values vector that the data cell that includes at least one data record that meets the search criteria.

The method may include: parsing the query instructions to determine whether the query instructions include task instructions for the performance of a task with data retrieved from one or more data records identified as meeting the search criteria; and in response to a determination that the query instructions do include task instructions for the performance of a task, performing operations including executing the instructions to perform the task at least partially in parallel with at least one other node device of the multiple node devices, and generating the results data to include results of the performance of the task as the indication that the super cell includes at least one data record that meets the search criteria.

The method may include: storing, at the first node device, a first super cell index corresponding to the first super cell, wherein the first super cell index comprises an indication of a range of values stored within the first data field within the multiple data cells of the first super cell; in response to the receipt of the query instructions, comparing the at least one data value of the search criteria to the range of values indicated in the first super cell index to determine whether the first super cell includes at least one data record within at least one data cell of the first super cell that meets the search criteria; and conditioning the performance of the operations of the search for each data cell within the first super cell on a determination that the first super cell does include at least one data record within at least one data cell of the first super cell that meets the search criteria.

The first node device may include a controller that comprises a controller processor and a controller storage to store other instructions that, when executed by the controller processor, cause the controller processor to perform operations to serve as the control device. the operations may include: receiving, at the first node device and from a second node device of the multiple node devices, a second super cell index corresponding to a second super cell stored by the second node device, wherein the second super cell index comprises an indication of a range of values stored within the first data field within the at least one data cell of the second super cell; in response to the receipt of the query instructions, comparing the data value to the range of values indicated in the second super cell index to determine whether the second super cell includes at least one data record within at least one data cell of the second super cell that meets the search criteria; and in response to a determination that the second super cell includes at least one data record that meets the search criteria, transmitting the query instructions to the second node device to enable the second node device to perform the search within the at least one data cell of the second super cell.

The method may include receiving, at the first node device, the first super cell from a data file maintained by at least one data device. The method may also include indexing, at the first node device, and at least partially in parallel with other node devices of the multiple node devices, the multiple data records within each data cell of the multiple data cells by the first data field of the set of fields in a single read pass through each data cell of the multiple data cells, wherein for each data record within the data cell, the method may include: retrieving a data value from the first data field; determining, based on the data value retrieved from the first data field, whether the first data field of the data record stores a unique data value that has not yet retrieved by a processor of the first node device from the first data field of any data record of the data cell; and in response to a determination that the first data field of the data record stores a unique data value, adding an identifier of the data record to a first unique values index, wherein identifiers of data records within the first unique values index are ordered based on an ordering of the corresponding unique data values in the first data field that is selected to enable use of the first unique values index to perform the search of the data records of the data cell. The method may include generating, within a super cell index corresponding to the super cell, an indication of a range of the data values of the first data field within the data records of the data cell to enable use of the super cell index to determine whether the at least one data value of the search criteria is present within the first data field of any data record of the data cell.

The method may include: receiving, at the first node device, and at least partially in parallel with other node devices of the multiple node devices, a stream of data values of the first super cell from at least one data device; generating, at the first node device, at least partially in parallel with other node devices of the multiple node devices, and according to at least one rule, the multiple data cells of the first super cell from the stream of data values, wherein the at least one rule is selected from group consisting of a rule selected from a group consisting of a minimum data size for a data cell, a maximum data size for a data cell, a minimum quantity of data records for a data cell, a maximum quantity of data records for a data cell, and a specification of the set of data fields; and indexing, at the first node device, and at least partially in parallel with other node devices of the multiple node devices, the multiple data records within each data cell of the multiple data cells of the first super cell.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 15B illustrates an example of use of multithreaded processing to perform the operations of FIG. 15A.

FIGS. 20A, 20B, 20C, 20D, 20E and 20F, taken together, illustrate an example of searching within a portion of the data set of FIG. 16A within a node device.

FIG. 22 illustrates an example of executing task instructions to perform operations with identified data records of a portion of a data set within a node device.

FIGS. 23A and 23B, taken together, illustrate an example embodiment of a logic flow of generating and using an data set index to search within a data set.

FIGS. 24A and 24B, taken together, illustrate an example embodiment of a logic flow of assigning portions of a data set to node devices and controlling performance of a search.

FIGS. 25A and 25B, taken together, illustrate an example embodiment of a logic flow of generating a portion of a data set index within a node device.

DETAILED DESCRIPTION

Figure 1:
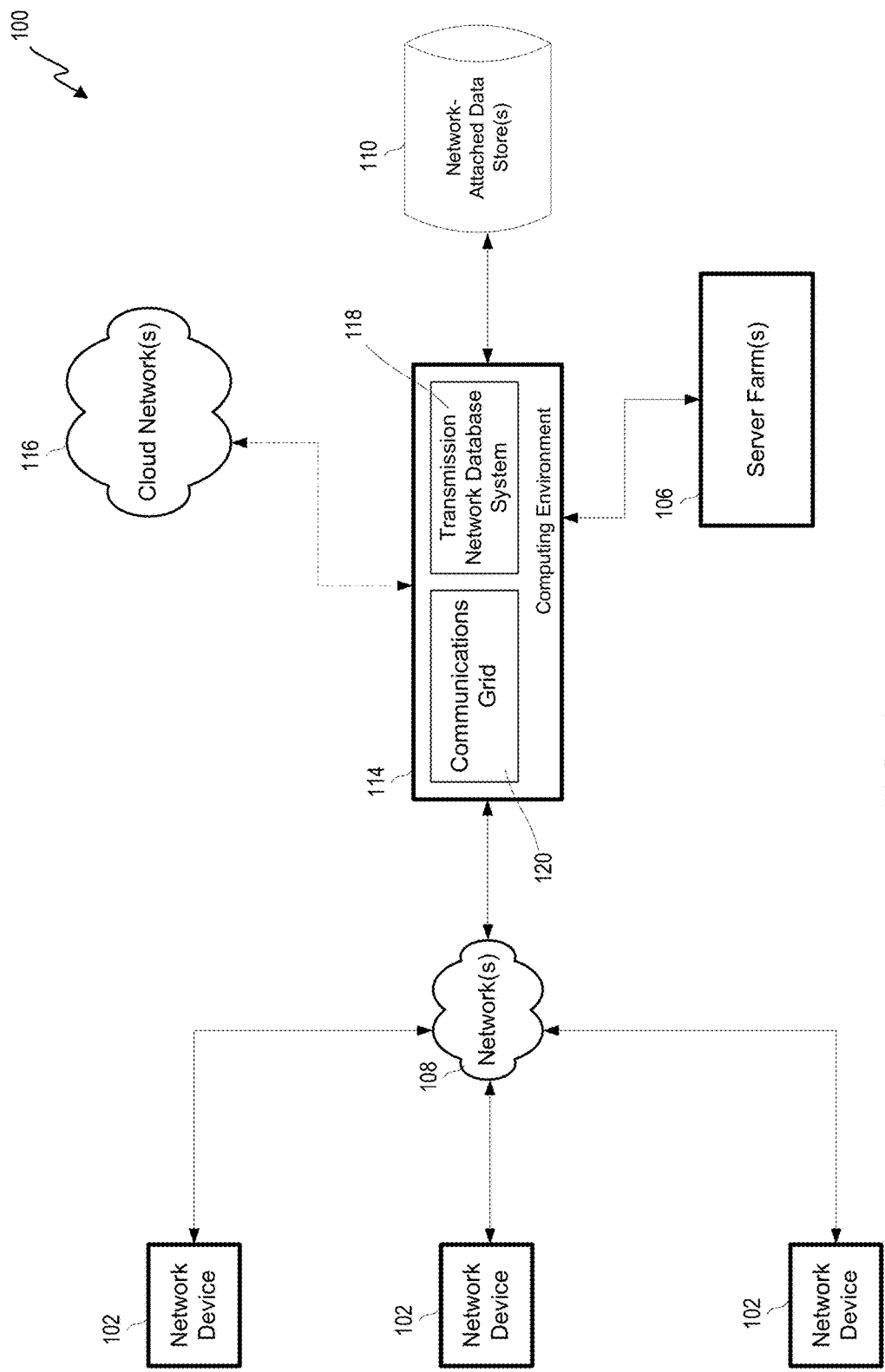
FIG. 1 illustrates a block diagram that provides an illustration of the hardware components of a computing system, according to some embodiments of the present technology.

Various embodiments described herein are generally directed to inter-device coordination to improve distributed indexing in which parallel processing is used to access data of a data set. The data of the data set may be divided into multiple super cells, and the data within each super cell may be further divided into multiple data cells. Within each data cell, the data may be organized into a set of data records that each include an identical set of data fields filled with data values. For each super cell, a set of indexes may be generated by which the data within the super cell may be more speedily accessed, including a super cell index corresponding to the entirety of the super cell and one or more cell indexes that each correspond to one of the data cells within the super cell. Within each cell index, the data records within the corresponding data cell may be indexed by the data values found to be present within a selected subset of the data fields. For each selected data field, a unique values index within each cell index may indicate each of the data values that are present within the data field of at least one of the data records within the corresponding data cell, and one or more duplicate value indexes may identify the data records that are found to contain a duplicate of any of the data values identified in the unique value index. Additionally, within each cell index, and for each of the selected data fields, the cell may be indications of the highest and lowest data values found to be present. Also, within each super cell index, the highest and lowest data values may be indicated for each selected data field across the one or more data cells within the corresponding super cell.

After being generated, the super cell indexes and cell indexes may then be used to increase the efficiency with which data records across the entirety of the data set may be searched in response to a query that includes search instructions that specify one or more discrete data values and/or ranges of data values within one or more specified data fields as search criteria. More specifically, in response to such a query, the indications of highest and lowest data values within the super cell indexes for the specified one or more data fields may be analyzed to identify one or more candidate super cells of the data set that may have data records that meet the search criteria. Then, for each candidate super cell, the indications of highest and lowest data values within the cell indexes for the specified one or more data fields may be analyzed to identify one or more candidate data cells that may have data records that meet the search criteria. Following such narrowing down to candidate data cells, a search for data records that meet the search criteria may then be performed within each candidate data cell.

The data of a data set may be any of a variety of types of data (e.g., societal statistics data, business operations data, raw data from sensors of large scale experiments, financial data, medical treatment analysis data, data from geological or meteorological instruments, streams of data collected from Internet-attached appliances, etc.). The size of the data set may be sufficiently large that accessing and/or processing the data set using a single processing device may be deemed highly impractical. Indeed, it may be that the data set also changes frequently enough over time (e.g., is updated hourly, daily, weekly, etc.) such that the length of time required to access and/or process the data set using a single processing device would yield results that would already be out of date before such operations could be completed. Thus, it may be deemed highly desirable to access and/or process the data set in a distributed and at least partially parallel manner using numerous processor cores able to support numerous threads of execution within a single device, or a group of interconnected devices (sometimes referred to as a "grid" of devices) that each include one or more processors that may each include multiple processor cores.

Therefore, the data set may be distributed across multiple node devices that may each store one or more complete super cells. In some embodiments, such storage of the data set by multiple node devices may be as part of persistently storing the data set for local access to the multiple node devices to enable the data set to remain readily available for processing operations to be performed in a distributed parallel manner among the multiple node devices. In other embodiments, the data set may be temporarily provided to the multiple node devices for such processing from one or more data devices at which the data set may be persistently stored. In still other embodiments, the data set may be built up within the multiple node devices over a period of time, and/or recurringly updated within the multiple node devices, from data values received at the multiple node devices from one or more data devices.

It is envisioned that the data set may be of sufficient size as to necessitate being divided into a great many super cells, and to further necessitate each super cell being divided into a great many data cells. Also, each data cell may contain a great many data records within which data values may be organized to occupy a great many data fields. In embodiments in which the data is organized into a two-dimensional array (e.g., organized into an array of rows and columns), each of the data records may be implemented as a row of a great many rows distributed among the data cells and super cells, and each of the data fields may correspond to a column of a great many columns present within each row. To increase the efficiency with which data may be searched and accessed within the data set, super cell indexes and cell indexes may be distributed among the multiple node devices in a manner in which each super cell index may be stored within a node device alongside its corresponding super cell and each cell index may be stored alongside its corresponding data cell. At least in part to avoid instances in which any one super cell index may be split among, and otherwise shared among, more than one node device, a requirement may be imposed that no super cell is permitted to be split among two or more node devices such that the entirety of each super cell must be stored within a single node device.

As part of keeping each super cell index with its corresponding super cell and each cell index with its corresponding data cell, each transfer of a super cell of the data set between devices may be accompanied by a transfer of its corresponding super cell index and the cell indexes that correspond to the data cells within the super cell. Therefore, in embodiments in which the data set is persisted within one or more data devices, and is temporarily provided to the multiple node devices, each node device may receive one or more whole super cells along with a corresponding one or more super cell indexes and the cell indexes that correspond to each of the data cells within the received one or more super cells. Alternatively, in embodiments in which the data set may be provided to the multiple node devices without any accompanying super cell indexes or cell indexes, including embodiments in which the multiple node devices assemble and/or update the data set from data values received over time, the multiple node devices may generate the corresponding super cell indexes and cell indexes.

Although it may be possible to generate indexes that include all data fields, it is envisioned that the data values of a relatively small subset of the data fields may be used in the search criteria specified in queries that include instructions for searches within the data set. In some embodiments, the subset of data fields used in such search criteria may be well known and may be explicitly specified by rules stored as rules data. In other embodiments, such rules data may alternatively or additionally specify rules and/or heuristic algorithms to identify the subset of data fields based on a history of previous queries and/or other factors. Regardless of the manner in which the subset of data fields is specified and/or identified, the generation of cell indexes and super cell indexes by the multiple node devices may be limited in scope to such a subset of the data fields of a data set.

The generation of the indexes from the data set may begin with the generation of each cell index from the data values found within the subset of data fields of its corresponding data cell. It may be deemed desirable to perform the generation of what may be numerous cell indexes within each node device across numerous threads of execution to bring about at least partially parallel generation of cell indexes within node devices as well as among multiple node devices. More specifically, within each node device, the generation of each cell index may be performed as a separate process with such processes distributed among multiple threads of execution to the extent supported by available processor cores of the processor(s) of each node device.

In generating each cell index, the data values in the subset of data fields within the data records of the corresponding cell are retrieved. As another measure to increase the efficiency with which each cell index is generated, such retrieval of data values for multiple data fields may be performed in a single read pass through the data records of the corresponding data cell. For each cell index that is to be generated, a separate binary tree may be generated for each data field of the subset of data fields within the data records of the single corresponding data cell. As each such binary tree is generated, the various data values that are identified as present within the corresponding data field of the subset of data fields may be sorted in accordance with one or more rules that may be selected based on the type of data within the data field. Also, as each such binary tree is generated, the binary tree may be used to identify any duplicates of any of the data values identified as present within the corresponding data field. As duplicates among data values within a data field are identified, tables and/or other data structures may be generated that correlate each instance of a duplicate data value to an identifier of the data record in which the duplicate data value is present.

With a binary tree for each data field of the subset of data fields so generated for a single data cell, a separate index of unique values may be generated within the corresponding cell index from each binary tree. Within each unique values index, the identifiers of the data records within which each unique data value was identified may be arranged in an order that corresponds to the order into which the unique data values were sorted during generation of the corresponding binary tree. Generation of each unique values index may entail an in-order traversal of the corresponding binary tree. Each unique values index may also include and/or be accompanied by a count of the unique data values, indications of highest and lowest unique data values that were identified within the corresponding data field of the data records of the corresponding data cell, and/or highest and lowest hash values generated from the unique data values.

In some embodiments, one or more of the unique values indexes may include and/or be accompanied by a vector or other data structure of the unique data values also arranged in the order that corresponds to the order into which the unique data values were sorted during generation of the corresponding binary tree. Alternatively or additionally, one or more of the unique values indexes may include and/or be accompanied by a vector or other data structure of ordered hash values derived from the unique data values. In some of such embodiments, the determination of whether a vector of unique values and/or whether a vector of hash values is generated for each unique values index within a cell index may be based on the identified data type of the data values within the corresponding data field. By way of example for numeric values and/or fixed length text strings, a vector of the unique data values may be generated. However, data of variable data size and/or of large data size, such as audio and/or video streams or text strings of variable length, a vector of hash values derived from each of the data values may be generated.

Where there are one or more tables or other data structures that have been generated to indicate duplicates of data values identified within one or more data fields, such one or more tables or other data structures may be used to generate one or more indexes of duplicate values within the cell index. In some embodiments, each duplicate value index may be separately generated for a single duplicated data value, and may specify the one or more data records within the corresponding data cell in which each duplicate of the data value is present. Each such duplicate value index may also include a count of the duplicates of the data value within the corresponding data field of the data records of the corresponding data cell.

Following the generation of a cell index for each data cell of a super cell, the generation of indexes for the super cell may continue with the generation of a corresponding super cell index. As with the generation of the cell indexes, it may be deemed desirable to perform the generation of what may be numerous super cell indexes within each node device across numerous threads of execution to bring about at least partially parallel generation of super cell indexes within node devices as well as among multiple node devices. More specifically, within each node device, the generation of each super cell index may be performed as a separate process, and distributed among multiple threads of execution to the extent supported by available processor cores of the processor(s) of each node device.

Each super cell index may be generated to include indications of the highest and lowest data values identified within each data field of the subset of data fields across the data cells within the corresponding super cell. Additionally, each super cell index may be generated to include indications of the highest lowest hash values among the highest and lowest hash values generated from unique data values for each data cell. In generating each indication of the highest and lowest data values for a data field within the super cell index, the highest and lowest data values for the data field within each of the cell indexes for one of the data cells of the corresponding super cell may be retrieved, and the highest and lowest among the retrieved data values may be selected. More specifically, a binary tree may be generated using the highest and lowest values indicated within each cell index for a data field among the data cells of a super cell, and then the highest and lowest values for the data field within the data records throughout the super cell may be identified from the binary tree. A similar approach may be used to generate each indication of the highest and lowest hash values. With a cell index having been generated for each data cell, and with a super cell index having been generated for each super cell within a node device, the portion of a data set stored within the node device is indexed such that searches for data records within each of the super cells may be performed more efficiently and quickly.

The multiple node devices may be controlled by a control device or a controller incorporated into one of the multiple node devices. Such a control device or controller may control the manner in which the super cells of a data set may be distributed among the multiple node devices. More specifically, where the multiple node devices are provided the data set in its entirety by one or more data devices, the control device or controller may determine which super cells of the data set are to be provided to each of the node devices. Alternatively, where the data set is to be generated by the multiple node devices from data values collected by the multiple node devices over time from one or more data devices, the control device or controller may determine the quantity and/or size of each super cell to be generated within each node device. Such determinations by the control device or controller may be based on indications of currently available processing, storage, network and/or other resources that may be recurringly provided to the control device or controller by each of the node devices. Alternatively or additionally, such determinations may be based on rules and/or an algorithm for achieving a distribution of the data set among the multiple node devices that incorporates some degree of redundancy to avoid loss of data as a result of a failure occurring within one or more of the node devices.

The control device or controller may serve as a receiver of queries from requesting devices, where each query may include instructions to perform a search within the data set for data record(s) meeting specified search criteria. In some embodiments, the control device or controller may simply relay the query to each node device of the multiple node devices. Alternatively, the control device or controller may select a subset of the multiple node devices to relay the query to based on the distribution of super cells and redundant copies of super cells among the multiple node devices to at least reduce instances of having more than one node device engaged in determining whether the same super cell is a candidate super cell. Regardless of whether the control device or controller relays the query to all of the multiple node devices, or to only to a selected subset, each node device that receives the query may then perform various operations to identify any candidate super cells that may have one or more data cells that may have one or more data records that meet specified search criteria. Each node device that stores at least one candidate super cell may then perform operations to identify any candidate data cells within each any candidate super cell that may have one or more data records that meet the specified criteria.

In other embodiments, it may be the control device or controller that performs the operations needed to determine which super cells are candidate super cells as part of reducing the number of node devices to which the query may be relayed. In support of this, each of the node devices of the multiple node devices may provide each of the super cell indexes that it generates and/or stores to the control device or controller. Upon receiving a query, the control device or controller may then use the set of super cell indexes provided by the multiple node devices to identify the one or more candidate super cells that may each include one or more data cells that may each include one or more data records that meet the search criteria. The control device or controller may then relay the query to a subset of the multiple node devices that store the candidate super cells. Each node device that receives the query may then perform operations to identify any candidate data cells within any candidate super cell that may have one or more data records that meet the specified criteria. The control device or controller may further reduce the subset of the multiple node devices based on the distribution of super cells and redundant copies of super cells among the multiple node devices to at least reduce instances of having more than one node device engaged in determining whether the same candidate super cell is a candidate super cell.

Regardless of whether it is the control device or controller that performs operations to identify candidate super cells, or it is at least a subset of the node devices that performs such operations, identifying candidate super cells may entail comparing the one or more discrete data values and/or ranges of data values specified as the search criteria in the query to the range(s) of data values defined in each super cell index with indications of highest and lowest data values therein. By way of example, if the search criteria of a query indicates that a specific data value or a data value within a specific range of data values is required to be present in a specific data field of any data record that meets the search criteria, and if such a data value or range of data values so specified by the query falls entirely outside the range of data values defined by the highest and lowest data values indicated in a super cell index for the specific data field, then the corresponding super cell cannot be a candidate super cell. Further, in embodiments in which the super cell indexes include an indication of a range of hash values defined by highest and lowest hash values for the specific data field, and in which the query specifies one or more discrete data values as the search criteria, a hash value may be generated from each such specific data value, and each such hash value may be compared to the range of hash values indicated in the super cell index as an additional test of whether the corresponding super cell can be a candidate super cell. Similarly, within each node device that stores one or more candidate super cells, identifying candidate data cells within each candidate super cell may entail a similar comparison of the data values and/or ranges of data values specified as the search criteria in the query to the range(s) of data values defined in each cell index with indications of highest and lowest data values therein. Further, such identification of candidate data cells may additionally entail the comparison of hash value(s) generated from specific data value(s) specified as the search criteria in the query to the range(s) of hash values that may be defined in each cell index with indications of highest and lowest hash values therein.

As with the aforedescribed generation of super cell indexes and cell indexes, it may be deemed desirable to perform the operations to identify candidate super cells and/or candidate data cells across numerous threads of execution to bring about at least partially parallel performances of operations to identify candidate super cells and/or candidate data cells. Therefore, where the identification of candidate super cells is performed within the control device or controller, such operations may be performed in a separate process for each super cell index, and distributed among multiple threads supported by available processor cores of the processor(s) of the control device or controller. Alternatively, where the identification of candidate super cells is performed by at least a subset of the multiple node devices, such operations may be performed in a separate process for each super cell index, and distributed among multiple threads supported by available processor cores of the processor(s) of each of the corresponding node devices. Similarly, within each of the node devices that are identified as storing at least one candidate super cell, the operations to identify candidate data cells may be performed in a separate process for each cell index corresponding to a data cell of a candidate super cell, and each such separate process may be distributed among multiple threads supported by available processor cores of the processor(s) of each of the corresponding node devices. Each node device to which the query is relayed, and in which no candidate data cells have been identified, may transmit an indication to the control device or controller that no data records meeting the search criteria have been found, and may then cease to take any further action in response to receiving the query.

In each node device in which at least one candidate data cell has been identified, the data records within each such candidate data may then be searched to identify one or more data records that meet the search criteria. In embodiments in which the unique values index for a data field within the cell index of a candidate data cell does not include or is not accompanied by a vector or other data structure of either the unique data values or hash values generated from the unique data values, the identifiers of data records that include each unique data value, and/or one or more duplicate value indexes, may be used to guide a search through the data records within the candidate data cell. However, in embodiments in which the unique values index for a data field within the cell index of a candidate data cell does include or is accompanied by a vector or other data structure of either the unique data values or hash values generated therefrom, such a vector or data structure may be used to determine whether there are any data records in the candidate data cell that meet the search criteria. If it is determined that there is at least one such data record in embodiments in which the vector or other data structure is of hash values generated from the unique data values, then a search among the data records to retrieve the one or more data records that meet the search criteria may be performed. In contrast, if it is determined that there is at least one such data record in embodiments in which the vector or other data structure is of the unique data values, then the need to perform such a search may be obviated as a result of each of the unique data values within the vector or other data structure already being correlated by the unique values index to the data record in which it is present.

Any of a variety of search algorithms may be employed in performing each search associated with each data field. Alternatively or additionally, a combination of search algorithms may be used in which an initial search algorithm is used to identify a first data record that meets the search criteria for a specific data field, and then a different search algorithm may be used to search for any more data records that meet the search criteria for the specific data field. Where the search criteria involves more than one data field, for each candidate data cell, an analysis may be made of the counts of unique data values and of duplicates of each data value to determine the relative degrees of cardinality of the data values among the data records within the candidate data cell for each of the data fields involved in the search criteria. Then, for each candidate data cell, a determination based on relative cardinality may be made of the order in which the more than one data fields are to be searched as part of searching for data records that meet the search criteria. Each node device to which the query is relayed, and in at least one candidate data cell was identified, but in which no data records were found that meet the search criteria, may transmit an indication to the control device or controller that no data records meeting the search criteria have been found, and may then cease to take any further action in response to receiving the query.

In each node device in which at least one data record is identified that meets the search criteria, any of a variety of actions may be taken in response to having identified at least one data record that meets the search criteria specified in a query, and the particular actions taken may depend on further instructions included in the query. By way of example, where the query includes a request for an indication of which data records meet the search criteria, each node device in which at least one of such data records is found may transmit a bit field or other data structure to the control device or controller that identifies the one or more data records stored within the node device that meet the search criteria. Where the query includes a request for one or more data values to be retrieved from any data record that meets the search criteria, each node device in which at least one of such data records is found may transmit the requested data values from each such data record, or may transmit the entirety of each such data record to the control device or controller. Where the query includes further instructions to perform one or more processing operations with data values retrieved from any data records that meet the search criteria, each node device in which at least one of such data records is found may perform the specified processing operations on such specified data values and may transmit an indication of the results of the specified processing operations to the control device or controller.

As with the aforedescribed performances of operations to identify candidate super cells and/or candidate data cells, it may be deemed desirable to perform the searches of data records within each candidate data cell, as well as any specified processing operations with data values retrieved from data records that meet the search criteria, across numerous threads of execution. Therefore, within each of the node devices that are identified as storing at least one candidate data cell, the operations to search through the data records within candidate data cells may be performed in a separate process for each candidate data cell, and each such separate process may be distributed among multiple threads supported by available processor cores of the processor(s) of each of the corresponding node devices. Also, within each of the node devices that are identified as storing at least one candidate data cell in which at least one data record is identified that meets the search criteria, any processing operations that are specified in the received query to be performed with data values from such data records may be performed in a separate process for each such candidate data cell, and each such separate process may also be distributed among multiple threads supported by available processor cores of the processor(s) of each of the corresponding node devices.

It should be noted that, although the use of binary trees is explicitly discussed herein in some detail for distinguishing between unique and duplicate values, identifying highest and lowest values, and sorting values, other approaches may be employed in performing one or more of these operations, either in place of using binary trees or in combination with binary trees. By way of example, skip lists may be used to perform one or more of these functions. Further, although the use of binary searching techniques is explicitly discussed herein in some detail to perform searches of data cells to identify data records that meet search criteria, other approaches may be employed in performing such searches, either in place of binary search techniques or in combination with binary search techniques. By way of example, skip lists may be used in combination with binary searching techniques.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
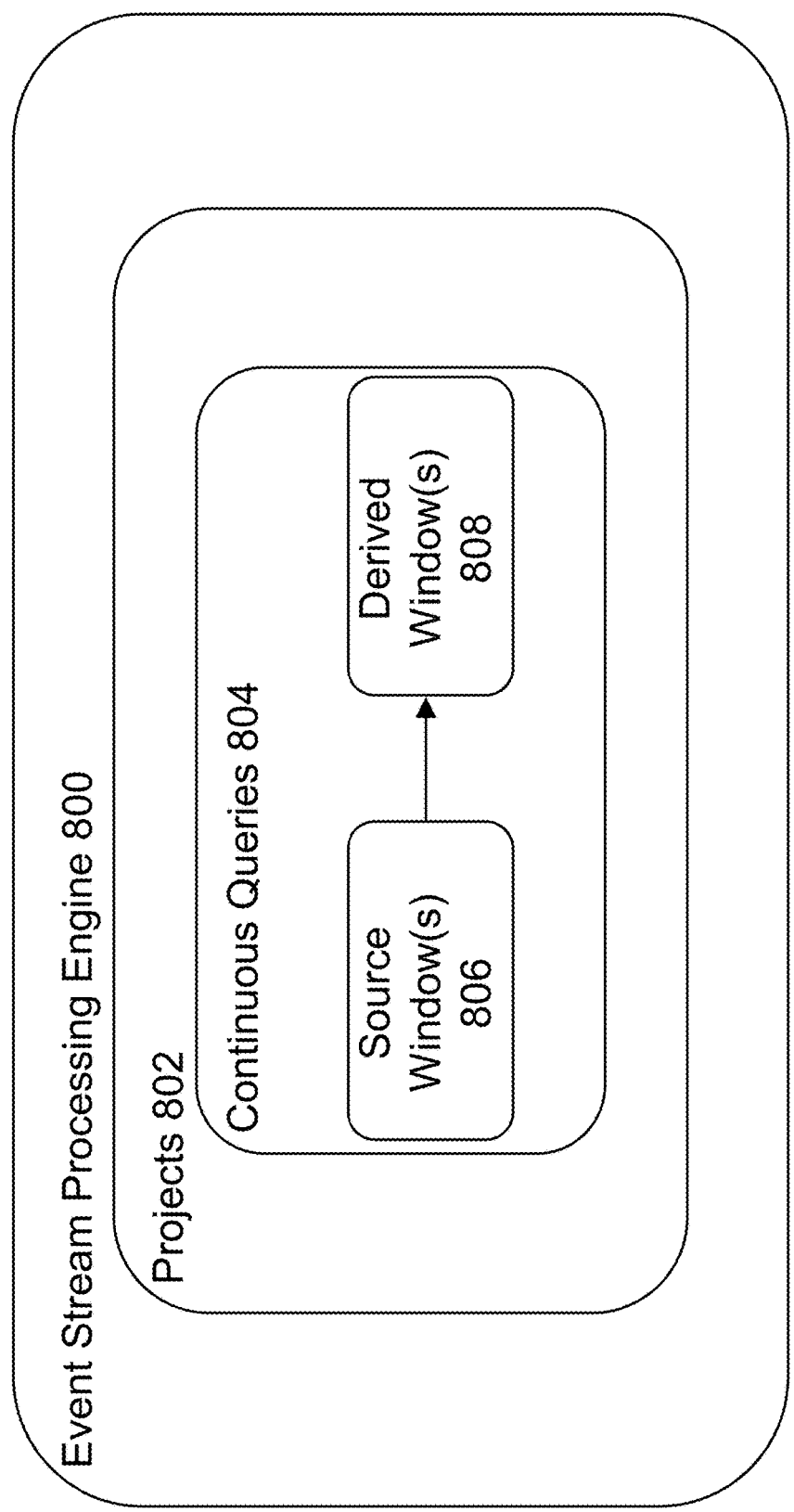
FIG. 8 illustrates a block diagram including components of an Event Stream Processing Engine (ESPE), according to embodiments of the present technology.
Figure 9:
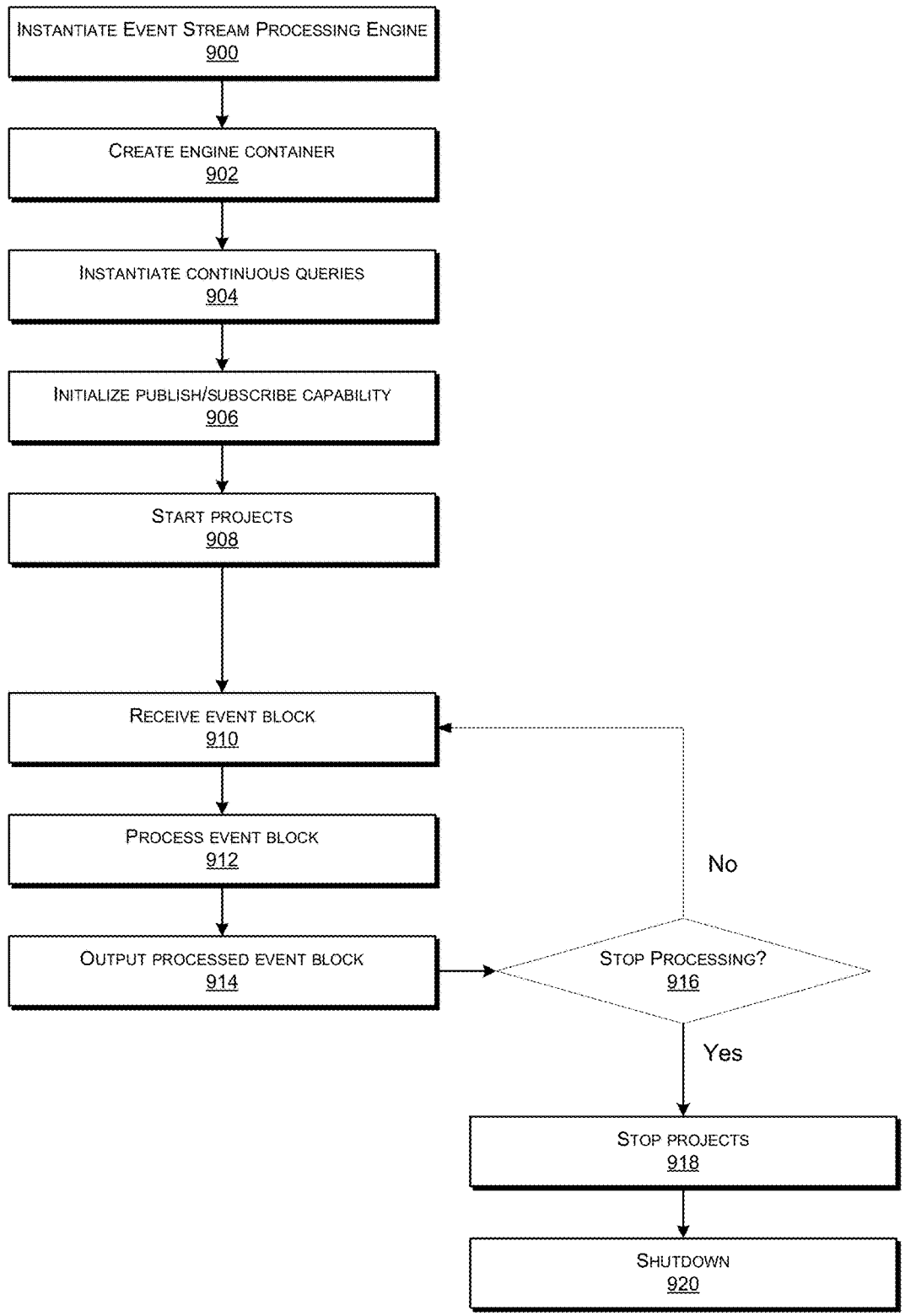
FIG. 9 illustrates a flow chart showing an example process including operations performed by an event stream processing engine, according to some embodiments of the present technology.
Figure 10:
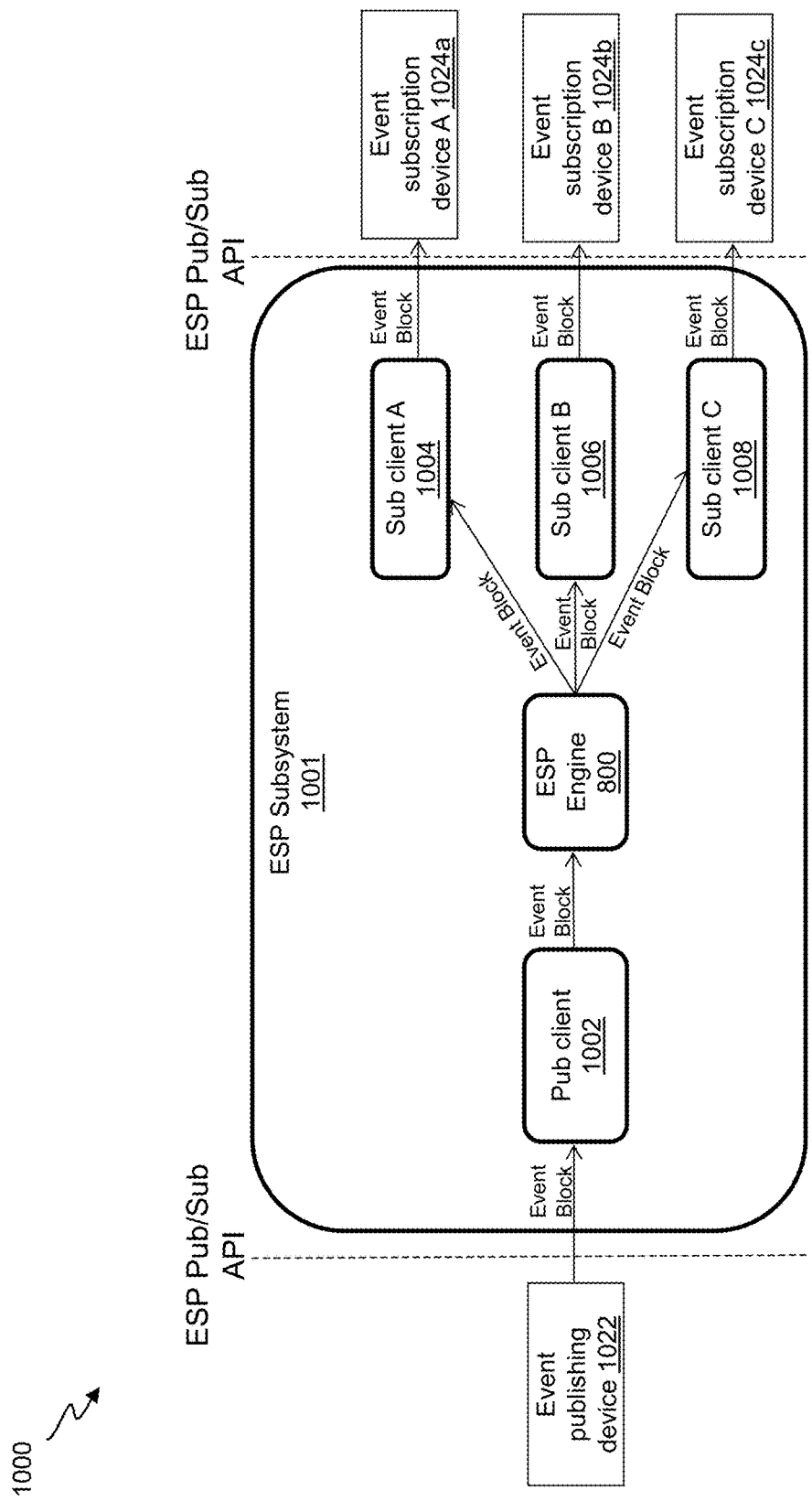
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
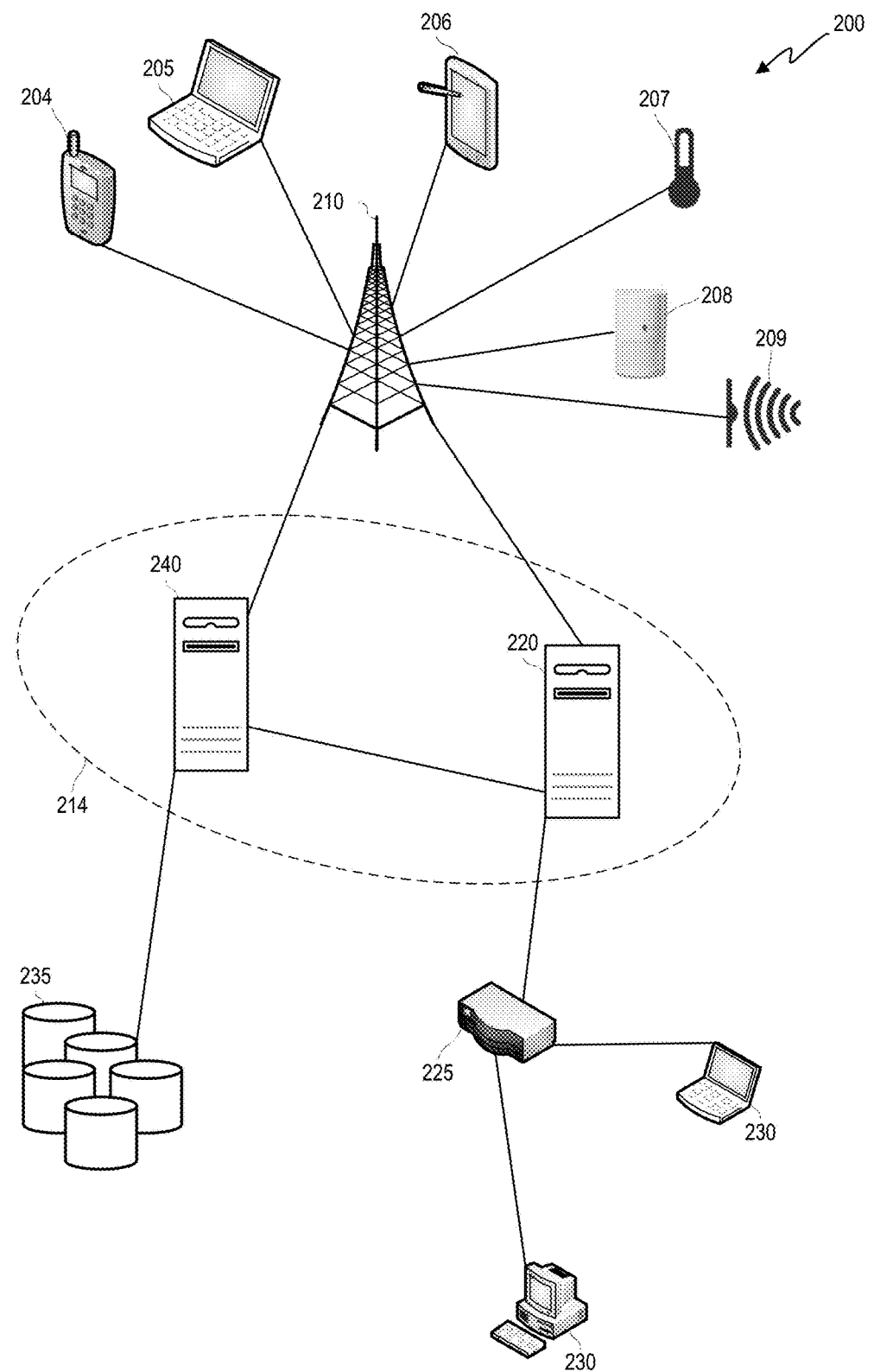
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
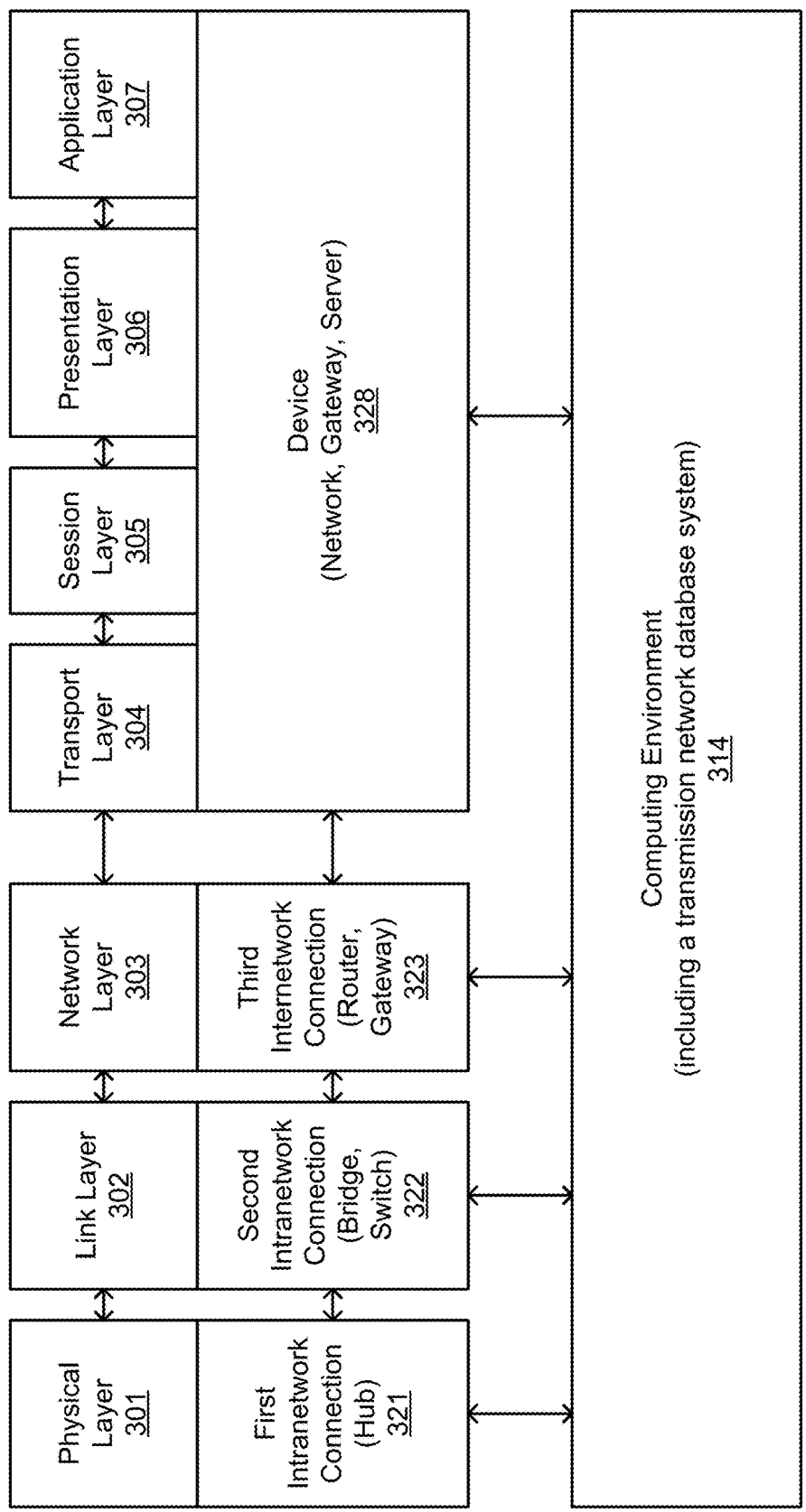
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
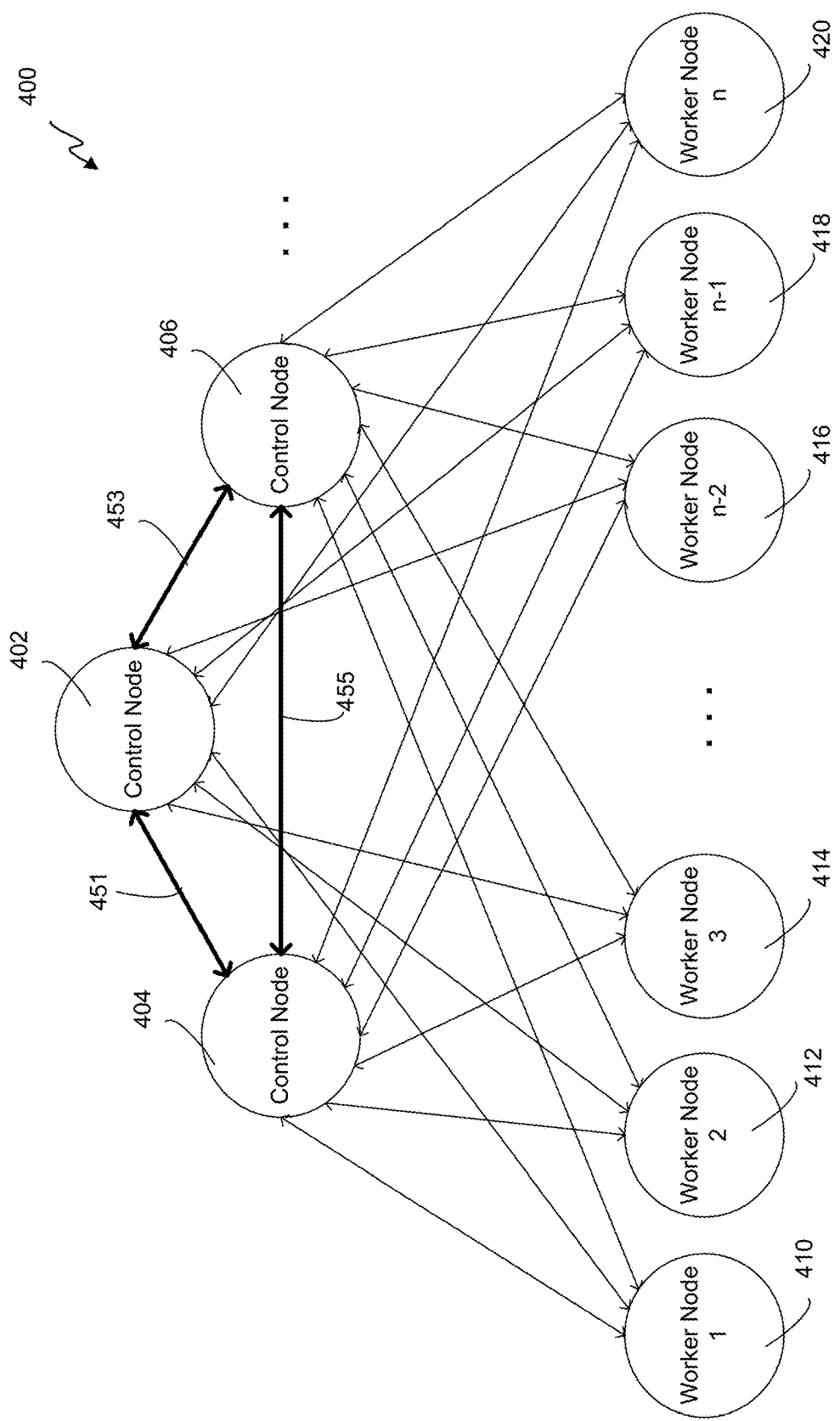
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
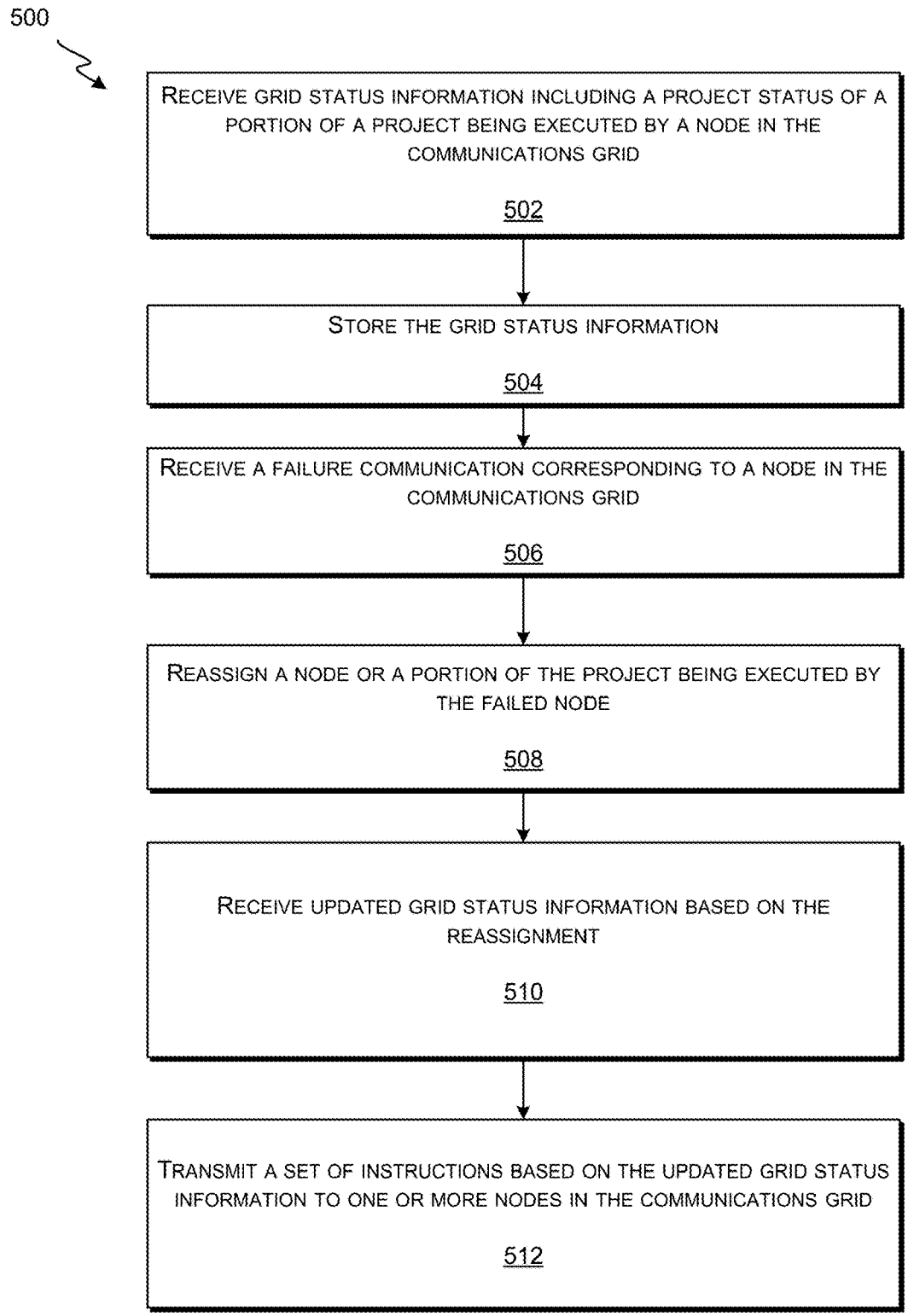
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
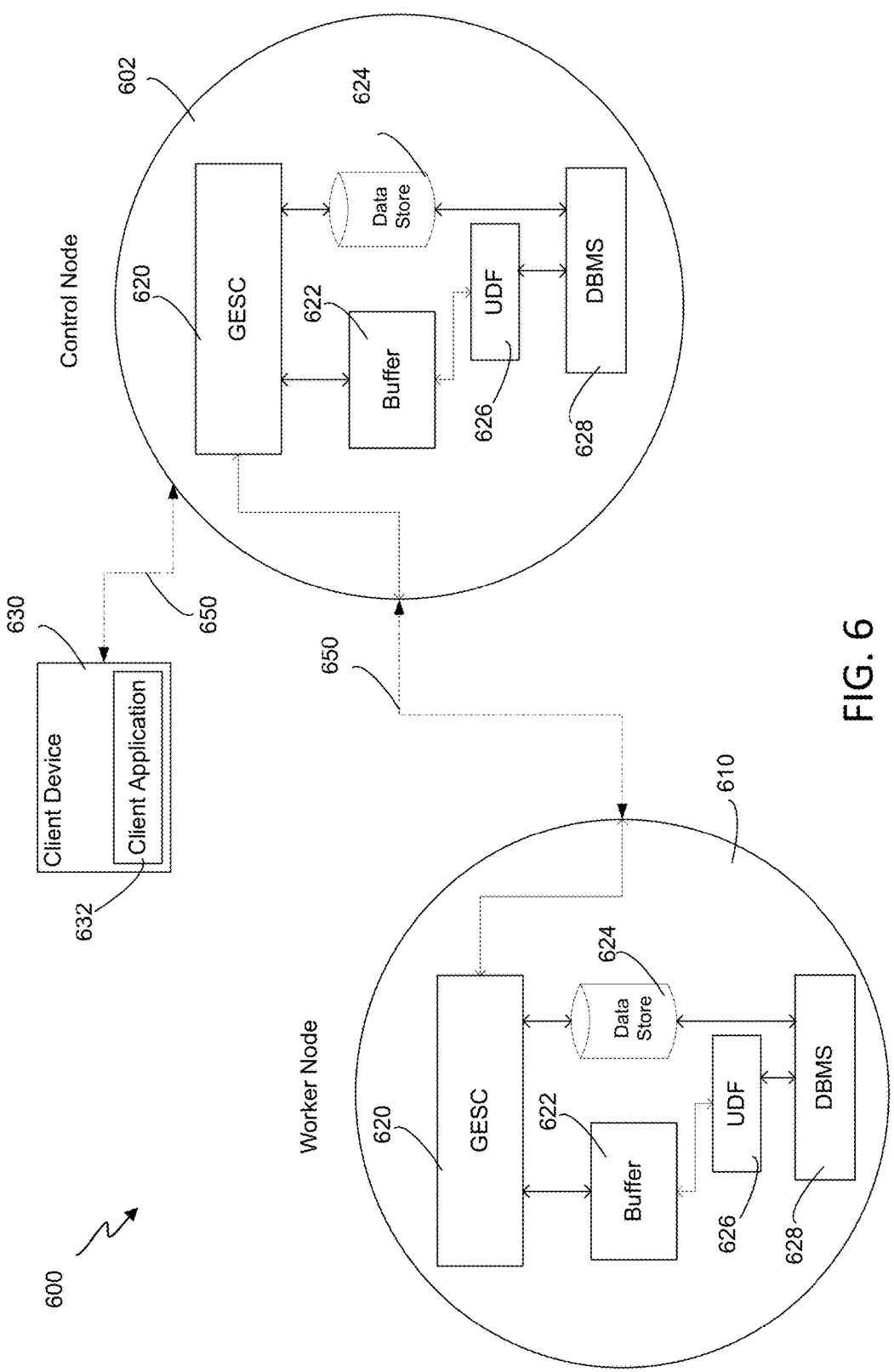
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
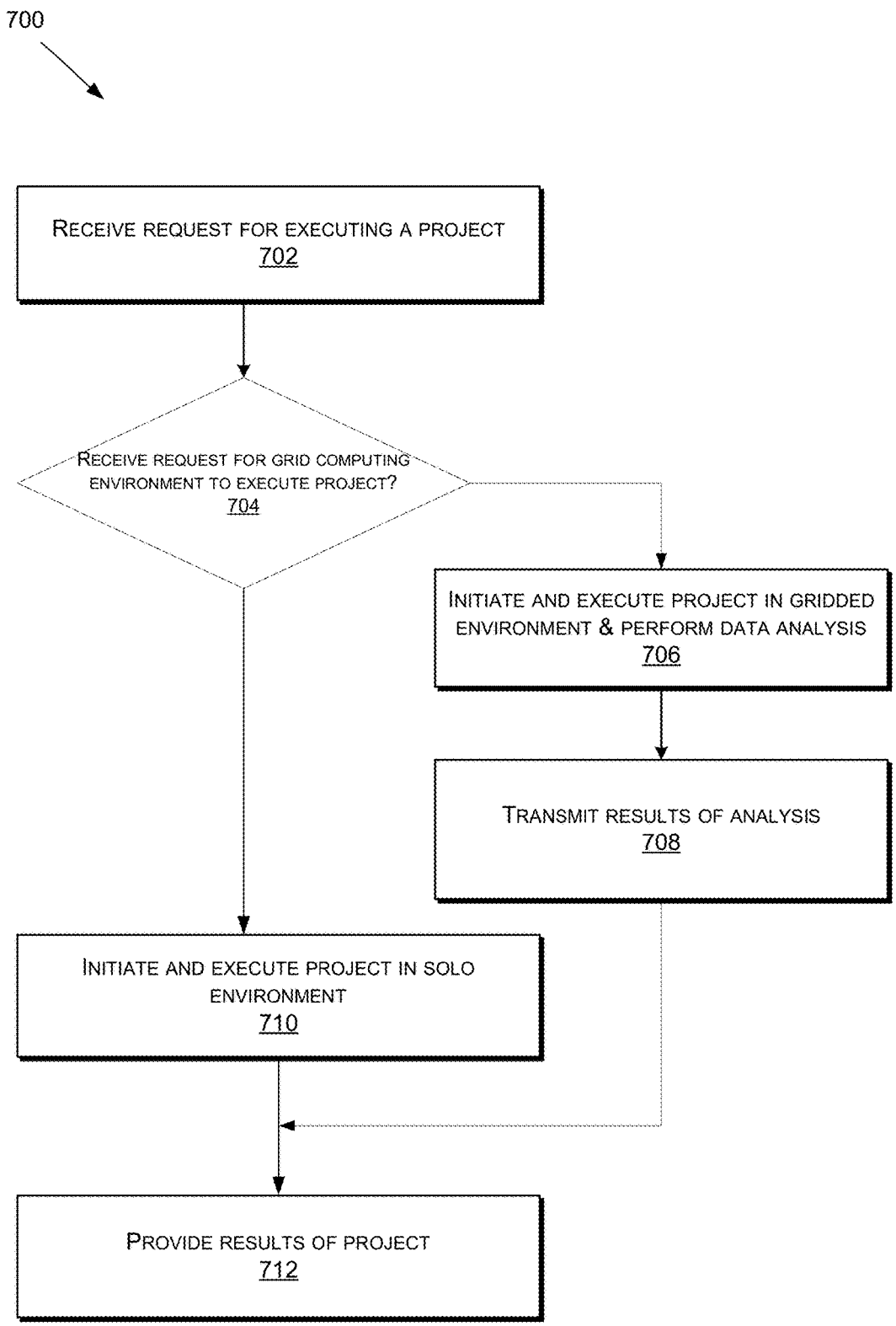
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
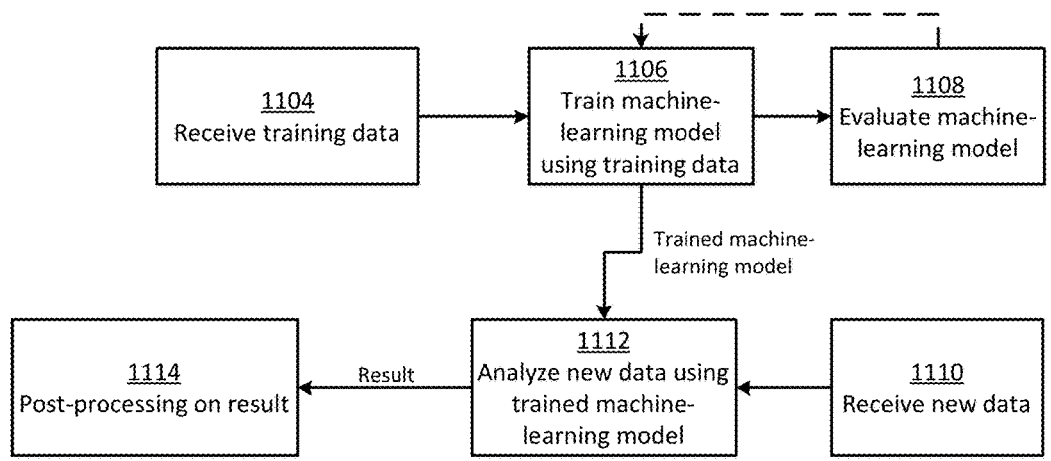
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
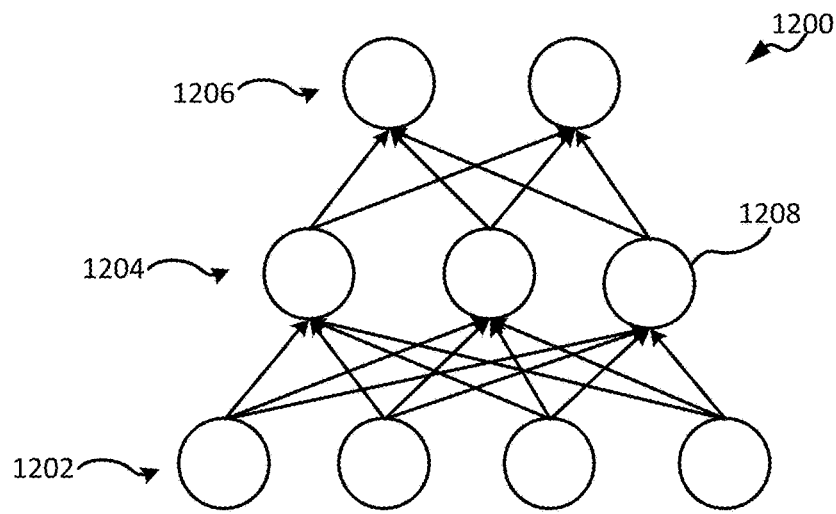
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
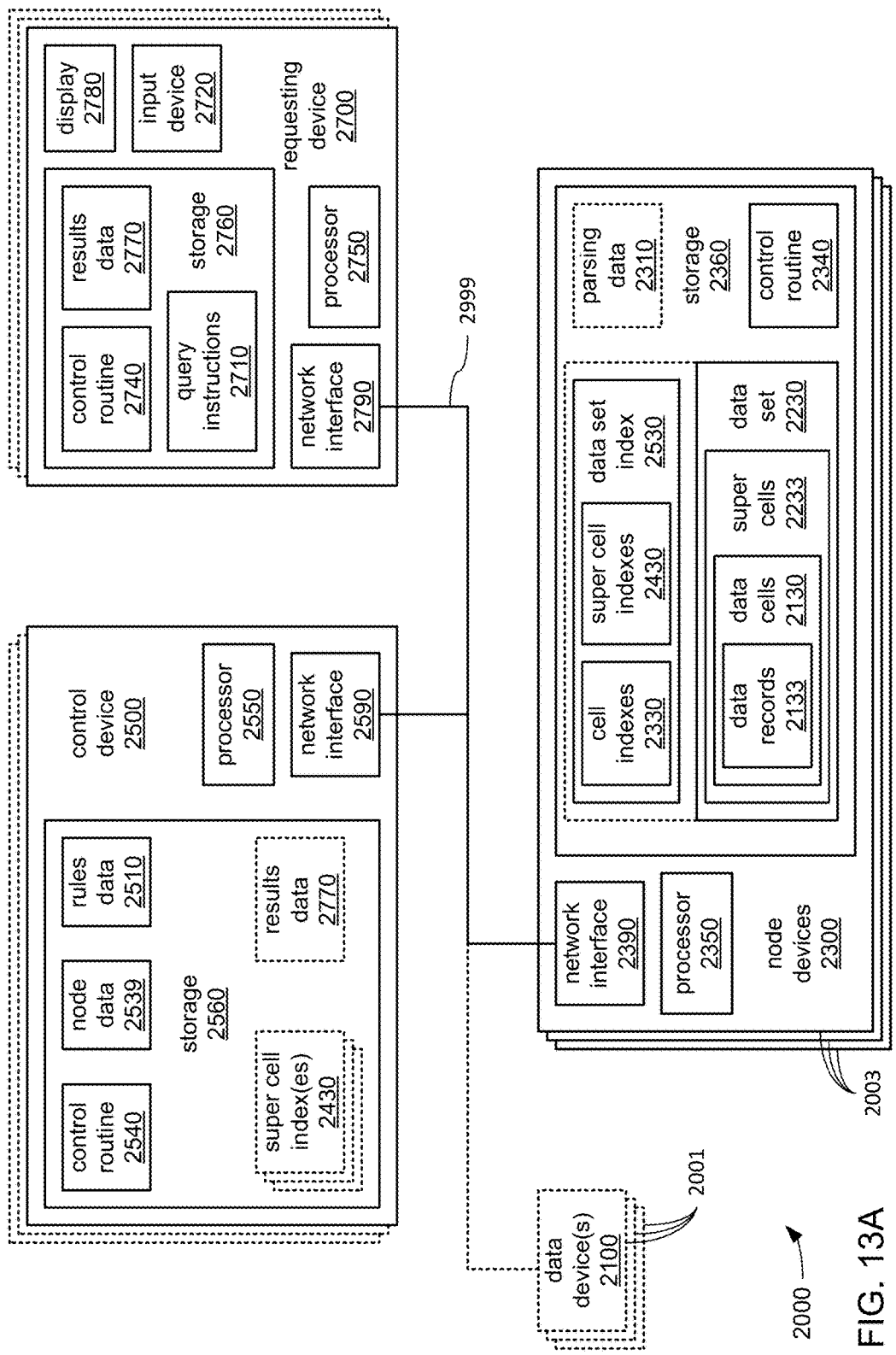
FIGS. 13A and 13B each illustrate an example embodiment of a distributed processing system.
Figure 13B:
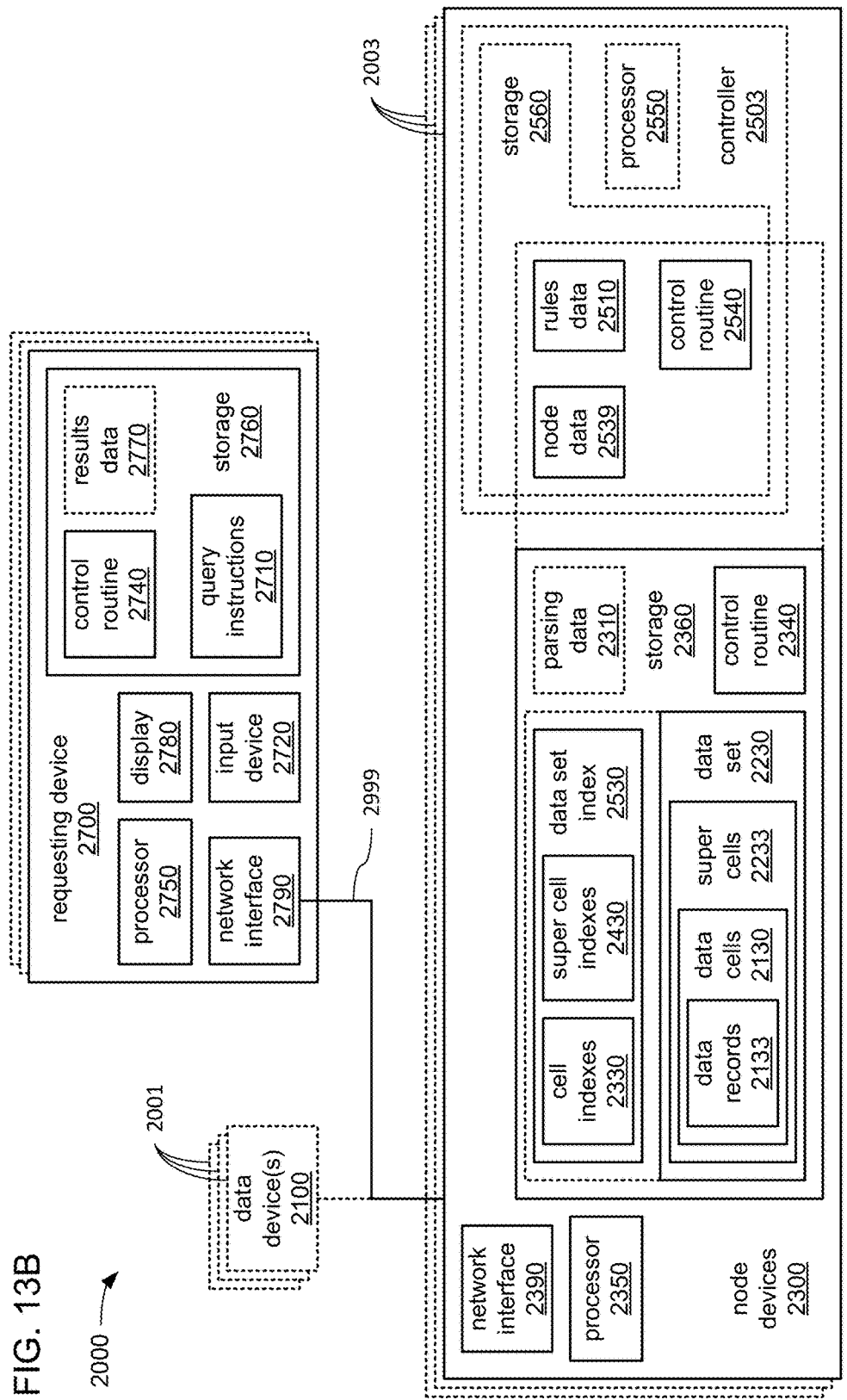

FIG. 13A illustrates a block diagram of an example embodiment of a distributed processing system 2000 incorporating one or more data devices 2100, one or more node devices 2300 that form of a node device grid 2003, at least one control device 2500 and/or at least one requesting device 2700 coupled by a network 2999. FIG. 13B illustrates a block diagram of an alternate example embodiment of the distributed processing system 2000 in which one of the node devices 2300 may incorporate a controller 2503 to perform the functions of the control device 2500. In both of the embodiments of FIGS. 13A and 13B, the data device(s) 2100 may provide the node device(s) 2300 a data set 2230 (or data values by which the node device(s) 2300 may assemble the data set 2230), and the node device(s) 2300 may perform any of a variety of operations with the data set 2230 under the control of the control device 2500 (or controller 2503). Such operations may be performed in response to instances of query instructions 2710 transmitted to the control device 2500 (or controller 2503) by one or more of the requesting device 2700, and results data 2770 indicative of the results of such operations may be transmitted by the control device 2500 (or controller 2503) back to the requesting device 2700. To enable the performance of such operations by the node device(s) 2300, the data device(s) 2100 may provide the node device(s) 2300 with a data set index 2530. Alternatively, the node device(s) 2300 may generate the data set index 2530.

In support of such operations, the devices 2100, 2300, 2500 and/or 2700 may exchange portions of the data set 2230, portions of the data set index 2530, the query instructions 2710, the results data 2770, and/or other commands and/or data concerning assembling, indexing, searching and/or performing operations with the data set 2230. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

The data of a data set 2230 may be any of a variety of types of data concerning any of a wide variety of subjects, including and not limited to, technical or scientific data, patient or sociological data, shipping or activity tracking data, historical or real-time event data, geological or meteorological data, etc. As will be explained in greater detail, it is envisioned that the data set 2230 may be sufficiently large in size such that storage and/or processing of the entirety of the data set 2230 within a single device may be deemed to be at least impractical, if not impossible. Therefore, to facilitate storage and/or processing of the data set 2230 in a distributed manner across multiple devices, the data set 2230 may be divided into multiple super cells 2233, that may each be divided into multiple data cells 2130, that may each, in turn, be divided into multiple data records 2133. As will also be explained in greater detail, to enable distribution of the data set index 2530 alongside the data set 2230, the data set index 2530 may be divided up into multiple super cell indexes 2430 that each correspond to one of the super cells 2233, and cell indexes 2330 that each correspond to one of the data cells 2130.

In some embodiments, the data devices 2100 may form a grid or other type of assemblage of multiple storage devices (e.g., a network-attached drive array, etc.) that may serve primarily to store data, such as the data set 2230. In such embodiments, the data devices 2100 may be capable of exchanging the entirety of the data set 2230 with the node devices 2300 in a set of data transfers through the network 2999 that may be coordinated by the control device 2500 (or controller 2503). In such an exchange of the data set 2230, the data set index 2530 may be exchanged along with the data set 2230.

However, in other embodiments, the data devices 2100 may be a multitude of devices of any of a variety of types that each provide data values and/or streams of data values to the node devices 2300 to enable the node devices 2300 to assemble the data set 2230 therefrom. In such other embodiments, each of the data devices 2100 may be any of a variety of types of device that may serve as a source of data. More specifically, and depending on the content of the data set 2230, each of the data devices 2100 may be any of a variety of types of sensor taking physical or other measurements, any of a variety of types of recording device that records audio/video and/or other physical phenomenon, any of a variety of types of server that provides an online service and/or maintains accounts for the provision of services, any of a variety of types of equipment that provides a utility or building operations service, any of a variety of types of Internet-attached appliance that performs a function in a commercial or home environment, etc. In such other embodiments, in addition to assembling the data set 2230 from data values and/or streams of data values received from the data devices 2100, the node devices 2300 may recurringly generate the data set index 2530 from the data set 2230 as the data set 2230 is so assembled and/or updated.

In various embodiments, each of the multiple node devices 2300 may incorporate one or more of a processor 2350, a storage 2360 and a network interface 2390 to couple each of the node devices 2300 to the network 2999. The storage 2360 may store a portion of the data set 2230, a corresponding portion of the data set index 2530, a control routine 2340 and/or parsing data 2310. As indicated with dotted lines, and as will be explained in greater detail, the data set index 2530 may be incorporated into the data set 2230 in some embodiments. Alternatively, and as will also be explained in greater detail, the data set 2230 may at least routinely be accompanied by the data set index 2530 whenever and/or wherever the data set 2230 is exchanged between devices and/or stored. The control routine 2340 may incorporate a sequence of instructions operative on the processor 2350 to implement logic to perform various functions. In some embodiments, in executing the control routine 2340, the processor 2350 of each of the node devices 2300 may be caused to operate the network interface 2390 to receive a portion of the data set 2230 and/or a corresponding portion of the data set index 2530 from the data devices 2100 via the network 2999 at least partially in parallel with others of the node devices 2300. In other embodiments, in executing the control routine 2340, the processor 2350 of each of the node devices 2300 may be caused to operate the network interface 2390 to receive data values, or one or more streams of data values, from one or more data devices 2100 via the network 2999, and may assemble a portion of the data set 2230 from the received data values at least partially in parallel with others of the node devices 2300. In such other embodiments, the processor 2350 of each of the node devices 2300 may be caused to recurringly generate a corresponding portion of the data set index 2530.

Regardless of whether the data set 2230 and/or the data set index 2530 are received by or generated by the node devices 2300, in further executing the control routine 2340, the processor 2350 of each of at least a subset of the node devices 2300 may receive instructions from the control device 2500 (or the controller 2503) to perform one or more specified operations with the data set 2230, at least partially in parallel with others of the node devices 2300, and to transmit the results of such operations back to the control device 2500 (or the controller 2503) via the network 2999. Among such received instructions may be a relayed copy of the query instructions 2710, which may include instructions to at least perform a search of the data set 2230 for one more data records 2133 that meet search criteria specified in the query instructions 2710. In some embodiments, instances of the query instructions 2710 may additionally include task instructions for the performance of one or more additional processing operations with data values retrieved by the search to perform a processing task therewith.

In various embodiments, the control device 2500 may incorporate one or more of a processor 2550, a storage 2560 and a network interface 2590 to couple the control device 2500 to the network 2999. The storage 2560 may store rules data 2510, node data 2539, a control routine 2540, multiple ones of the super cell indexes 2430, and/or the results data 2770. The control routine 2540 may incorporate a sequence of instructions operative on the processor 2550 to implement logic to perform various functions. In executing the control routine 2540, the processor 2550 may be caused to operate the network interface 2590 to coordinate the aforedescribed at least partially parallel exchanges of the data set 2230 and/or the data set index 2530 between the data devices 2100 and the node devices 2300 through the network 2999. Also, in executing the control routine 2540, the processor 2550 may be caused to operate the network interface 2590 to receive the query instructions 2710 from the requesting device 2700, and to relay the query instructions 2710 to at least a subset of the node devices 2300 as part of coordinating an at least partially parallel performance of at least a search requested in query instructions 2710 among at least the subset of the node devices 2300. Further, in executing the control routine 2540, the processor 2550 may be caused to operate the network interface 2590 to receive portions of the results of the performance of at least the search requested in the query instructions 2710, and to transmit the results data 2770 generated from the results received from at least the subset of the node devices 2300 back to the requesting device 2700.

Alternatively, in embodiments in which one of the node devices 2300 incorporate the controller 2503 such that there may not be a control device 2500, the controller 2503 may incorporate the processor 2550 and/or the storage 2560, and the processor 2550 may operate the network interface 2390 of such a node device 2300 in lieu of there being a separate and distinct network interface for use by the processor 2500. As depicted, in such embodiments, each of the rules data 2510, the node data 2539 and the control routine 2540 may be stored within the storage 2360 of such a node device 2300 or within the separate storage 2560 of the controller 2503.

It should be noted that some embodiments of the distributed processing system 2000 of FIG. 13A may include multiple ones of the control device 2500, and/or that some embodiments of the distributed processing system 2000 of FIG. 13B may include multiple node devices 2300 that may each include the controller 2503. It may be that the provision of multiple control devices 2500 or multiple controllers 2503 serves the purpose of providing redundancy in the functions performed thereby in which a failure within one control device 2500 or controller 2503 results in a takeover of the functions performed thereby by another control device 2500 or controlled 2503. Alternatively or additionally, in an amalgam of distributed processing systems 2000 of FIGS. 13A and 13B, it may be that a node device 2300 incorporates a controller 2503 to take over the functions of a separate and distinct control device 2500 should a failure of the control device 2500 occur. Alternatively or additionally, it may be that multiple control devices 2500 and/or multiple controllers 2503 are incorporated into an embodiment of the distributed processing system 2000 to interact with what may be multiple ones of the requesting device 2700 in order to employ some degree of parallel processing in the receipt and handling of multiple instances of the query instructions 2710 received therefrom, each of which may include the search criteria of an entirely different search to be performed and/or task instructions of entirely different tasks to be performed with data values retrieved in corresponding searches.

In various embodiments, the requesting device 2700 incorporates one or more of a processor 2750, a storage 2760, an input device 2720, a display 2780, and a network interface 2790 to couple the requesting device 2700 to the network 2999. The storage 2760 may store the query instructions 2710, the results data 2700 and/or a control routine 2740. The control routine 2740 may incorporate a sequence of instructions operative on the processor 2750 to implement logic to perform various functions. The processor 2750 may be caused by its execution of the control routine 2740 to operate the input device 2720 and the display 2780 to provide a graphical user interface (GUI), command line interface (CLI) and/or application programming interface (API) by which an operator may enter parameters of a query for data from the data set 2230 that may include a search for particular data that may be present in one or more of the data records 2133, and may additionally include a task to be performed with data values retrieved by the search. The processor 2750 may then generate the query instructions 2710 to include a set of machine-readable instructions based on the entered parameters. However, regardless of the exact manner in which the query instructions 2710 are generated, the processor 2750 may be caused to operate the network interface 2790 to transmit the query instructions to the control device 2500. The processor 2750 may also be caused to operate the network interface 2790 to receive the results data 2770 providing results of the performance of the query instructions by at least a subset of the node devices 2300. The processor 2750 may be further caused to generate a visual representation of the results data 2700, and then operate the display 2780 to visually present the visual representation. Alternatively, the processor 2750 may be caused to relay the results data 2700 or other representation of the results indicated in the results data to another routine (not shown) for use as an input for further processing.

It should be noted that some embodiments of the distributed processing system 2000 of FIG. 13A or FIG. 13B may include multiple ones of the requesting device 2700. It may be that an embodiment of the distributed processing system 2000 of either FIG. 13A or FIG. 13B is shared among a great many institutions and/or personnel thereof, and therefore, may routine perform numerous searches and/or other processing tasks at least partially in parallel in response to the receipt numerous instances of the query instructions 2710. As earlier discussed, such an embodiment of the distributed processing system 2000 of either FIG. 13A or FIG. 13B may incorporate multiple ones of the control device 2500 and/or of the controller 2503 incorporated into multiple ones of the node devices 2300 to more efficiently receive such multiple instances of the query instructions 2710, and to more efficiently control the performances of searches and/or other processing tasks in response.

Figure 14A:
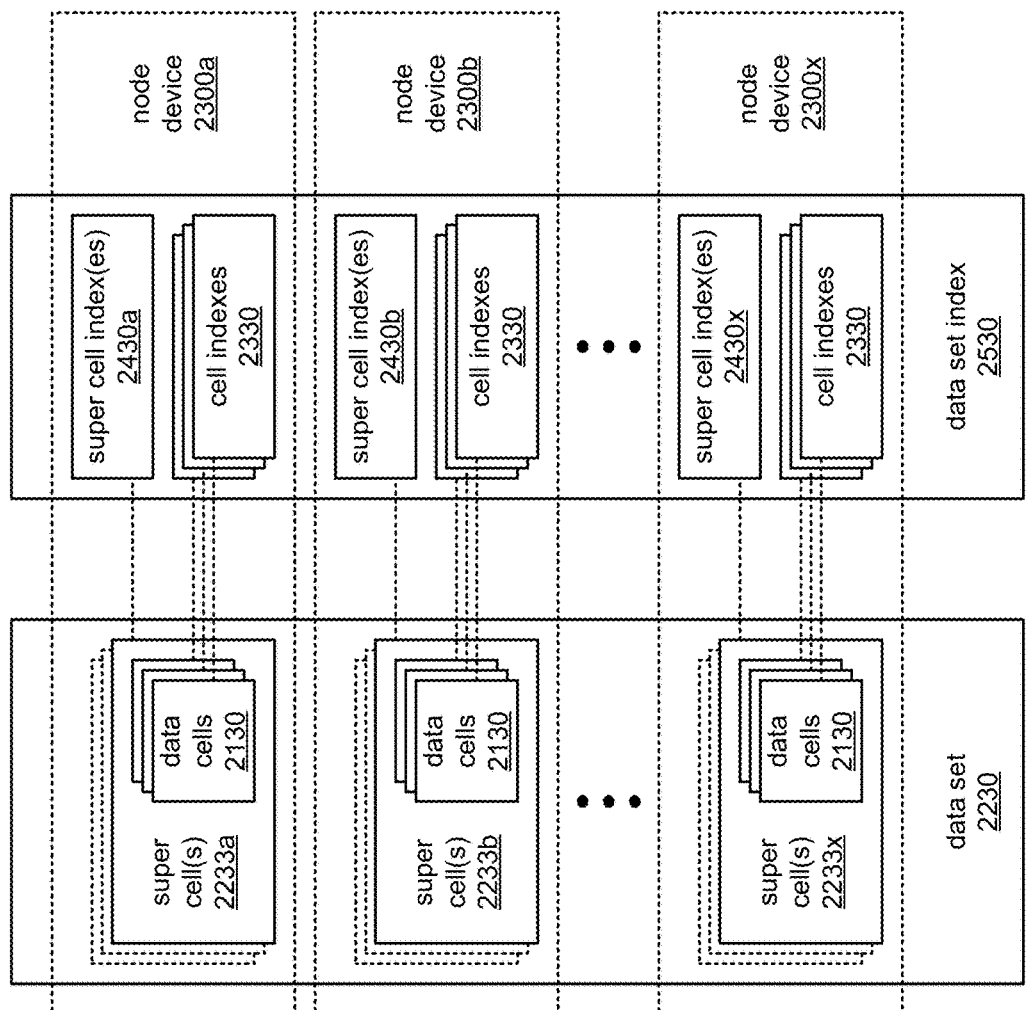
FIG. 14A illustrates an example embodiment of distribution of portions of a data set among node devices of a grid of node devices.

FIG. 14A depicts various aspects of an example embodiment of distribution of the data set 2230 among multiple ones of the node devices 2300. As depicted, each node device 2300 may store one or more whole super cells 2233 of the data set. More specifically, and as depicted among a number of node devices 2300a through 2300x, node device 2300a may be provided with at least one whole super cell 2233a, node device 2300b may be provided with at least one whole super cell 2233b, and so on to node device 2300x that may be provided with at least one whole super cell 2233x. Such use of the super cells 2233 as the atomic unit of distribution of the data set 2230 among the node devices 2300 may be deemed necessary to avoid situations in which a super cell index 2430 that corresponds to a super cell 2233 may need to be shared among two or more node devices 2300, such that the various complexities of either sharing access to a single copy of such a cell index 2430 or of recurringly synchronizing multiple copies thereof among the two or more node devices 2300 may need to be incurred.

In some embodiments, the manner in which the data set 2230 is divided into the super cells 2233 may be based on a requirement to generate all of the super cells 2233 to be of relatively similar sizes, as part of an effort to distribute the use of storage, processing and/or other resources by the data set 2230 relatively evenly among the node devices 2300. Alternatively or additionally, the manner in which the data set 2230 is divided into the super cells 2233 may be reflective of a division of the data values of the data set 2230 based on a need or requirement for various subsets of the data records 2133 of the data set 2230 to be maintained together within a single node device 2300 to enable the performance of various operations therewith. As a result of the division of the data set 2230 based on characteristics of the data values, rather than based on a requirement to generate similar sized super cells 2233, super cells 2233 of greatly varying sizes may be generated, including one or more super cells 2233 that may not be storable within faster volatile storage (e.g., random access memory) of one or more of the node devices 2300. However, as will be familiar to those skilled in the art, as long as a super cell 2233 that is provided to and/or generated within a node device 2300 is able to be stored in its entirety within slower non-volatile storage (e.g., a hard disk drive) of the node device, then any of a variety of virtual memory algorithms may be employed to cause swapping of portions of such a super cell 2233 between the volatile and not-volatile storages of the node device 2300 as a way to overcome such limitations.

As also depicted, each one of the super cells 2233a through 2233x may be accompanied by its corresponding one of the super cell indexes 2430a through 2430x in being stored within the corresponding one of the node devices 2300a through 2300x. Accordingly, each data cell 2130 of one of the super cells 2233a through 2233x may be accompanied by a corresponding cell index 2330. As previously discussed, this may be due to the data set 2230 actually incorporating the data set index 2530 in some embodiments.

Figure 14B:
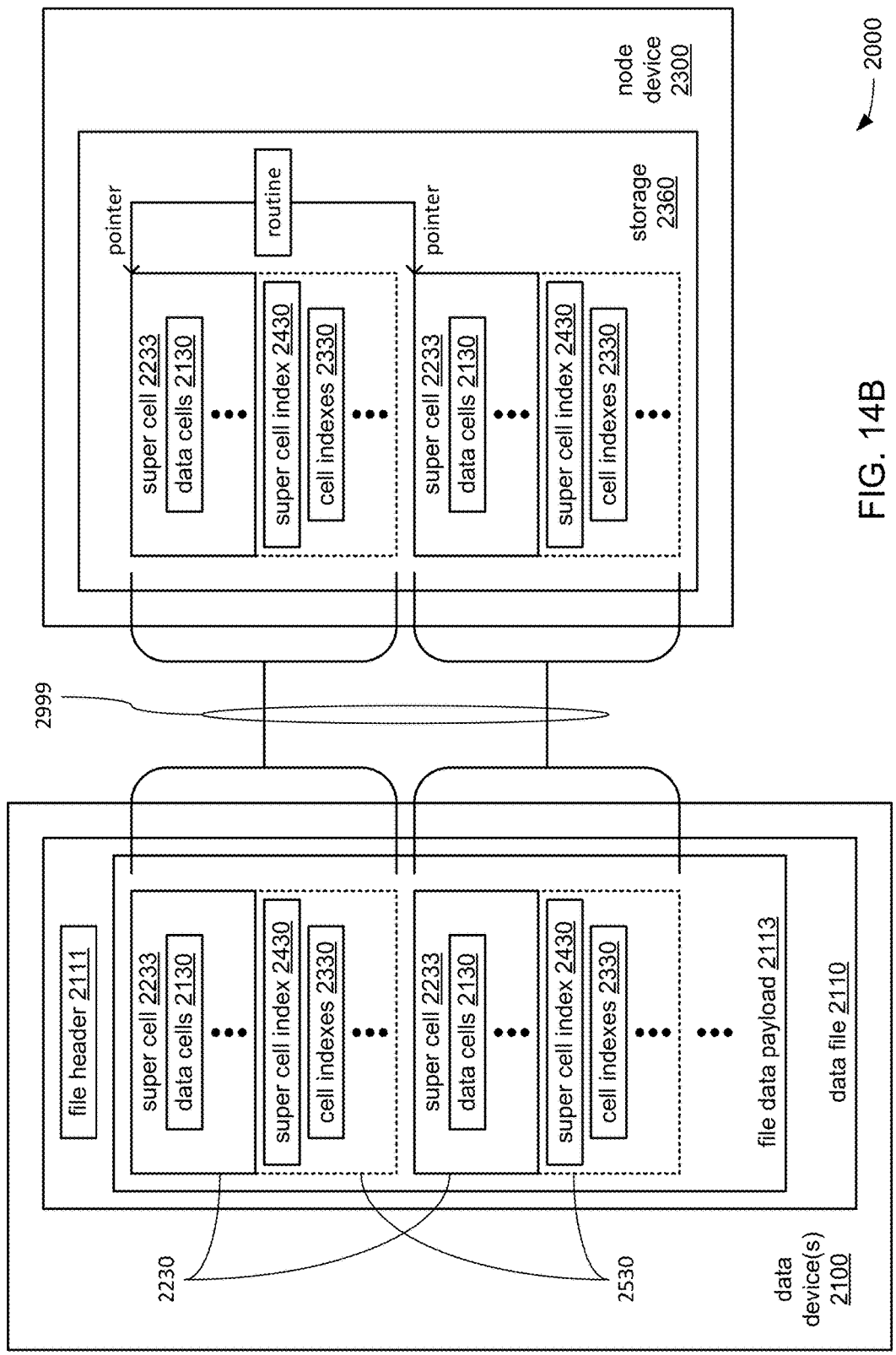
FIG. 14B illustrates an example embodiment of organization of data and indexes of the data set of FIG. 14A within a data file exchanged with a grid of node devices.

FIG. 14B depicts further aspects of the organization of the data set 2230 and of the data set index 2530 when stored together as a data file 2110 by the one or more data devices 2100. As familiar to those skilled in the art, the head of the data file 2110 may begin with a file header 2111 that may contain various pieces of information about the data file 2110 as may be required by a file system employed by the one or more data devices 2100 to store and maintain files. Following the file header 2111 may be a file data payload 2113 in which, in accordance with various requirements of the file system employed by the one or more data devices 2100, may be the portion of the data file 2110 in which the data of the data file is contained. As depicted, super cells 2233 of the data set 2230 may be interspersed within the file data payload 2113 of the data file 2110 with corresponding super cell indexes 2430 and cell indexes 2330. More specifically, starting toward the head of the file data payload 2113, the one or more data cells 2130 that form a super cell 2233 may be positioned adjacent to each other in sequential order, followed by the super cell index 2430 for the super cell 2233. The super cell index 2430 may then be followed by the one or more cell indexes 2330 that correspond to the one or more data cells 2130, which may be positioned adjacent to each other and in a sequential order that mirrors the sequential order of the corresponding one or more data cells 2130. This very same arrangement of the data cells 2130 of a super cell 2233, corresponding super cell index 2430 and corresponding cell indexes 2330 may be repeated for each super cell 2233 of the data set 2230 throughout the file data payload 2113.

As also depicted, when a portion of the data set 2230 that includes one or more super cells 2233 is distributed to one of the node devices 2300 such that the node device 2300 stores a portion of the data set 2230, the treatment of super cells 2233 as atomic units may be relied upon to cause each super cell 2233 that is transmitted to a node device 2300 to be accompanied by its corresponding super cell index 2430 and corresponding one or more cell indexes 2330 in a manner that preserves this same arrangement among the super cell 2233, the super cell index 2430 and the one or more cell indexes 2330 when stored within the node device 2300. As will be familiar to those skilled in the art, the manner in which each super cell 2233 may be transmitted to a node device 2300 may entail providing the node device 2300 with a pointer to the location of the super cell 2233 within the file data payload 2113 of the data file 2110 and an indication of an amount of data to be transferred that may include the super cell 2233 along with the corresponding super cell index 2430 and corresponding one or more cell indexes 2330.

Upon being stored within the storage 2360 of the node device 2300, the manner in which the data of each super cell 2233 may be accessed therein may still be based upon the use of a pointer to the head of the super cell 2233 along with one or more offsets to locations within the super cell 2233 at which each data cell 2130 of the super cell 2233 may begin. The arrangement of the data cells 2130 of each super cell 2233 to begin at the location pointed to by such a pointer, and with the corresponding super cell index 2430 and corresponding one or more cell indexes 2330 positioned after the data cells 2130, may present an arrangement that is compatible with a routine executed within the node device 2300 that may not have been written to make use of the data set index 2530, at all. Therefore, although the corresponding super cell index 2430 and corresponding one or more cell indexes 2330 may also be present within the storage 2360 such that they could also be accessed using offsets from the same pointer, such a routine may simply never make use of such offsets to access these indexes. It may be that such a routine (which may be any of a variety of types of routine) was written at an earlier time that predated the practice of including the data set index 2530 with the data set 2230. Alternatively or additionally, such a routine may include any of a variety of data handling utilities, including and not limited to, data archiving utilities, data summation and report utilities and/or any of a variety of other utilities that may routinely access the entirety of the data set 2230 such that use of the data set index 2530 may be superfluous. For such routines, such a grouping together of the data cells 2130 of a super cell 2233 starting at the location, and proceeding without other types of information interposed between the data cells 2130 may reduce memory page swapping and/or other forms of thrashing by virtual memory management systems. Thus, the positioning of the data cells 2130 in sequential order starting at the location within the storage 2360 to which the pointer associated with the super cell 2233 points may provide exactly the organization of the data of the super cell 2233 that such a routine was expected to encounter when it was written, thereby allowing such a routine to successfully make use of the data of the super cell 2233 in the manner in which it was designed to do so, and without interference by the presence of the corresponding super cell index 2430 and the corresponding one or more cell indexes 2330.

Figure 14C:
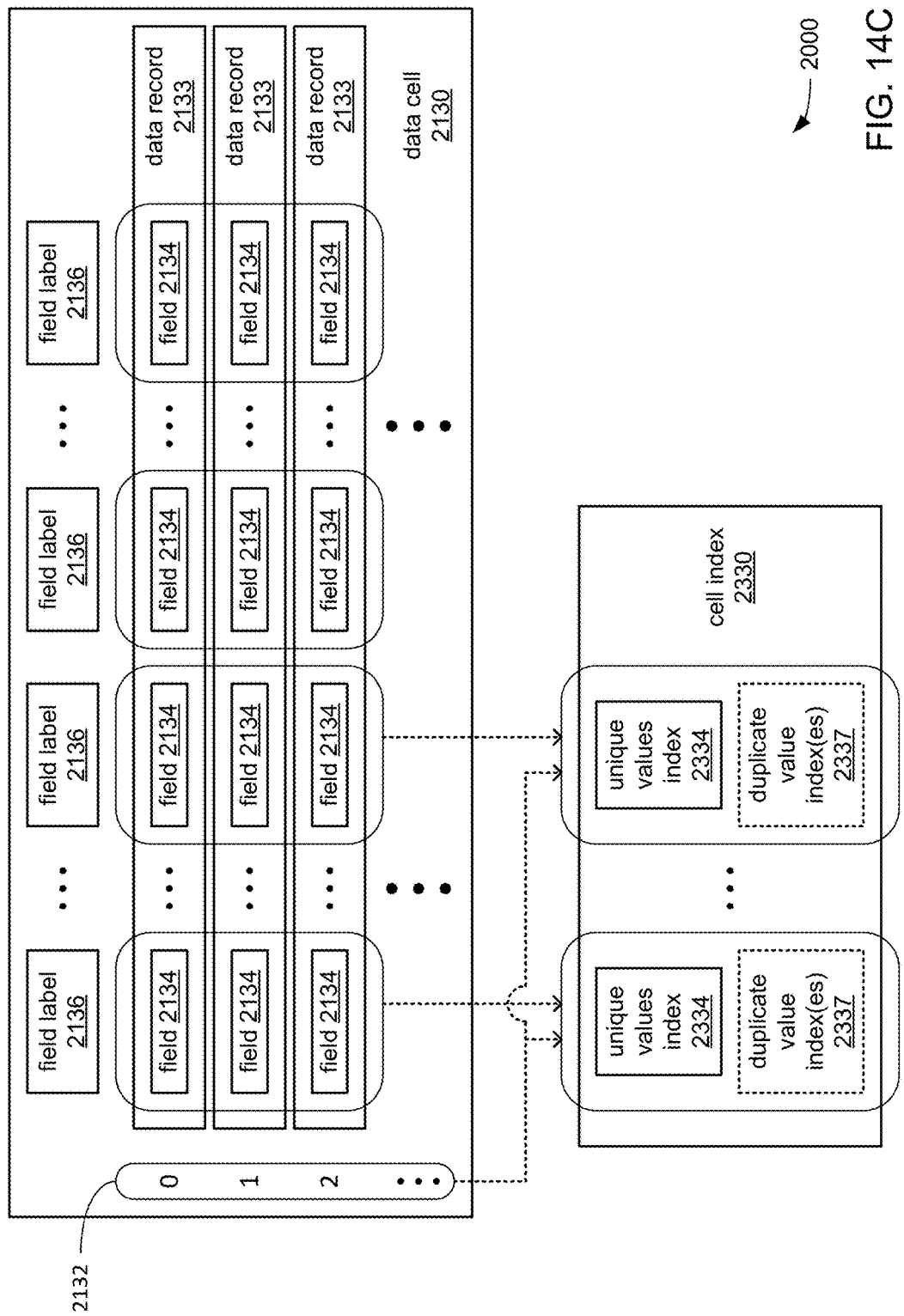
FIG. 14C illustrates an example embodiment of organization of data values within a portion of a data set stored by a node device.

FIG. 14C depicts various aspects of an example embodiment of organization of data values within a single data cell 2130, and various aspects of the manner in which the data values within a single data cell 2130 may be indexed within a single cell index 2330 that corresponds to the single data cell 2130. As has been discussed, and as depicted, the data values within the single data cell 2130 may be organized to form multiple data records 2133, and each data record 2133 may be assigned a unique record identifier 2132, such as the depicted sequence of ascending integer values. Also, each of the data records 2133 within the depicted single data cell 2130, as well as throughout the entirety of the data set 2230, may include an identical quantity of data fields 2134 in which a data value may be stored, each of which may be assigned a field label 2136 that is also identical through the entirety of the data set 2230. Therefore, although the data values within a data cell 2130 may not actually be arranged in a manner that forms a two-dimensional array in the storage 2360 of a node device 2300, the allocation of record identifiers 2132 and of field labels 2136 may enable data values within the data records 2133 of the data cell 2130 to be accessed in a manner very much like a two-dimensional array. However, it should be noted that, although each data record 2133 throughout the entirety of the data set 2230 may include an identical set of data fields 2134, there may still be differing quantities of data records 2133 within each data cell 2130 of the data set 2230.

As also depicted, and as will be explained in greater detail, a subset of the data fields 2134 of the data records 2133 within the data cell 2130 may be indexed within the cell index 2330 that corresponds to the data cell 2130. It is envisioned that only a subset of the data fields 2134 will be employed as the basis of search criteria in searches of the data set 2230 for one or more data records 2133 that meet the search criteria. Therefore, for each data field 2134 that may be so employed in such searches, the cell index 2330 may include at least a unique values index 2334, and may additionally include one or more duplicate value indexes 2337. As will be explained in greater detail, the unique values index 2334 that corresponds to a particular data field 2134 may include the record identifiers 2132 of each data record 2133 in which a unique data value for the particular data field 2134 is present. Also, any duplicate value index 2337 that corresponds to the particular data field 2134 (if there are any for the particular data field 2134) may include the record identifier(s) 2132 of each data record 2133 in which a duplicate of one of the unique data values for the particular field 2134 is present. Thus, where the data values of the particular data field 2134 have such high cardinality that each data value is unique, then the cell index 2330 will not include any duplicate value indexes for the particular data field 2134.

Figure 15A:
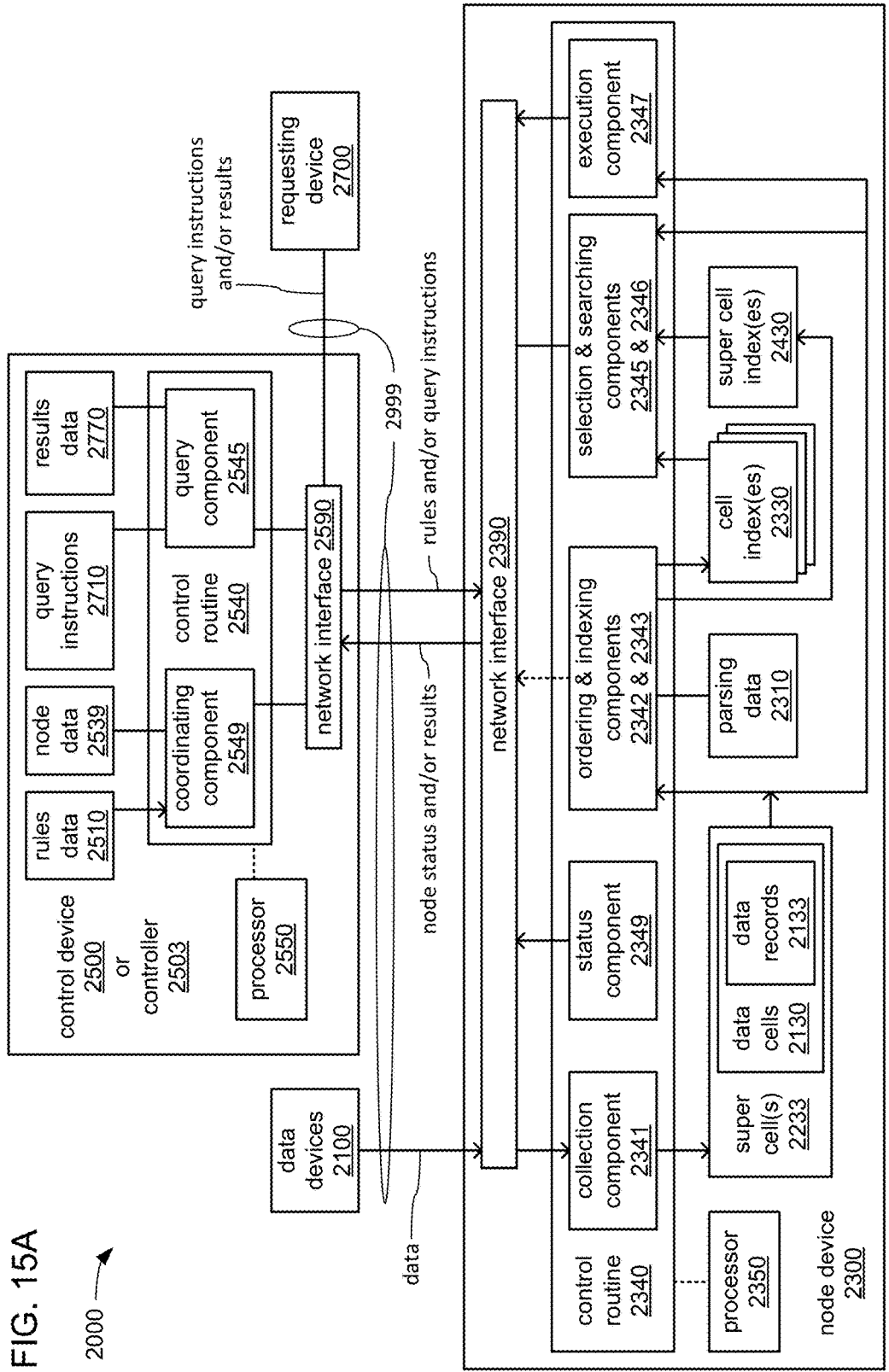
FIG. 15A illustrates an example of assembling, indexing, searching and performing operations with a data set distributed among node devices of a grid of node devices.

FIG. 15A illustrates an example of performing a combination of assembling, indexing, searching, accessing and/or performing processing operations with the a portion of the data set 2230 stored within one of the node devices 2300. More specifically, FIG. 15A illustrates aspects of the manner in which the routines 2340 and 2540 may be executed cooperatively within embodiments of the distributed processing system 2000 of either of FIG. 13A or 13B to generate and/or receive the data set 2230 and corresponding data set index 2530, and to use the data set index 2530 to improve the efficiency with which the data set 2230 may be searched and used in the manner indicated in the query instructions 2710.

As recognizable to those skilled in the art, each of the control routines 2340 and 2540, including the components of which each may be composed, are selected to be operative on whatever type of processor or processors that are selected to implement applicable ones of the processors 2350 and/or 2550. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 2350 and/or 2550. Where one or more device drivers are included, those device drivers may provide support for any of a variety of other components, whether hardware or software components, of the node devices 2300, the control device 2500 and/or the controller 2503.

As depicted in FIG. 15B, the processors 2350 and/or 2550 may incorporate multiple processor cores 2355 and/or 2555, respectively, and/or other mechanisms by which parallel execution of multiple processes across multiple threads of execution may be supported. As has been discussed, the performance of various operations by the processors 2350 of the node devices 2300, and/or by the processor 2550 of the control device 2500 or controller 2503, may entail the use of at least some degree of parallelism within each such device, in addition to or in lieu of the use of parallelism between devices, to increase speed and/or efficiency. Thus, during execution of one or more of the component 2545 of the control routine 2540, and/or of the components 2342, 2343, 2345, 2346 and 2347 of the control routine 2340, operations performed with each cell index 2330, each data cell 2130, each super cell index 2430 and/or each super cell 2233 may each be so performed in a separate process that is distributed among the available multiple threads of execution that are so supported by the processors 2350 and/or 2550.

Returning to FIG. 15A, as has also been discussed, the control device 2500 or controller 2503 may coordinate aspects of exchanges of the data set 2230 and/or the data set index 2530 between the one or more data devices 2100 and the node devices 2300, including the manner in which the data set 2230 (and correspondingly, the data set index 2530) may be distributed among multiple ones of the node devices 2300. As depicted, the control routine 2340 executed by the processor 2350 of each node device 2300 may include a status component 2349 to cause the processor 2350 of each node device 2300 to operate its corresponding network interface 2390 to recurringly transmit indications of the current status of the node device 2300 to the control device 2500 or controller 2503. As also depicted, the control routine 2540 executed by the processor 2550 of the control device 2500 or controller 2503 may include a coordinating component 2549 to cause the processor 2550 to receive such recurringly transmitted indications of node status and to recurringly update node data 2539 stored within the control device 2500 or controller 2503 with those received indications.

Based on such recurringly updated indications of node status maintained within the node data 2539, the processor 2550 may be caused by the coordinating component 2549 to control the distribution of the data set 2230 and corresponding portions of the data set index 2530 among the node devices 2300 to balance the utilization of network, storage, processing and/or other resources provided by each of the node devices 2300. Alternatively or additionally, the processor 2550 may be caused to control such a distribution based on any of a variety of algorithms by which portions of the data set 2230 (and correspondingly, portions of the data set index 2530), may be distributed to provide a predetermined degree of redundancy to avoid loss of data that may otherwise arise from a failure affecting one or more of the node devices 2300. Where such distributions are made through the transfer of the entirety of the data set 2230 from the one or more data devices 2100, and to the node devices 2300 along with corresponding portions of the data set index 2530, the processor 2550 may be caused to coordinate the transfer of each portion of the data set 2230 to each corresponding node device 2300, along with a corresponding portion of the data set index 2530, in an at least partially parallel set of transfer operations through the network 2999.

Figure 16A:
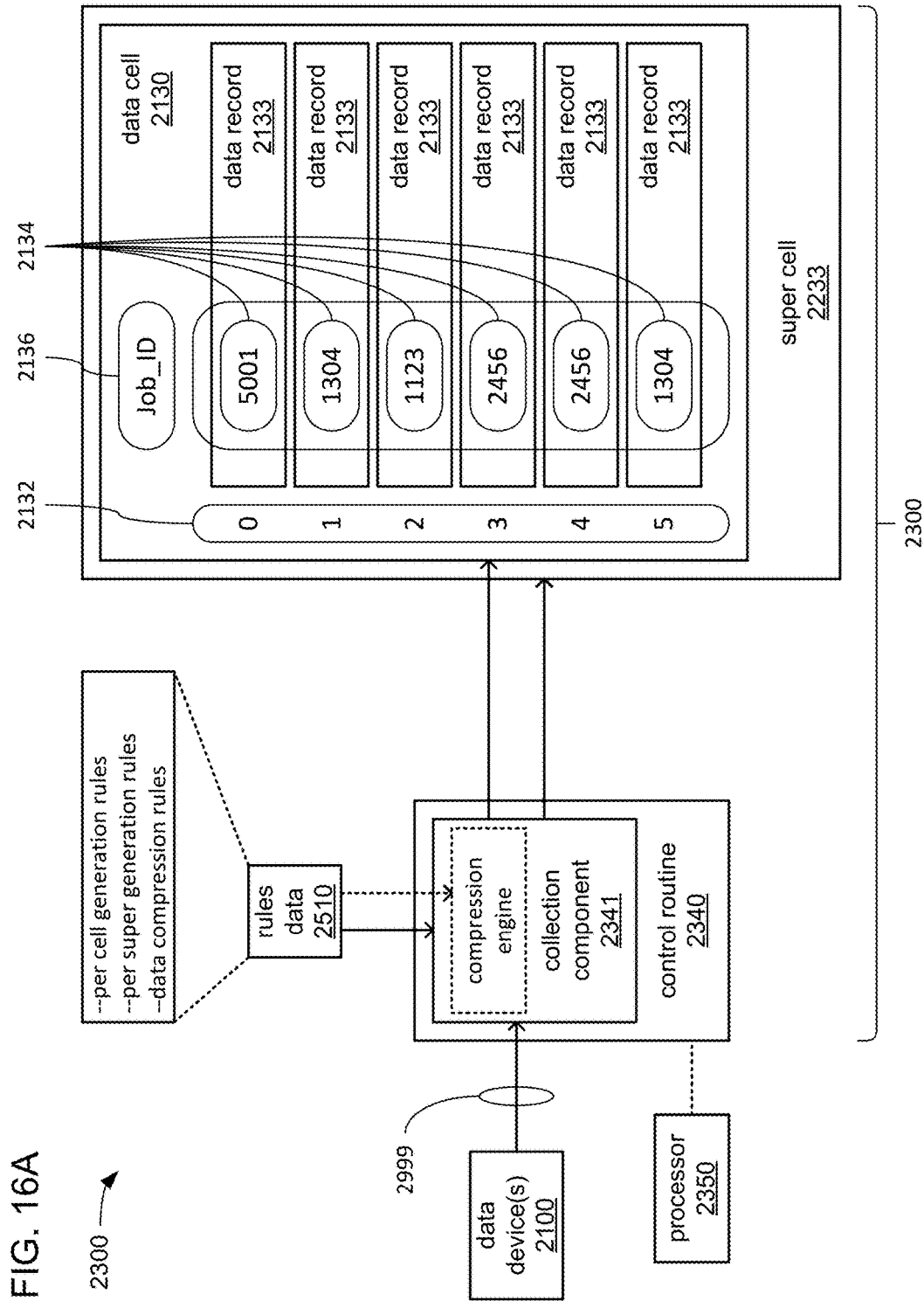
FIG. 16A illustrates an example of assembling and indexing a portion of a data set within a node device.
Figure 16B:
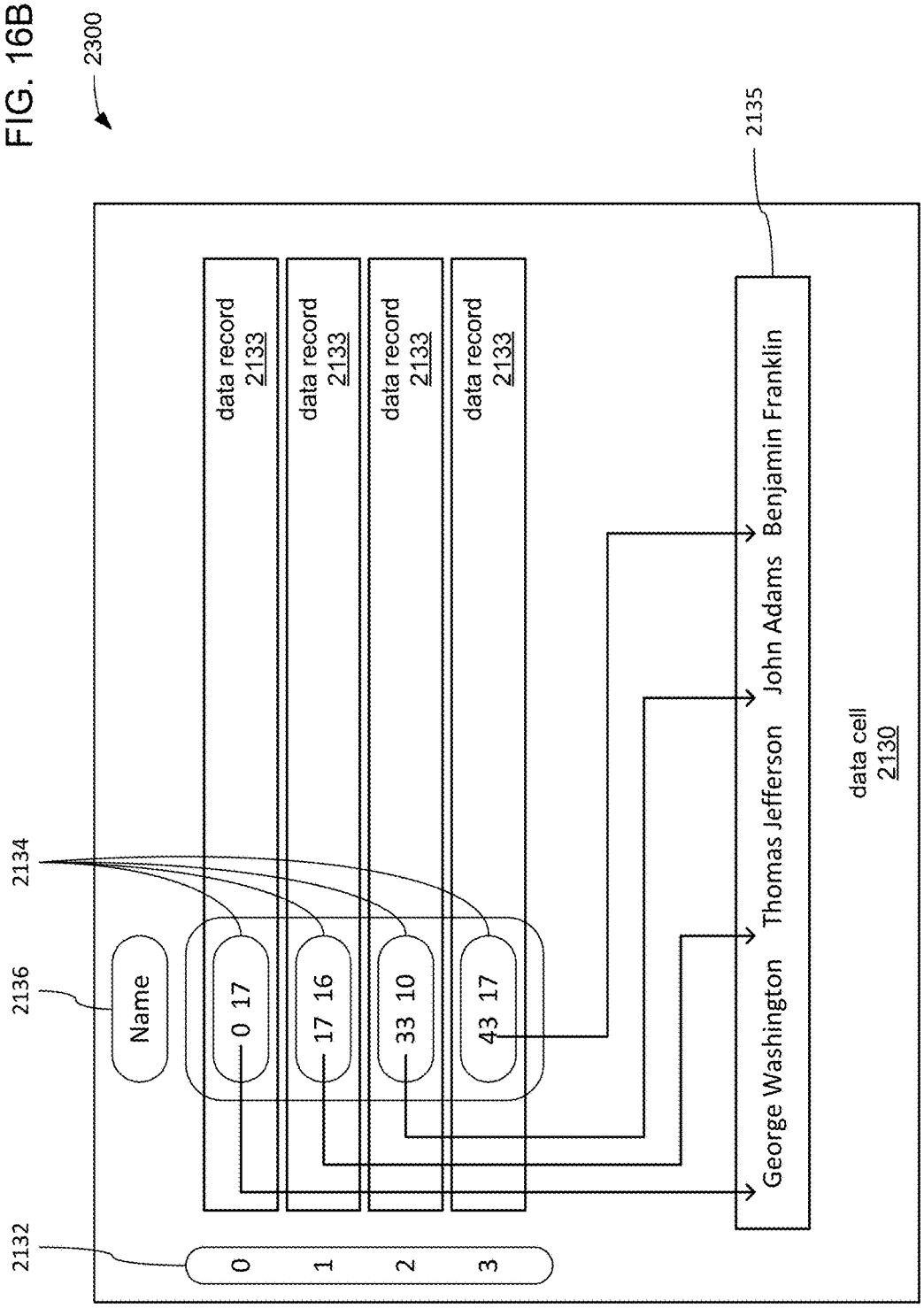
FIG. 16B illustrates an alternate example of assembling and indexing a portion of another data set within a node device.

However, as has also been discussed, it may be that, in other embodiments, the data set 2230 is assembled by the node devices 2300, and that the data set index 2530 may correspondingly be generated by the node devices 2300. In such other embodiments, the processor 2550 may be caused by the coordinating component 2549 to determine which one(s) of the node devices 2300 are to receive data values and/or stream(s) of data values from each data device 2100. Again, such determinations may be based on recurringly updated indications of node status maintained within the node data 2539, and/or based on any of a variety of algorithms by which a predetermined degree of redundancy is to be provided to avoid loss of data. As depicted, the control routine 2340 executed by the processor 2350 of each node device 2300 may include a collection component 2341 to cause the processor 2350 of each node device 2300 to operate its corresponding network interface 2390 to recurringly receive data values and/or streams of data values from the one or more data devices 2100, and to assemble one or more super cells 2233 of the data set 2230. FIGS. 16A and 16B each depict aspects of such reception and assembly of data values and/or stream(s) of data values in greater detail. FIG. 16A depicts aspects of assembling an example portion of a data set 2230 that includes integer data values, and FIG. 16B depicts aspects of assembling an example portion of a data set 2230 that includes variable length character strings.

Turning to FIG. 16A, in executing the control routine 2340, the processor 2350 of a node device 2300 may be caused by the collection component 2341 to assemble an example data cell 2130 of an example super cell 2233 from received data values. As depicted, the received data values may include integer values filling a data field 2134 associated with a field label 2136 of "Job_ID" that is present in each of the data records 2133 of the example data cell 2130. As also depicted, each of the data records 2133 of the example data cell 2130 may be assigned a record identifier 2132 by which each of the depicted data records 2133 is able to be uniquely identified, at least within the example data cell 2130. As depicted, the record identifiers so assigned are an ascending sequential series of positive integers. However, it should be noted that any of a variety of types of record identifiers may be used.

It should be noted that FIGS. 16A and 16B each present a deliberately simplified example of a single data cell 2130 within a super cell 2233 of a data set 2230 as a visual aid for discussion and understanding. It is envisioned that a real data set 2230 would include a great many super cells 2233, that would each include a great many data cells 2130, that would each include a great many data records 2133, that would each include a great many data fields 2134. Therefore, the deliberately simplified examples presented in FIGS. 16A and 16B, one of which is used throughout other figures of the present application, should not be taken as limiting.

In assembling the example data cell 2130 of the depicted example super cell 2233, the processor 2350 may be caused by the collection component 2341 to retrieve one or more rules for such assembly from the rules data 2510. In some embodiments, the rules data 2510 may be distributed among the node devices 2300 by the control device 2500 or the controller 2503. Among such rules may be specifications of what data fields 2134 are to be included in each data record 2133, what the field labels 2136 and data types are for each data field 2134, and/or what sort sequence of record identifiers 2132 are to be used. Alternatively or additionally, among such rules may be specifications of minimum and/or maximum size of each data cell 2130 and/or each super cell 2233 to be assembled, specifications of minimum and/or maximum quantities of data records 2133 to be included within each data cell 2130, and/or specifications of minimum and/or maximum quantities of data cells 2130 to be included within each super cell 2233. Such parameters for the generation of data cells 2130 and/or super cells 2233 may be based on any of a variety of factors associated with limitations of the network, storage, processing and/or other resources provided by the node devices 2300, and/or such limitations associated with other devices to which the data set 2230 may be transmitted by the node devices 2300 following its generation. In some embodiments, such parameters may be modified on a recurring basis based on recurring analyses of performance (e.g., such metrics as time to perform various operations, utilization of resources, efficiency, data throughput, rate of handling queries, etc.) of the distributed processing system 2000, including analyses of the efficiency with which the various resources provided by the node devices 2300, the control device 2500 (or controller 2503) and/or of the network 2999.

As also depicted, in some embodiments, the collection component 2341 may incorporate a compression engine, and the processor 2350 may be caused thereby to compress each data cell 2130 generated within the node device 2300. In so doing, the processor 2350 may be caused to retrieve one or more data compression rules from the rules data 2510. Among such rules may be specifications of what type of compression algorithm to use and/or parameters therefor.

Turning to FIG. 16B, an alternate deliberately simplified example of a single data cell 2130 is presented as a visual aid to illustrate an example indirect manner in which data values of a data field 2134 may be stored. More specifically, the data type of the data associated with the depicted example data field 2134 is a variable length character string. Due to the variable length, the data size of each data value (i.e., the quantity of bytes, words, doublewords, quadwords, etc. that may be occupied by each data value) may be entirely unpredictable, and/or may change over time as changes are made to one or more of the data values. As depicted, in one approach to addressing such issues, each of such variable length data values may be separately assembled together to form a data value vector 2135 of characters thereof. In the data field 2134 of the data records 2133 into which these variable length character strings might otherwise be stored, there may instead be a pair of integer values of preselected fixed data size, with one such integer value specifying an offset from the start of the data value vector 2135 at which a corresponding one of the variable length strings begins, and another such integer value specifying the length of that corresponding one of the variable length strings.

Returning to FIG. 15A, regardless of whether the data cells 2130 and super cells 2233 of the data set 2230 are assembled within the node devices 2300, or are provided to the node devices 2300 as a complete data set 2230, the node devices 2300 may be caused to generate and/or repeat the generation of the cell indexes 2330 and super cell indexes 2430 of a corresponding data set index 2530. Stated differently, where the data set 2230 is generated among multiple ones of the node devices 2300 such that the data set 2230 such that no corresponding data set index 2530 yet exists, each node device 2300 of the multiple node devices 2300 that generated a portion of the data set 2230 may also generate a corresponding portion of the data set index 2530. Also, where the data set 2230 is provided to multiple ones of the node devices 2300 as an already complete data set, but without a corresponding data set index 2530, each node device 2300 of the multiple node devices 2300 that is provided with a portion of the already complete data set 2230 may then generate a corresponding portion of the data set index 2530. Alternatively, where the data set 2230 is provided to multiple ones of the node devices 2300 as an already complete data set, and with a corresponding data set index 2530, it may be that none of the node devices 2300 need generate the corresponding data set index 2530. However, regardless of whether the data set 2230 and the data set index 2530 are each generated by the node devices 2300 or are each provided to the node devices 2300, if data values within the data set 2230 are added, deleted or otherwise altered, then one or more of the node devices 2300 may be caused to repeat the generation of at least a portion of the data set index 2530.

Figure 17A:
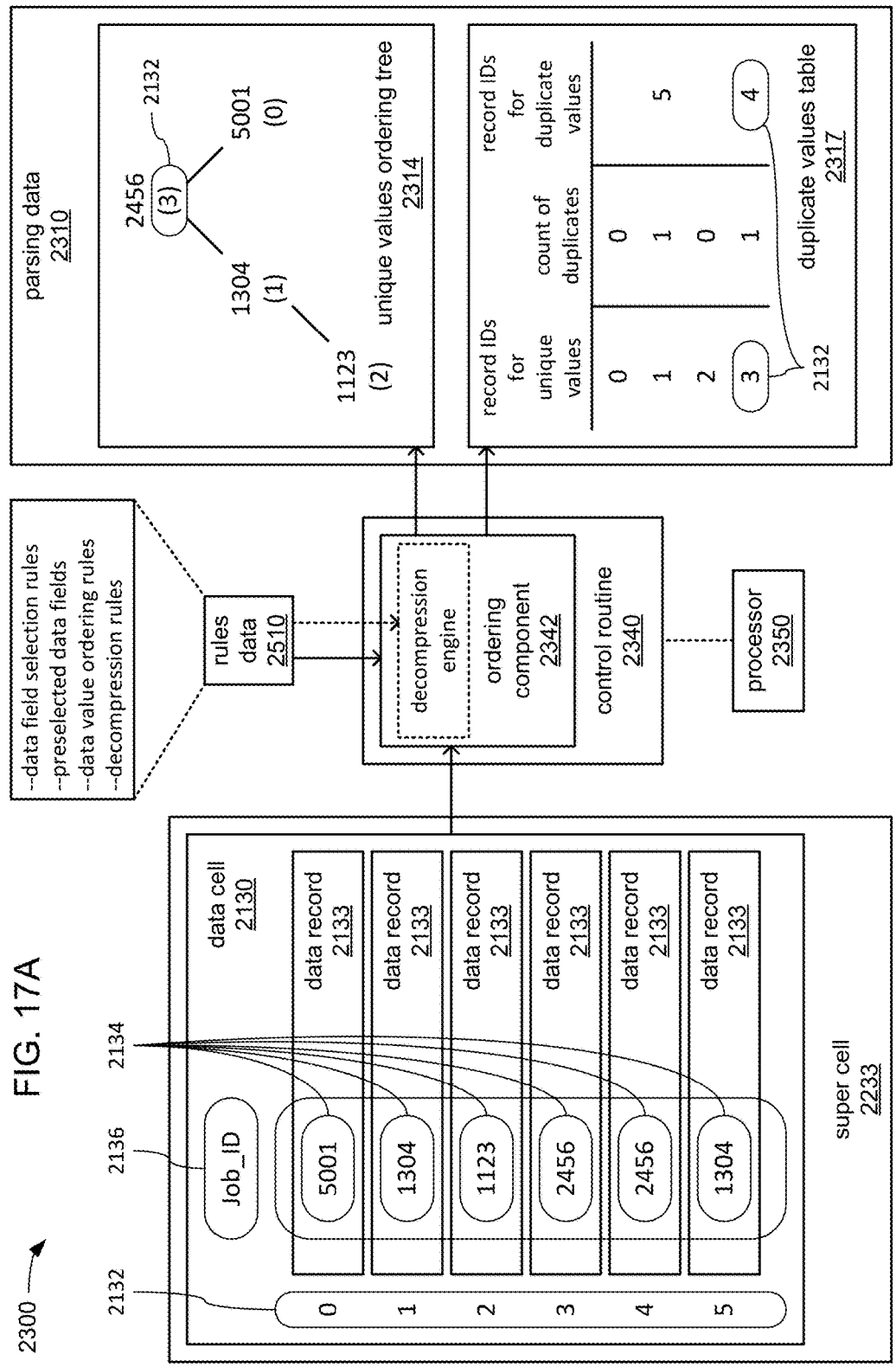
FIGS. 17A, 17B and 17C, taken together, illustrate an example of assembling and indexing the portion of the data set of FIG. 16A within a node device.
Figure 17B:
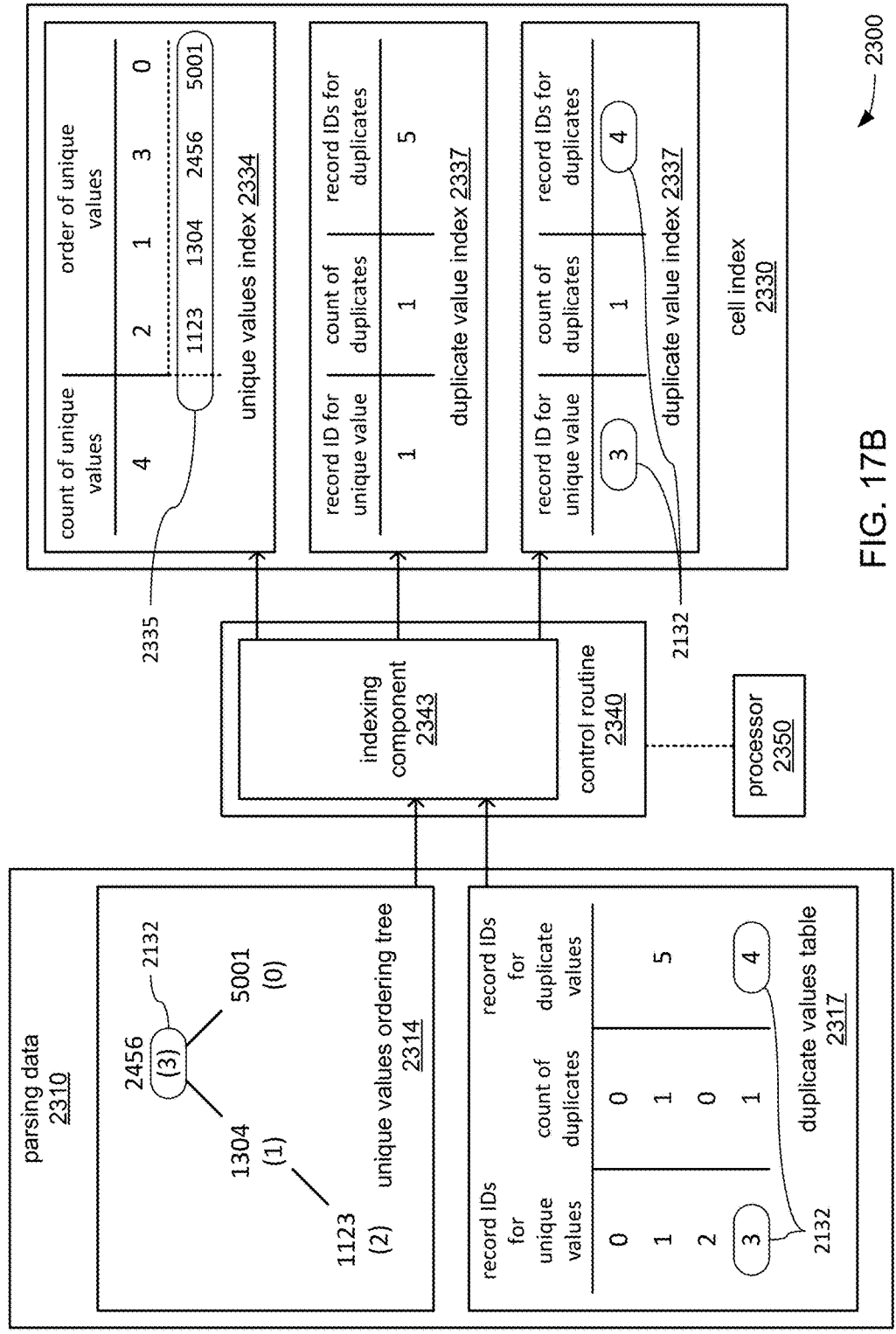
Figure 17C:
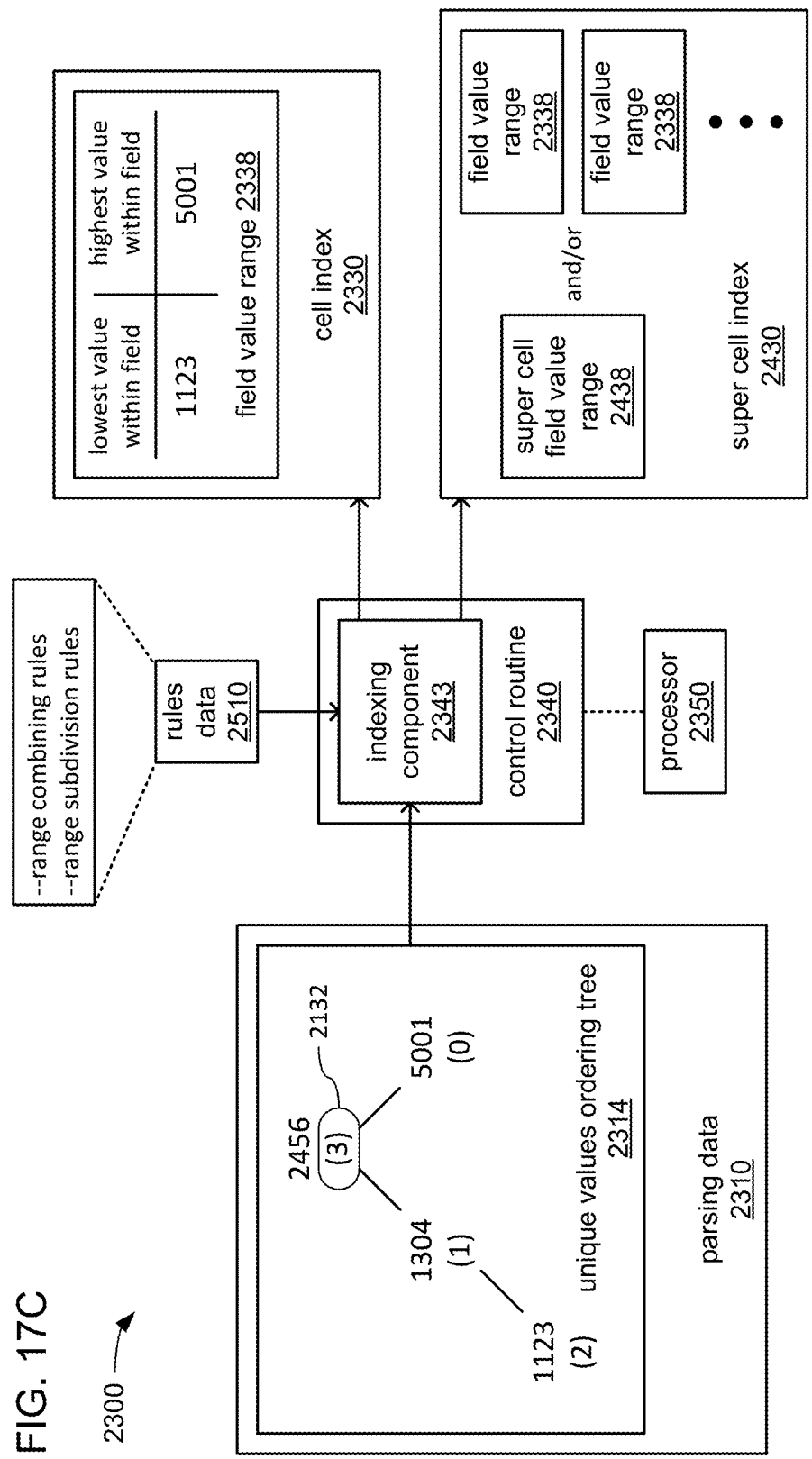

As depicted, the control routine 2340 executed by the processor 2350 of each node device 2300 may include an ordering component 2342 to cause the processor 2350 of each node device 2300 to retrieve and order data values of one or more specified data fields 2134, and an indexing component 2343 to cause the processor 2350 of each node device 2300 to generate cell indexes 2330 and super cell index(es) 2430 based on those data values. FIGS. 17A-C, together, depict aspects of such generation of a portion of the data set index 2530 in greater detail. Specifically, FIG. 17A depicts aspects of the retrieval and ordering of data values of a data field 2134 to identify unique values and duplicates thereof, FIG. 17B depicts aspects of generating unique and duplicate value indexes of a cell index 2330 from such retrieved and ordered data values, and FIG. 17C depicts aspects of adding indications of highest and lowest data values to the cell index 2330 and a super cell index 2430.

Turning to FIG. 17A, in executing the control routine 2340 to begin generating or repeating the generation of a portion of the data set index 2530, the processor 2350 of a node device 2300 may be caused by the ordering component 2342 to retrieve indications from the rules data 2510 of what data fields 2134 are within the subset of data fields 2134 for which indexes are to be created. It is envisioned that the data values of a relatively small subset of the data fields 2134 may actually be used in the search criteria of searches for data that may be specified in instances of the query instructions 2710. Exactly which data fields 2134 are likely to be so used may be based on a combination of factors including, and not limited to, the nature of the data within the data set 2230 and/or the purposes for which the data set 2230 is created. Thus, it is envisioned that a determination of which data fields 2134 are to be included in the subset of data fields 2134 for which indexes are to be generated may be objectively made through the observation of what data fields 2134 are used in search criteria specified in instances of the query instructions 2710 that are received over time. Therefore, in some embodiments, the processor 2350 of each node device 2300 may be caused to retrieve explicit indications of what data fields 2134 are to be included in the subset from the rules data 2510, and such explicit indications may be based on past analyses of past queries that may be performed by the control device 2500 or controller 2503. Alternatively or additionally, the processor 2350 of each node device 2300 may be caused to retrieve one or more rules (e.g., statistical analysis rules and/or heuristic algorithms) for use by the processor 2350 in performing its own analysis of received instances of the query instructions 2710 to determine what the subset of data fields 2134 should be over a specified interval of time into the past.

Regardless of the exact manner in which the subset of data fields 2134 for which indexes are to be generated is determined, the processor 2350 of each node device 2300 may be caused by the ordering component 2342 to commence or repeat generation of cell indexes 2330 and super cell index(es) 2430 for each data cell 2130 of each super cell 2233 that is stored within the node device. As previously discussed, as a measure to improve the speed and/or efficiency of such generation or repetition of generation of indexes, the processor 2350 may be selected to be of a type that is capable of supporting multiple threads of execution (e.g., incorporating multiple processor cores 2355), and the generation of each cell index 2330 and/or each super cell index 2430 may be performed as a separate process, with the separate processes being distributed among the multiple threads of execution supported by the processor 2350.

Within each such process for the generation or repetition of generation of one of the cell indexes 2330, the processor 2350 may be caused to retrieve the data values present within the each data field 2134 of the subset of data fields 2134 from within each data record 2133 of the data cell 2130 that corresponds to the cell index 2330. As another measure to improve speed and/or efficiency within each process for generating or repeating the generation of a cell index 2330, the processor 2350 may be caused to retrieve the data values within all of the data fields 2134 of the subset of data fields 2134 in a single read pass through the data records 2133 within the corresponding data cell 2130. For each data field 2134 of the subset of data fields 2134, various approaches may be used to sort the data values retrieved therefrom across the data records 2133 within the corresponding data cell 2130, as well as to distinguish unique and duplicate values thereof. Although FIG. 17A depicts the use of a binary tree (specifically, the depicted unique values ordering tree 2314) as one approach, other approaches may be used, including and not limited to, a multi-level skip list.

It should be noted that FIG. 17A presents a deliberately simplified example of indexing the data values of a single data field 2134 of the simplified example data cell first introduced in FIG. 16A as a visual aid for discussion and understanding. Again, it is envisioned that real data cells 2130 of a real data set 2230 would include a great many data records 2133 that each would include a great many data fields 2134 of which numerous ones would be indexed. Therefore, the deliberately simplified example of indexing presented in FIG. 17A, and continuing with FIGS. 17B and 17C, should not be taken as limiting.

Continuing with FIG. 17A, the depicted unique values ordering tree 2314 is assembled from the unique data values that are identified as present within a single example data field 2134 as those values are retrieved, while the depicted duplicate values table 2317 is assembled from any duplicates of any of the unique data values that are identified as present. More specifically, as each data value present within the single example data field 2134 is retrieved from the data records 2133 of the depicted data cell 2130 (starting with the data record 2133 assigned the record identifier "0"), the retrieved data value is compared to the data values that may already be present within the unique values ordering tree 2314 to determine whether the retrieved data value is already included within the unique values ordering tree 2314. If the retrieved data value is not already included in the unique values ordering tree 2314, then it is deemed to be a "unique value" in the sense that it is the first time that the retrieved data value has been encountered, and the retrieved data value is added to the unique values ordering tree 2314 along with the record identifier 2132 of the data record 2133 from which it was retrieved.

However, if the retrieved data value is already included in the unique values ordering tree 2314, then it is deemed to be a "duplicate value" in the sense that it is not the first time that the retrieved data value has been encountered, and an indication is added to the duplicate values table 2317 that a duplicate of one of unique values has been retrieved, along with the record identifier 2132 of the data record 2133 from which it was retrieved. As depicted, the duplicate values table 2317 may be indexed by the record identifiers 2132 of the data records 2133 in which unique values are identified as present, and for each such record identifier 2132 associated with a unique value, there may be a count of duplicates of that unique value (if any), and a listing of record identifier(s) of any data record 2133 in which a duplicate of that unique value has been identified as present (again, if any). Again, due to the deliberate simplified nature of the depicted example data cell 2130, just a single duplicate is depicted for each of two of the unique values. However, it is envisioned that in a real data cell 2130, there may be numerous unique values that may each have multiple duplicates such that many of the counts of duplicates in the duplicate values table 2317 would be higher for those unique values, and such that there would be many record identifiers 2132 for each of those unique values in the duplicate values table 2317 to identify multiple data records 2133 in which a duplicate value is identified as present for each of those unique values. It should be noted that, although a specific configuration of a data table is depicted and described as an example implementation of the duplicate values table 2317, other configurations of a data table and/or an entirely different data structure may be used to store indications of duplicate values correlated to the unique values of which they are duplicates and correlated to indications of which data record(s) 2133 that the duplicate values are identified as present within. Further, as an alternative, entirely separate data structures may be generated for each unique value for which at least one duplicate is identified. More broadly, any of a variety of data structures and/or other techniques may be employed to store such indications of duplicate values in a form optimized for compact storage and/or in a form optimized for speedy access.

In generating the depicted unique values ordering tree 2314 and the depicted duplicate values table 2317, the processor 2350 may be caused to retrieve various rules for the ordering of data values from the rules data 2510. Such retrieved rules may specify particular forms of ordering data values for each of multiple data types, including and not limited to, numeric ordering rules for integer and/or floating point values (e.g., ascending or descending numerical order), text character ordering rules for fixed length and/or variable length strings of text (e.g., alphabetic ordering, one or more exceptions to alphabetic ordering, ordering for different dialects and/or other variants of a language, etc.), and/or ordering rules for audio and/or visual data (e.g., ordering by color, pixel resolution, sound frequency, sound volume, etc.). Such rules may also specify aspects of the generation of the binary tree structure of the unique values ordering tree 2314. Alternative or additionally, where an approach other than a binary tree is used to sort data values and/or distinguish unique and duplicate values (e.g., a multi-layer skip list), such rules may also specify aspects of the use of such another approach.

As also depicted, in some embodiments, the ordering component 2342 may incorporate a decompression engine, and the processor 2350 may be caused thereby to decompress the data cell 2130 in a situation where the data cell 2130 was earlier compressed as part of being generated (e.g., by the collection component 2341, which as earlier discussed, may include a compression engine). In so doing, the processor 2350 may be caused to retrieve one or more data decompression rules from the rules data 2510. Among such rules may be specifications of what type of decompression algorithm to use and/or parameters therefor.

Turning to FIG. 17B, in executing the control routine 2340 to continue generating or repeating the generation of a portion of the data set index 2530, the processor 2350 of a node device 2300 may be caused by the indexing component 2343 to employ the unique values ordering tree 2314 and/or the duplicate values table 2317 (or alternates thereto, as have been described) to generate a cell index 2330 that corresponds to data cell 2130. More specifically, for purposes of illustration, the generation of an example cell index 2330 based on the unique values ordering tree 2314 and the duplicate values table 2317 generated from the example data cell 2130 of FIG. 17A is depicted.

The processor 2350 may be caused by the indexing component 2343 to perform an in-order traversal of the unique values ordering tree 2314 (which again, employs a binary tree structure) to retrieve at least the record identifiers 2132 of the data records 2133 in which each unique value was identified as present for the single data field 2134, and in an order that corresponds to the order into which the unique values are sorted in the unique values ordering tree 2314. Then, within the cell index 2330, the processor 2350 may be caused to generate a unique values index 2334 for the unique values of the single data record 2134, which may include a count of the unique values and/or the retrieved record identifiers 2132 arranged in the order that corresponds to the order into which the unique values are sorted in the unique values ordering tree 2314. As depicted, in some embodiments, in performing the in-order traversal of the unique values ordering tree 2314, the processor 2350 may also retrieve the unique values, themselves, and also in the order into which they are sorted in the unique values ordering tree 2314. The processor 2350 may then generate and add a unique values vector 2335 to the unique values index 2334 in which the unique values are arranged in the order into which they are sorted in the unique values ordering tree 2314 such that the unique values index 2334 is caused to correlate each of the unique values with the record identifier 2132 of the data records 2133 in which each was identified as present.

Thus, when fully generated, the unique values index 2334 at least provides a count of how many unique values were found among the data values present within a single data field 2134 across the data records 2133 of the single data cell 2130, and/or the record identifiers 2132 of the data records 2133 in which each of the unique values were identified as present in the order into which the unique values were sorted in the unique values ordering tree 2314. Also, the unique values index 2334 may additionally provide a unique values vector 2335 of the unique values, themselves, also in the order into which the unique values were sorted in the unique values ordering tree 2314, thereby allowing each unique value to be correlated to the record identifier 2132 of the data record 2133 in which the unique value was identified as present.

The processor 2350 may be caused by the indexing component 2343 to parse through the duplicate values table 2317 to retrieve the record identifier 2132 for each unique value for which at least one duplicate was also identified, and the record identifier(s) 2132 for the one or more data records in which the at least one duplicate was identified as present. Then, within the cell index 2330, and for each unique value for which at least one duplicate was also identified, the processor 2350 may be caused to generate a separate duplicate value index 2337. Within each such duplicate value index 2337, the processor 2350 may include the record identifier 2132 of the data record 2133 in which one of the unique value was identified as present, a count of how many duplicates were identified of the unique value, and the record identifier(s) of the one or more data records 2133 in which a duplicate of the unique value was identified as present.

Thus, when fully generated, each duplicate value index 2337 identifies the unique value to which it corresponds by the record identifiers 2132, a count of the number of duplicates of the unique value, and the record identifiers 2132 of the data records 2133 in which each duplicate of the unique value was identified as present. The record identifier 2132 of the data record in which the unique value was identified as present may be used with the unique values index 2334 to identify the unique value, itself, in embodiments in which the unique values index 2334 includes the unique values vector 2335.

Turning to FIG. 17C, in continuing to execute the control routine 2340 to continue generating or repeating the generation of a portion of the data set index 2530, the processor 2350 of a node device 2300 may be caused by the indexing component 2343 to additionally employ the unique values ordering tree 2314 to identify the highest and lowest unique values identified for the single data field 2134 within the cell index 2130. The processor 2350 may then add, to the cell index 2330, an indication of a field value range 2338 for the single data field 2134 in which the range of the data values identified as present within the singe data field 2134 is indicated using the identified lowest and highest data values.

As previously discussed, the generation of each cell index 2330 and each super cell index 2430 within a node device may be caused to be performed within a separate process with such processes distributed among multiple threads of execution supported by the processor 2350. However, each such process that is instantiated for the generation of a super cell index 2430 may have dependencies on the generation of the cell indexes 2330 for all of the data cells 2130 that are included in the super cell 2233 that corresponds to the super cell index 2430. More specifically, in some embodiments, each super cell index 2430 may include copies of the field value ranges 2338 generated within each of the corresponding cell indexes 2330, such that the super cell index 2430 cannot be completed until at least the field value range 2338 has been generated within each of the corresponding cell indexes 2330. Alternatively, in other embodiments, each super cell index 2430 may include a super cell field value range 2438 that specifies the highest and lowest values identified as present within a single data field 2134 across the data records 2133 of all of the data cells 2130 of the super cell 2233 to which the super cell index 2430 corresponds. In such other embodiments, the super cell field value range 2438 may be generated from the field value ranges 2338 of each of the corresponding cell indexes 2330, such that again, the super cell index 2430 cannot be completed until at least the field value range 2338 has been generated within each of the corresponding cell indexes 2330.

In embodiments in which the super cell index 2430 is to include a super cell field value range 2438 for a data field 2134, the highest and lowest data values indicated by the field value range 2338 for that data field 2134 from each corresponding cell index 2330 may be added to a data structure that may be used to sort such values, such as another binary tree. Again, other approaches to sorting such values, including and not limited to, another multi-layer skip list. Following such sorting of such values, the lowest and highest of the sorted values may be identified by the processor 2350 and used to generate the super cell field value range 2438, which uses those highest and lowest data values to specify the range of data values across all data cells 2130 within the corresponding super cell 2233.

Figure 18:
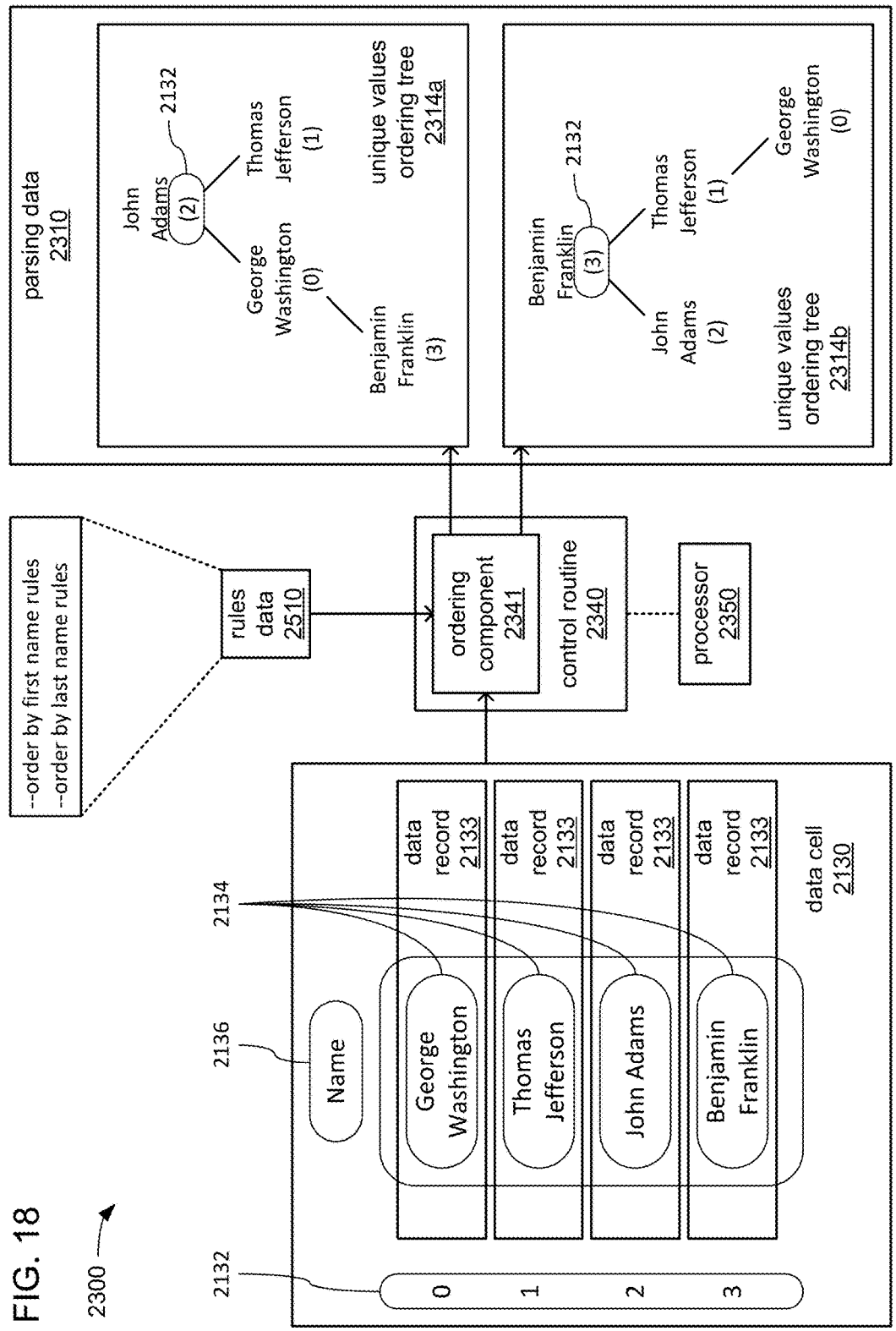
FIG. 18 illustrates an alternate example of assembling and indexing a portion of a data set within a node device.

Turning to FIG. 18, an alternate example of generating indexes from the data values of a single data field 2134 of the data records 2133 of another deliberately simplified example of a single data cell 2130 is presented to illustrate an example in which there is more than one rule for sorting the data values. Depicted is an alternate variant of the simplified data cell 2130 of FIG. 16B in which, for sake of simplicity of depiction, the character strings are stored directly in the single data field 2134, instead of within a data value vector 2135. As also depicted, instead of a single unique values ordering tree 2314 being generated from the data values in accordance with one or more rules for sorting data values for such a single unique values ordering tree 2314, a pair of unique values ordering trees 2314*a* and 2314*b* are depicted as generated in accordance with differing rules specifying two different approaches to sorting data values. Such rules may include the use of regular expressions and/or other means of flexibly identifying, parsing and/or matching patterns of characters within character strings to select one or more other rules to effect sorting. In this depicted example, the two different rules or sets of rules for parsing and sorting the data values are based on a difference in alphabetical sorting of names in which there is sorting by first name (i.e., by names of individual members of a family) in the unique values ordering tree 2314*a* and sorting by last name (i.e., by family names) in the unique values ordering tree 2314*b*. However, such an instance of multiple differing approaches to sorting data values may occur in any of a variety of contexts in which there may be differences in sorting based on such factors including, but not limited to, different cultural norms in the sorting of names (i.e., differences in linguistic collation), differences between languages in alphabetizing similar characters, differences in sorting portions of mathematical equations across different cultures and/or technical fields (i.e., differences between practices between two industries, or between an industry and academia), etc.

Although not specifically depicted, each of the two example unique value ordering trees may serve as the basis for generating corresponding separate unique value indexes. However, the both of the separate unique values ordering trees 2314*a* and 2314*b* may be accompanied by a single shared duplicate values table, since differences in rules for sorting would not affect the identification and the generation of indexing of any duplicate values. As a result, a single shared set of one or more duplicate value indexes may be generated.

Figure 19A:
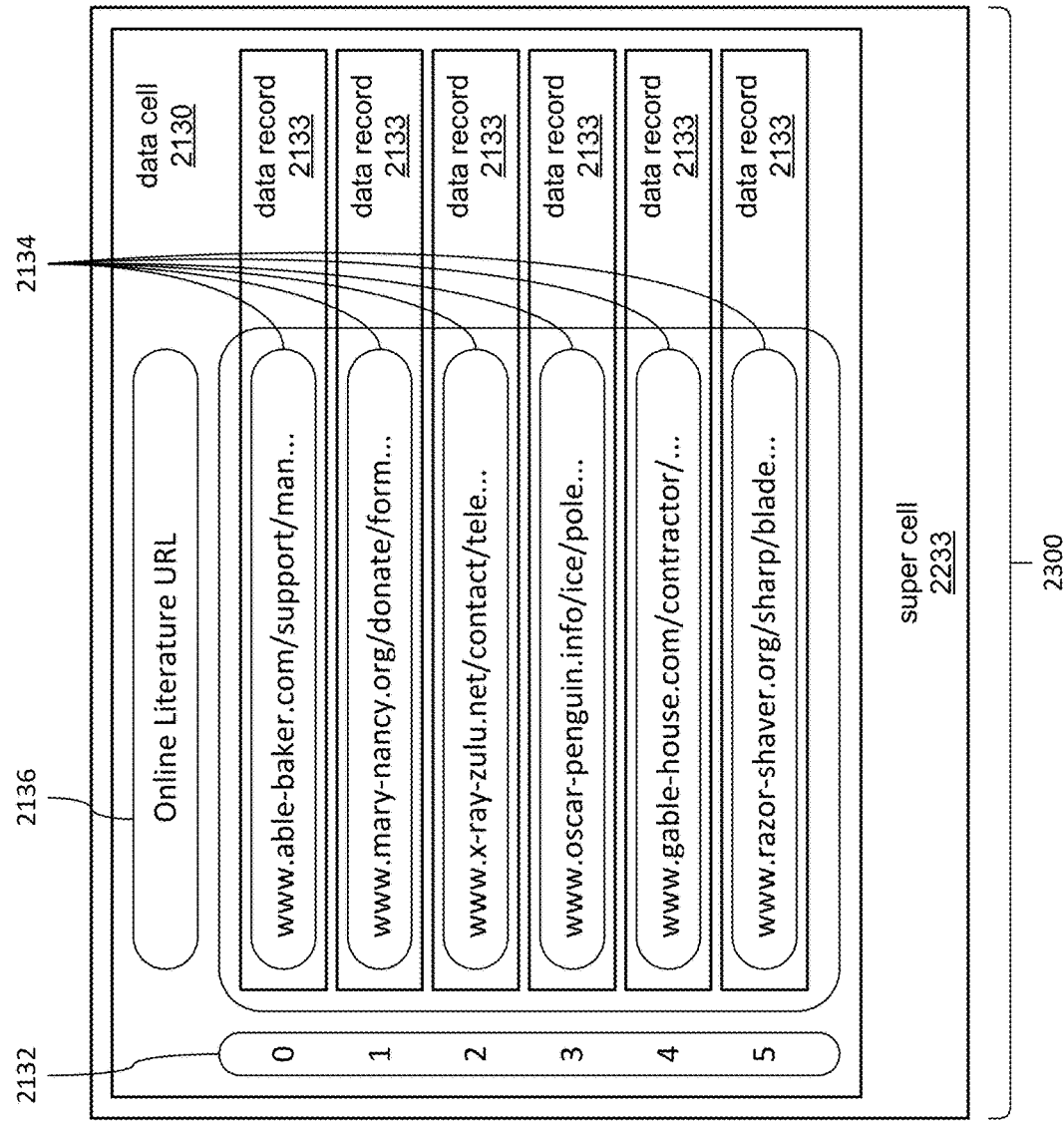
FIGS. 19A, 19B and 19C, together, illustrate another alternate example of assembling and indexing a portion of a data set within a node device.
Figure 19B:
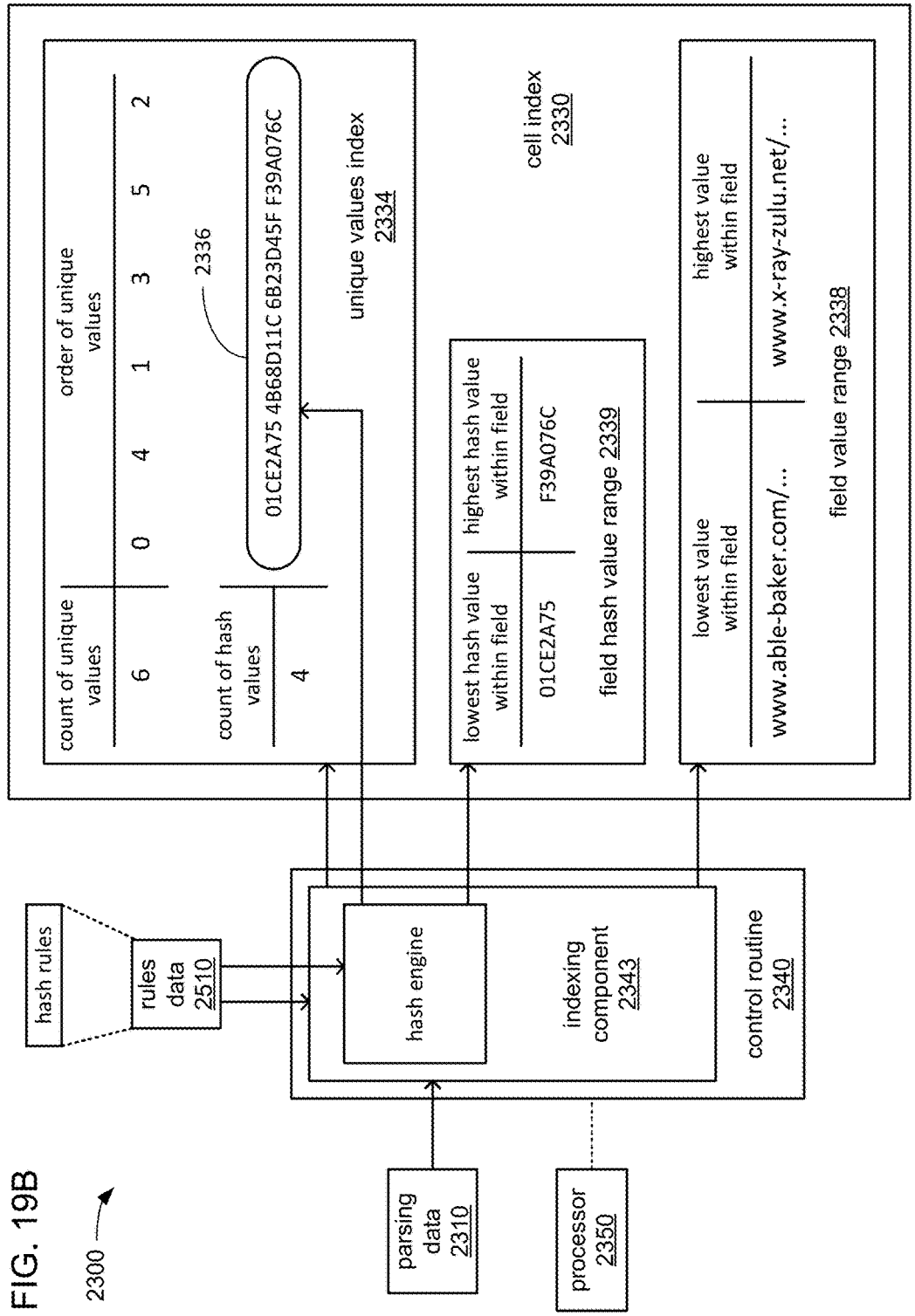
Figure 19C:
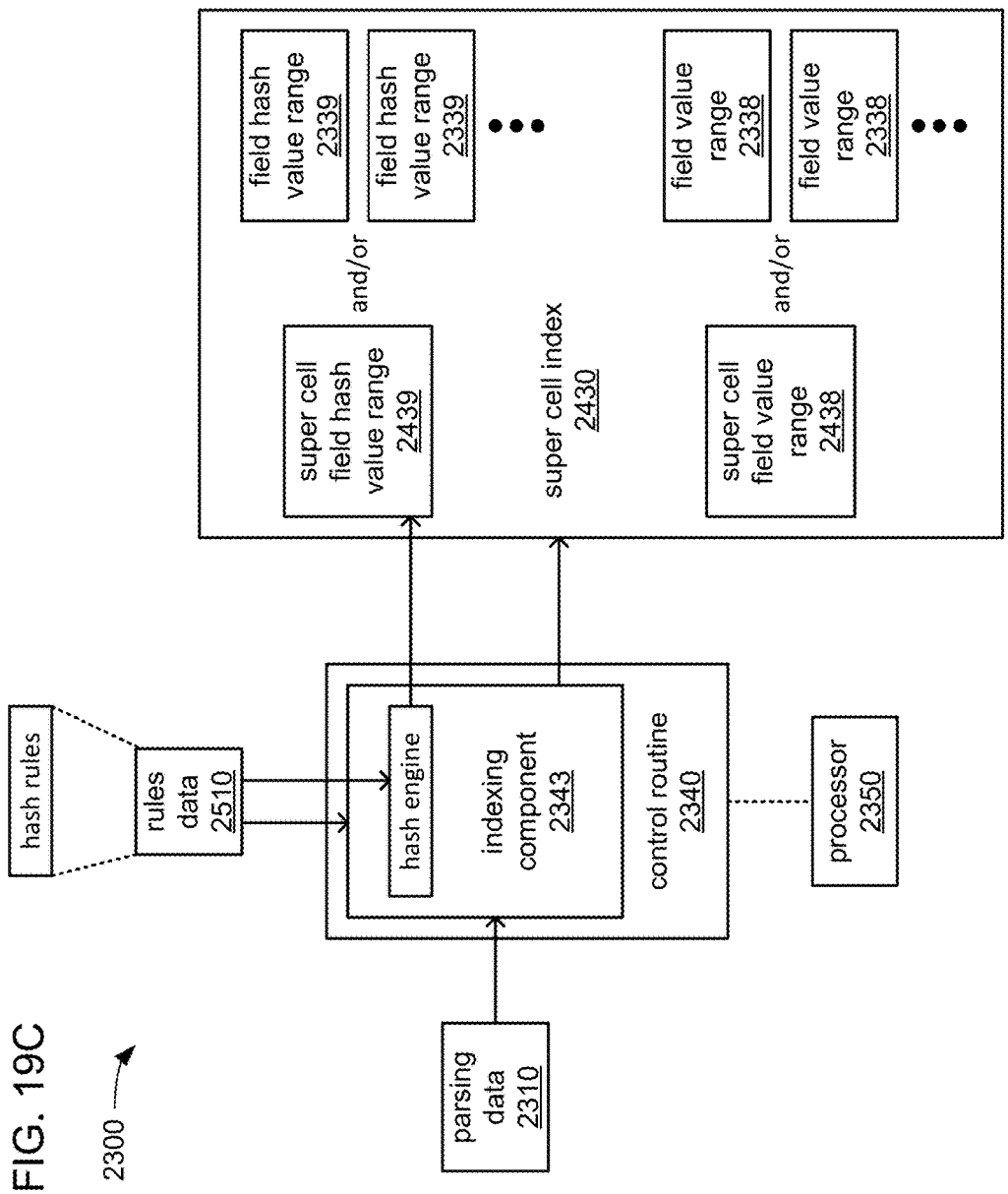

FIGS. 19A-C, taken together, depict another alternate example of generating indexes from the data values of a single data field 2134 of the data records 2133 of another deliberately simplified example of a single data cell 2130 in greater detail. Depicted is a simplified data cell 2130 in which another example of variable length character strings are stored. While the simplified examples of FIGS. 16B and 18 were of names, the simplified example of FIGS. 19A-C is of universal resource locators (URLs) of webpages. Like the example of FIG. 18, for sake of simplicity of depiction, the character strings are stored directly in the single data field 2134, instead of within a data value vector 2135. However, it is envisioned that, in the case of real data values that include character strings, especially long and/or variable length character strings, such indirect storage as depicted in FIG. 16B may be deemed desirable. While FIG. 19A provides the depiction of this simplified data cell 2130, FIGS. 19B and 19C depict various aspects of the generation of a corresponding cell index 2330 and a super cell index 2430 therefrom.

Turning to FIG. 19B, in a manner similar to what was depicted in FIGS. 17B and 17C, the corresponding cell index 2330 has been generated to include a unique values index 2334 and a field value range 2338. For sake of simplicity of presentation, a depiction of the intervening step of sorting the data values and distinguishing unique data values from duplicate data values has been omitted, as such a step may be substantially similar to what was earlier described in reference to FIG. 17A. Also for sake of simplicity of presentation, no duplicate value indexes 2337 are depicted.

In one departure from what was depicted in the earlier example of FIG. 17B, the unique values vector 2335 has been replaced with a hash values vector 2336 in which hashes generated from the unique values are arranged in an order that is based on a sorting the hash values into a numerical order (e.g., an ascending order of binary, decimal, hexadecimal, etc., values), and not based on the order into which the unique values among the data values would have been sorted using a binary tree or other approach. As depicted, the indexing component 2343 may include a hash engine to generate a hash value from each unique value among the data values identified within the single data field 2134 depicted in FIG. 19A.

The generation of hash values may, in some embodiments, be prompted by the fact that the data values are of variable length and/or are otherwise of large data size, while the hash values generated therefrom are able to be defined to have a preselected and relatively small data size, thereby making the hash values more amenable for use in generating a more compact form of vector, such as the hash values vector 2336. However, as will be familiar to those skilled in the art, in generating hash values from the data values, there is a possibility of collisions among the hash values in which there may be one or more instances in which two or more of the hash values are identical, despite having been generated from what may be considerably different data values that may also be of considerably different lengths. In recognition of this, duplicate hash values may not be included in the hash values vector 2336, such that the quantity of hash values in the hash values vector 2336 may be less than the quantity of unique data values. In recognition of this, and as depicted, the unique values index 2334 may include separate counts of unique values and hash values. Also, as a result of such differences in counts, as well as a result of the fact that the hash values are sorted differently from the unique values, the hash values within the hash values vector 2334 cannot be correlated to the record identifiers 2132 of the data records 2133 in which each of the unique values was identified as present within the single data field 2134, unlike the unique values within the unique values vector 2335 in the example of FIG. 17B. Instead, as will be explained in greater detail, the primary value of the hash values vector 2336 may be as an aid in determining whether the corresponding data cell 2130 includes data records 2133 that satisfy search criteria specified in an instance of the query instructions 2710.

As further depicted in FIG. 19B, the cell index 2330 may additionally include a field hash value range 2339 in which the range of the hash values generated from the unique values is specified with the highest and lowest hash values so generated. Turning to FIG. 19C, similar to what was depicted in FIG. 17C, the super cell index 2430 that corresponds to the super cell 2233 that includes the example data cell 2130 of FIG. 17A may include either the field value ranges 2338 from each of the corresponding cell indexes 2330 or a super cell field value range 2438. However, as also depicted in FIG. 19C, the super cell index 2430 may additionally include either the field hash value ranges 2339 from each of the corresponding cell indexes 2330 or a super cell field hash value range 2439 that may be derived from such field hash values ranges 2339 in a manner very much like the derivation of the super cell field value range 2438 from such field value ranges 2338. As will be explained in greater detail, the super cell field hash value range 2439 and/or the field hash value ranges 2339 may be used in identifying candidate super cells 2233 and/or candidate data cells 2130 in which there may be one or more data records 2130 that meet search criteria specified in an instance of the query instructions 2710.

Returning to FIG. 15A, with cell indexes 2330 and super cell index(es) 2430 generated within each of multiple node devices 2300 to correspond to the data cells 2130 and super cell(s) 2233, respectively, stored within each of those multiple node devices 2300, a complete data set index 2530 now exists and is distributed among those multiple node devices 2300 along with the data set 2230, thereby enabling distributed searching for and accessing of data within the data set 2230. As will shortly be explained in greater detail, in some embodiments, the control device 2500 or controller 2503 (along with the node devices 2300) may be involved in using the data set index 2530 to identify candidate super cells 2233 in which there may be data that meets search criteria specified in an instance of the query instructions 2710. In such embodiments, the processors 2350 of each of the node devices 2300 that has generated one or more super cell indexes 2430 may operate their corresponding network interfaces 2390 to transmit those generated super cell indexes 2430 to the control device 2500 or controller 2503. However, in other embodiments, the control device 2500 or controller 2503 may play no role in identifying candidate super cells 2233, and instead, such a function may be performed by the node devices 2300. In such other embodiments, no such transmission of super cell indexes 2430 may occur.

Figure 20A:
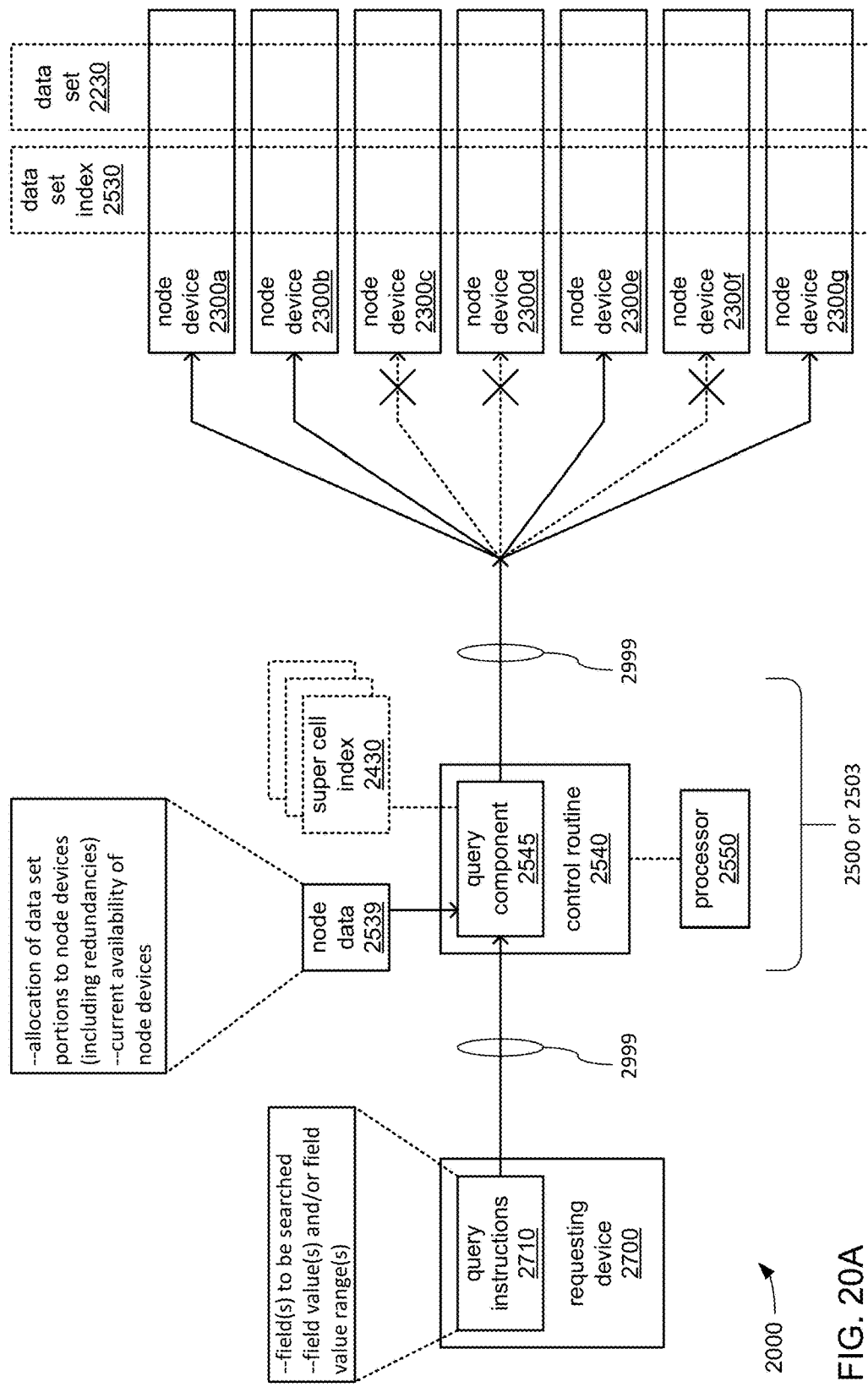
Figure 20B:
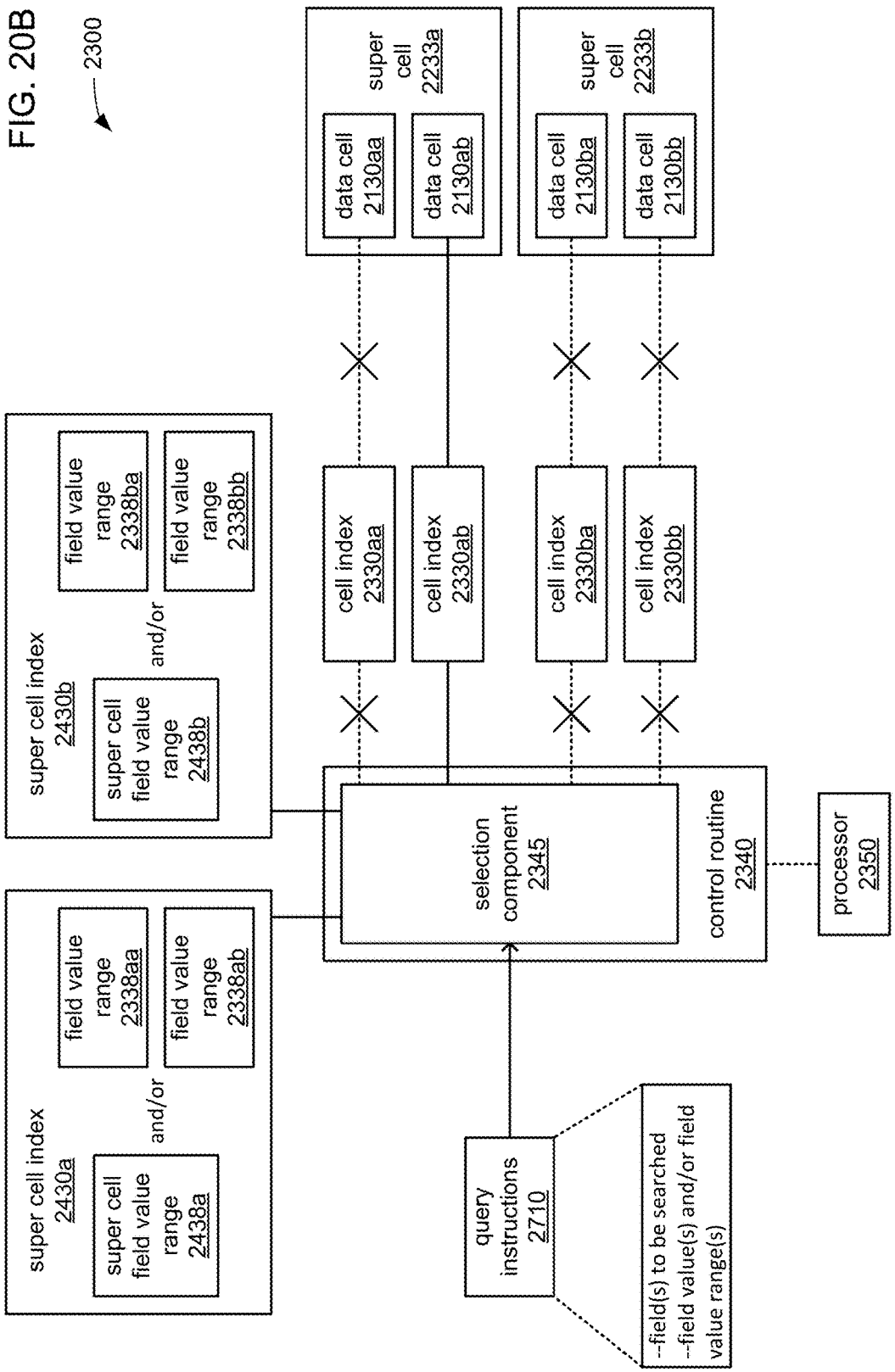
Figure 20E:
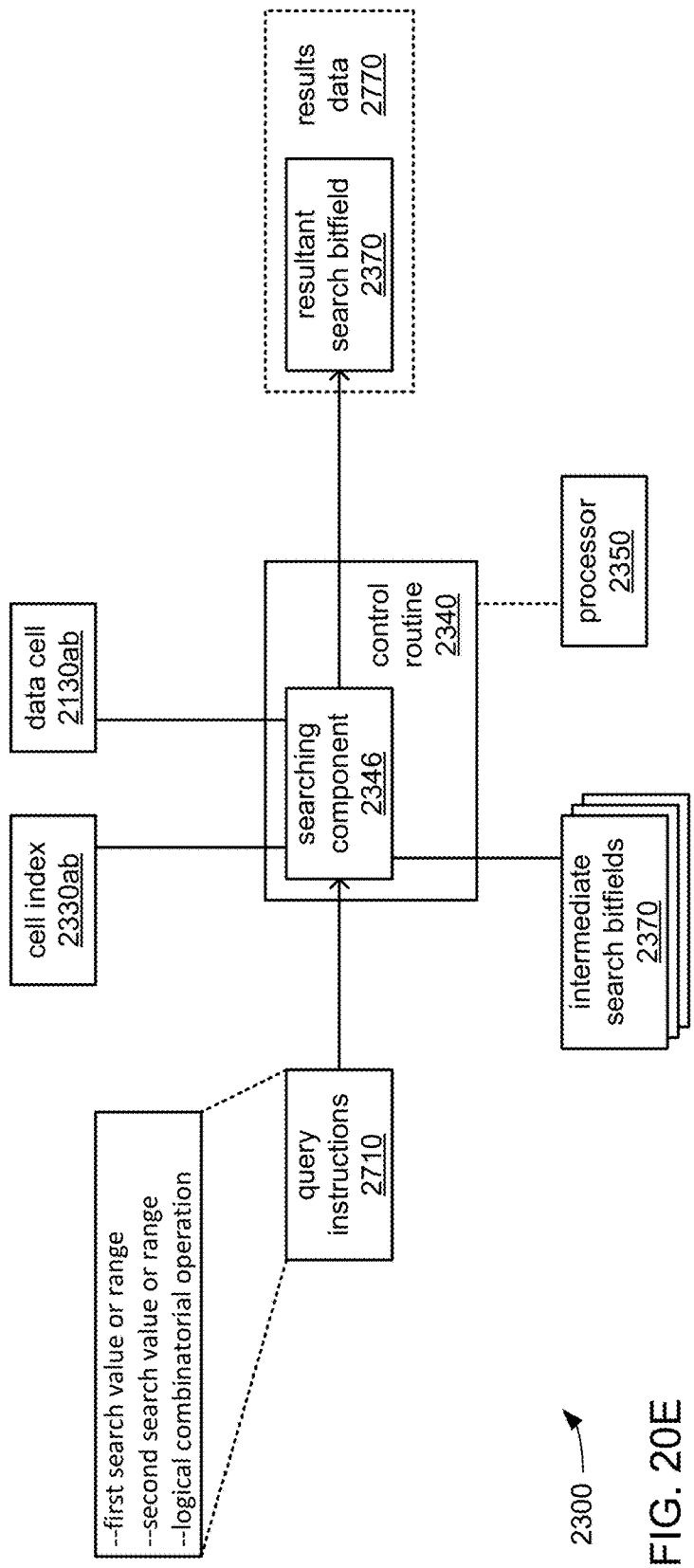

FIGS. 20A-F, taken together, depict an example of using super cell indexes 2430 and cell indexes 2330 of a data set index 2530 distributed among multiple node devices 2300 as part of performing a search of a data set 2230 also distributed among the multiple node devices 2300. Specifically, FIGS. 20A and 20B, taken together, depict aspects of the use of search criteria with portions of the data set index 2530 to identify candidate super cells 2233 and candidate data cells 2130 in which there may be data records 2133 that meet the search criteria. FIGS. 20C, 20D and 20E, taken together, depict aspects of the use of the search criteria with other portions of the data set index 2530 to search for data records 2133 within candidate data cell(s) 2130 that meet the search criteria.

Turning to FIG. 20A, in executing the control routine 2540, the processor 2550 of the control device 2500 or controller 2503 may be caused by the query component 2545 to receive an instance of the query instructions 2710 from the requesting device 2700. As has been discussed, the query instructions 2710 may include specifications of search criteria to be used in performing a search for data that meets the search criteria within the data set 2230. More specifically, the query instructions 2710 may set forth one or more specific data values and/or a range of data values as being required to be present within each of one or more specific data fields 2134 of a data record 2133 for that data record 2133 to be deemed as meeting the search criteria. More precisely, for a data field 2134 that is included within the search criteria, the query instructions 2710 may specify a range of data values that a data value within the data field 2134 of a data record 2133 must fall within for that data record 2133 to meet the search criteria for that data field. Additionally, the query instructions 2710 may specify multiple discrete data values that a data value within the data field 2134 of a data record 2133 must match one of for that data record 2133 to meet the search criteria for that data field. Or as another alternative, the query instructions 2710 may specify a single data value that must be matched by a data value within the data field 2134 of a data record 2133 for that data record 2133 to meet the search criteria for that data field. In various embodiments, the query instructions 2710 may so indicate such ranges of data values, such multitudes of discrete data values and/or such single data values as search criteria for each data field 2134 included in the search criteria using any of a variety of scripting language, database language, etc. By way of example, where multiple discrete data values are listed using the SQL database language, a WHERE IN clause may be used. The query instructions 2710 and/or rules data 2510 may also include regular expressions and/or other means of flexibly matching patterns within character strings that may be applied to values specified in the search criteria for the purpose of refining the index search.

It is envisioned that the search criteria for a search specified in the query instructions 2710 may frequently be specified as a logical AND of search criteria specified for each included data field 2134. However, it should be noted that the search criteria for a search may be specified as search criteria for each included data field 2134 that are combined using one or more other logical operators in lieu of or in addition to a logical AND. By way of example, an instance of the query instructions 2710 may specify the search criteria as a logical OR of search criteria for two data fields 2134 such that a data record 2133 may be deemed as meeting the search criteria if one data field 2134 includes a data value that matches a specified data value or falls within a specified range of data values for that data field 2134, OR if another data field 2134 includes a data value that matches another specified data value or falls within another specified range of data values.

In some embodiments, an instance of the query instructions 2710 that are provided to the control device 2500 or controller 2503 may simply be relayed to the node devices 2300. In such embodiments, the processor 2550 of the control device 2500 or controller 2503 may not make any determinations of which ones of the node devices 2300 are to be provided with the query instructions 2710, and/or which are not to be so provided, such that the processing, storage, network and/or other resources of each node devices 2300 may be utilized in searching for data records 2133 that meet the search criteria.

However, as has been discussed, in some embodiments, the manner in which the data set 2230 and the corresponding data set index 2530 may be distributed among the node devices 2300 may include the distribution of redundant copies of the super cells 2233 among the node devices 2300 to avoid loss of data in the event of a failure occurring within one or more of the node devices 2300. Alternatively or additionally, there may be other reasons for the distribution of multiple copies of each super cell 2233 among the node devices 2300, including and not limited to, enabling greater parallelism and/or more efficient load balancing by creating one or more identical side-by-side sets of node devices 2300 to which the same super cells 2233 are distributed. Therefore, it may not be necessary to relay the query instructions 2710 to all of the node devices 2300 to which one or more of the super cells 2233 have been distributed to ensure that a search specified in the query instructions is performed with the entirety of the data set 2230. In such embodiments, it may be deemed desirable to engage less than all of such node devices 2300 in such a search, as part of an approach to load balancing of multiple searches among the node devices 2300 and/or as part of avoiding instances of inefficiency in which the same super cell 2233 is being engaged in the same search across multiple node devices 2300.

As has been discussed, indications of which super cell 2233 of the data set 2230 have been distributed to which node devices 2300, including any redundant copies, may be stored as part of the node data 2539. Therefore, as part of selecting node devices 2300 to be the ones to which an instance of the query instructions 2710 is to be relayed so as to become involved in performing a search specified therein, the processor 2550 may be caused to retrieve and use such indications from the node data 2539, as well as indications therefrom of which node devices 2300 may be known to be currently unavailable, due to any of a variety of possible situations, including and not limited to, an error condition, having its resources currently fully engaged, or being taken offline for maintenance or other purposes (e.g., as part of an implementation of an elastic grid of the node devices 2300). Upon making such selections, the processor 2550 may then be caused to relay the instance of the query instructions 2710 to the selected ones of the node devices 2300, as depicted in FIG. 20A, which depicts the relaying of query instructions 2710 to node devices 2300a, b, e and g, but not to node devices 2300c, d and f.

Alternatively or additionally, in embodiments in which the control device 2500 or controller 2503 is utilized to identify candidate super cells that may each include at least one data cell 2130 that may include at least one data record 2133 that meets the search criteria, the processor 2550 may be caused to employ determinations of which super cells 2233 are identified as candidate super cells as a factor in selecting node devices 2300 to which to relay an instance of the query instructions 2710. More specifically, the processor 2550 may be caused by the query component 2545 to compare the specified data values and/or specified ranges of data values for one or more specified data fields 2134 that define the search criteria to the super cell field value range 2438 and/or the field value ranges 2338 included in each super cell index 2430 received from the node devices 2300. For each data field 2134 included in the search criteria, and which has been indexed such that at least a range of data values is provided in a super cell index 2430, if such a comparison shows at least some degree of overlap between specified data value(s) and/or specified range(s) of data values of the search criteria and corresponding range(s) of data values indicated in the super cell index 2430 for either the entire corresponding super cell 2233 or a data cell 2130 within the corresponding super cell 2233, then the corresponding super cell 2233 may be identified by the processor 2550 as a candidate super cell.

It should be noted that the manner in which candidate super cells are identified is affected by the logical operator(s) used in the search criteria. By way of example, where the search criteria combines all of the individual search criteria for each of the included data fields 2134 with a logical AND, then a super cell 2233 can only be a candidate super cell if the individual search criteria are met for all of the data fields 2134 that are included in the search criteria and for which there is index information present in the corresponding super cell index 2430. In contrast, and by way of another example, where the search criteria combines all of the individual search criteria for each of the included data fields 2134 with a logical OR, then a super cell 2233 can be a candidate super cell if any individual search criteria is met for any of the data fields 2134 that are included in the search criteria and for which there is index information present in the corresponding super cell index 2430. Indeed, where the individual search criteria for each of the include data fields 2134 are combined in such a manner with a logical OR, the analysis using the search criteria and the index information within a super cell index 2430 to determine whether the corresponding super cell 2233 is a candidate super cell can be ended once any of the individual search criteria for any one of the include data fields 2134 is determined to be met.

As previously discussed, as a measure to improve the speed and/or efficiency of such comparisons, the processor 2550 may be selected to be of a type that is capable of supporting multiple threads of execution (e.g., incorporating multiple processor cores 2555), and the performance of such comparisons with the super cell field value range 2438 and/or the field value ranges 2338 of each super cell index 2430 may be performed in a separate process, with the separate processes being distributed among the multiple threads of execution supported by the processor 2550. Thus, the determination of whether each of the super cells 2233 of the data set 2230 is a candidate super cell may be made in separate processes. For each such process that ends with a determination that the corresponding super cell 2233 is identified as a candidate super cell, the processor 2550 may be caused to relay the instance of the query instructions 2710 to a node device 2300 that stores that identified candidate super cell 2233, along with an indication of which super cell 2233 was identified as a candidate super cell. Otherwise, for each such process that ends with a determination that the corresponding super cell 2233 is not identified as a candidate super cell, the processor 2550 may not be caused by that process to so relay an instance of the query instructions. In this way, determinations of whether or not each super cell 2233 is a candidate super cell may be made at least partially in parallel, and without interprocess dependencies.

Turning to FIG. 20B, an example one of the node devices 2300 to which the instance of the query instructions 2710 received by the control device 2500 or controller 2503 has been relayed is depicted as storing example super cells 2233a and 2233b that each include only two data cells 2130. It should be noted that the example super cells 2233a and 2233b are deliberately simplified examples of super cells 2233 that are presented in FIG. 20B to illustrate an example identification of a candidate super cell 2233 and of a candidate data cell 2130. As has been discussed, it is envisioned that real super cells 2233 of a real data set 2230 would include numerous data cells 2130.

In embodiments in which the control device 2500 or controller 2503 does not perform the task of identifying candidate super cells 2233, the processor 2350 of each of the node devices 2300 to which the instance of the query instructions 2710 is relayed is caused to perform that function by the selection component 2345. More specifically, the processor 2350 of the example node device 2300 may be caused to compare the specified data values and/or specified ranges of data values for one or more specified data fields 2134 that define the search criteria in the query instructions 2710 to the super cell field value range 2438a and/or the field value ranges 2338aa and 2338ab included in the super cell index 2430a, and to the super cell field value range 2438b and/or the field value ranges 2338ba and 2338bb included in the super cell index 2430b that correspond to each of the one or more specified data fields. As depicted, such comparisons lead to the super cell 2233a being identified as a candidate super cell 2233 that may include a candidate data cell 2130 that may include one or more data records 2133 that may meet the search criteria, while the super cell 2233b is not identified as a candidate super cell.

However, in embodiments in which the control device 2500 or controller 2503 does perform the task of identifying candidate super cells 2233, then the act of relaying the instance of the query instructions to the example node device 2300 may serve as an indication that at least one of the super cells 2233a and 2233b has been identified as a candidate super cell. As earlier discussed, the control device 2500 or controller 2503 may also transmit an indication to the example node device 2300 that the super cell 2233a is the identified candidate super cell.

Regardless of whether the super cell 2233a is identified as a candidate super cell by the processor 2350 of the example node device 2300 or by the processor 2550 of the control device 2500 or controller 2503, the processor 2350 may be caused by the selection component 2345 to perform comparisons of the search criteria specified by the received instance of the query instructions 2710 to at least the indications of ranges of data values within each of the cell indexes 2330aa and 2330ab that correspond to the two data cells 2130aa and 2130ab, respectively, that are included in the super cell 2233a. Such comparisons may be similar in nature to the those performed with super cell indexes 2430 by which the super cell 2233a was identified as a candidate super cell. Since the super cell 2233b is not identified as a candidate super cell, neither of the cell indexes 2330ba and 2330bb that correspond to the two data cells 2130ba and 2130bb, respectively, are used in such a comparison. As depicted, such comparisons lead to the data cell 2130ab being identified as a candidate data cell 2130 that may include one or more data records 2133 that may meet the search criteria, while the data cell 2130aa is not identified as a candidate data cell.

However, as previously discussed, beyond indications of data values being included in cell indexes 2330 to enable identification of candidate data cells in the form of field value ranges 2338, in some embodiments, the cell indexes 2330 of a data set index 2530 may each include one or more other pieces of information by which each corresponding data cell 2130 may also be identified as a candidate data cell or ruled out as not being a candidate super cell. Among such additional pieces of information that have been discussed, and which may be so included, may be unique values vectors 2335 and/or hash values vectors 2336.

It should be noted that, similar to the identification of candidate super cells, the manner in which candidate data cells are identified is also affected by the logical operator(s) used in the search criteria. By way of example, where the search criteria combines all of the individual search criteria for each of the included data fields 2134 with a logical AND, then a data cell 2130 can only be a candidate data cell if the individual search criteria are met for all of the data fields 2134 that are included in the search criteria and for which there is index information present in the corresponding data cell index 2330. In contrast, and by way of another example, where the search criteria combines all of the individual search criteria for each of the included data fields 2134 with a logical OR, then a data cell 2130 can be a candidate data cell if any individual search criteria is met for any of the data fields 2134 that are included in the search criteria and for which there is index information present in the corresponding cell index 2330. Indeed, where the individual search criteria for each of the include data fields 2134 are combined in such a manner with a logical OR, the analysis using the search criteria and the index information within a cell index 2330 to determine whether the corresponding data cell 2130 is a candidate data cell can be ended once any of the individual search criteria for any one of the include data fields 2134 is determined to be met.

Turning to FIG. 20C, the cell index 2330ab corresponding to the data cell 2130ab of the example super cell 2233a is depicted as additionally including a unique values vector 2335 that includes a quantity of four unique values that were earlier identified as present with a particular data field 2134 among the data records 2133 within the data cell 2130ab. Again, the example super cells 2233a and 2233b are deliberately simplified examples of super cells 2233 presented for purposes of illustration, and it is envisioned that a real data cell 2130 of a real super cell 2233 would have numerous data records 2133 such that a unique values vector 2335 would likely include numerous unique values (depending on the cardinality of thereof).

With the inclusion of the depicted unique values vector 2335, the processor 2350 is additionally able to efficiently compare each of the unique values therein to the one or more data values or the range of data values specified in the instance of the query instructions 2710 for the specific data field 2134 to which the unique values vector 2335 corresponds. As depicted, the use of a vector data structure enables at least sizable portions of the unique values vector 2335 to be loaded within a single cache line 2357 of a cache 2356 of the processor 2350, thereby allowing such comparisons with the unique values therein to be made more speedily. Also, where the unique values vector 2335 includes unique values of a data type in which the unique values are all of the same data size (e.g., all occupying a byte, a word, a doubleword, a quadword, etc.), the use of a vector data structure enables advantage to be taken of single-instruction multiple-data (SIMD) instructions and/or other SIMD features that may be supported by the one or more processor cores 2355 of each of the processors 2300 of the node devices 2300. Through such comparisons, the processor 2350 is able to determine whether there are any values in the corresponding data field 2134 of any of the data records 2133 of the data cell 2130ab that meet the search criteria for the corresponding data field 2134. As a result, the processor 2350 is able to use the unique values vector 2335 as part of the analysis by which the data cell 2130ab could be ruled out as a candidate data cell, and if not so ruled out, the processor 2350 is able to confirm whether there is at least one data record 2133 that meets the search criteria for at least the corresponding data field 2134. The inclusion of unique values vectors in a cell index 2330 may become even more valuable for more speedily performing such searches in embodiments in which the corresponding data cells 2130 are compressed such that the time required to access the corresponding data cells 2130 as part of searching therein may be considerably increased due to the need to decompress each data cell 2130 so searched.

Indeed, if each data field 2134 that is included in the search criteria has a corresponding unique values vector 2335, then data records 2133 that meet the search criteria for all of the included data fields 2134 could be identified solely from such analyses of such unique values vectors 2335 without accessing any of the data records 2133 within the data cell 2130ab, itself, which may considerably increase the speed with which such data records 2133 may be identified. As a result, a search bitfield 2370 may be generated that includes a bit value for each data record 2133 present within the data cell 2130ab. Each of the bits of the search bitfield 2370 may be set to a "0" or "1" value to indicate whether its corresponding data record 2133 has been identified as meeting the search criteria. Where the query instructions 2710 request only an indication of what data records 2133 meet the search criteria, then as depicted, the processor 2350 may be caused by the searching component 2346 to transmit the search bitfield 2370 to the control device 2500 or controller 2503, where it may be directly included in the results data 2770 that is transmitted to the requesting device 2700 as a response to the query instructions 2710. It should be noted that, although bitfields 2370 are discussed herein as generated to provide indications of which data records 2133 within each data cell 2130 are or are not identified as meeting the search criteria, any of a variety of other data structures may be used in which indications of which data records 2133 do and/or do not meet the search criteria may be indicated in any of a variety of ways. By way of example a vector, linked list, or other data structure that includes the record identifiers 2132 of the data records 2133 that meet the search criteria may be generated.

Where the query instructions 2710 request the provision of each of the data records 2133 that meet the search criteria (or at least a requested subset of the data values therefrom), instead of a bitfield or other data structure that identifies which data records 2133 meet the search criteria, the processor 2350 may be caused by the searching component 2346 to access the data cell 2130ab to access each such data record 2133, and then transmit each of those data records 2133 (or the requested subset of data values therefrom) to the control device 2500 or controller 2503 to be included in the results data 2770 transmitted to the requesting device 2700.

Figure 20F:
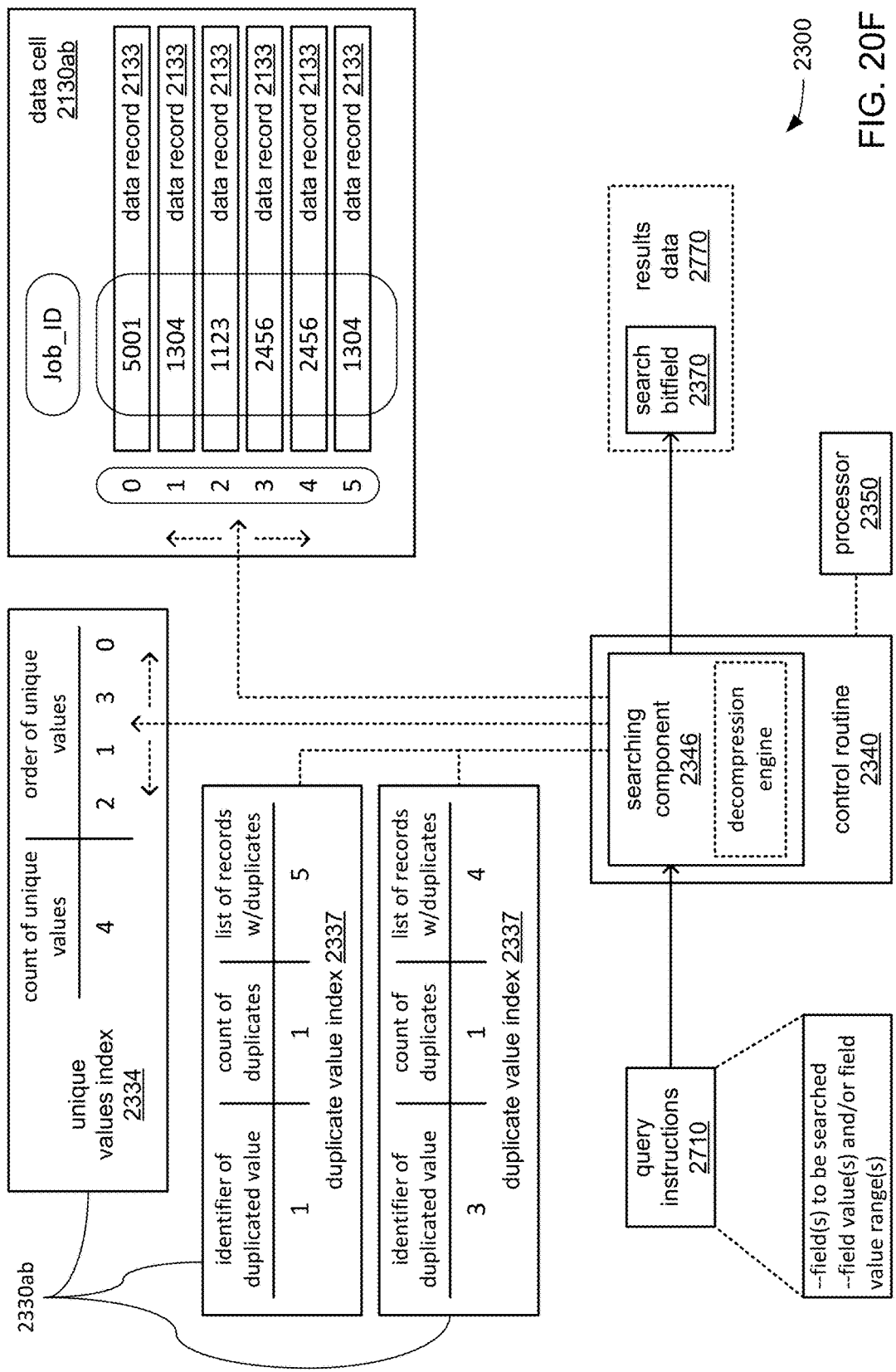

Turning to FIGS. 20D, 20E and 20F, aspects of an alternate situation are presented in which the cell index 2330ab corresponding to the data cell 2130ab of the example super cell 2233a does not include such additional information as the unique values vector 2335 depicted in FIG. 20C. In this alternate situation without the benefit of having the ability to search through unique values in a vector data structure that is separate from the data cell 2130ab, the data cell 2130ab, after being identified as a candidate data cell as discussed in regard to FIG. 20B, must be searched, itself, to finally determine whether there are any data records 2133 therein that meet the search criteria.

Turning more specifically to FIG. 20D, where the search criteria specified by the received instance of the query instructions 2710 includes data values of more than one data field 2134, and where the search criteria requires that the search criteria associated with all of those data fields 2134 be met (i.e., where a logical AND is used to combine the search criteria associated with all of those data fields 2134), the processor component 2350 may be caused by the searching component 2346 to retrieve, for each such data field 2134, the count of unique values in the unique values index 2334 and any counts of any duplicates thereof from any corresponding duplicate value indexes 2337 that may be present in the cell index 2330ab for the data cell 2130ab. The processor 2350 may then analyze such counts for each of the data fields 2134 included in the search criteria to determine the relative degrees of cardinality of the data values present within each of those data fields 2134. The processor 2350 may then determine the order in which to search each of those data fields 2134 based on the relative cardinalities of the data values present therein. More specifically, the processor 2350 may start such searching with the data field 2134 in which the data values exhibit the highest cardinality to most quickly rule out data records 2133 of the data cell 2130ab that don't meet the search criteria as part of an approach to more efficiently and speedily rule out the data cell 2130ab as a candidate data cell if it should prove to be the case that none of the data records 2133 therein meet the search criteria.

It should be noted that such use of counts of unique values in unique values indexes 2334 and/or counts of any duplicates thereof in any corresponding duplicate value indexes 2337 may also be used in determining which unique values vector 2335 to use in performing a search (as was discussed in regards to FIG. 20C) in situations where there are unique values vectors 2335 for more than one of the data fields 2134 that are included in the search criteria. Although the use of unique values vectors 2335 to perform a search may be considerably faster than directly searching data records 2133, it may still be deemed desirable to derive an order of searches using unique values vectors 2335 to even more quickly rule out data cells 2130 and/or to even more quickly narrow the quantity of data records 2133 that may still meet the search criteria.

Turning more specifically to FIG. 20E, as part of the approach just described in regard to FIG. 20D for more quickly ruling out data records 2133 that don't meet the search criteria, the processor 2350 may be caused to generate an intermediate search bitfield 2370 as each search of data values within one of the data fields 2134 is completed. In each such intermediate search bitfield 2370, a single bit may be present for each data record 2133 within the data cell 2130ab, and may indicate which ones of the data records 2133 were found to have a data value in the corresponding data field 2134 that met the search criteria for that data field 2134.

Where the search criteria requires that the search criteria associated with all of the data fields 2134 included in the search criteria be met (i.e., where a logical AND is used to combine the search criteria associated with all of those data fields 2134), at least a subset of such intermediate bitfields 2370 may be used to implement a progressive narrowing of the search of the data records 2133 as each data field 2134 is searched. More specifically, as each search of a data field 2134 is completed, resulting in the generation of a corresponding one of the intermediate search bitfields, the processor 2350 may narrow the data records 2133 that are searched in the search involving the next data field 2134 to just those data records 2133 that were indicated to meet the search criteria in the intermediate search bitfield 2370 generated in the search involving the preceding data field 2134. In this way, each subsequent search involving another of the data fields 2134 includes an ever smaller quantity of data records 2133 to be searched (thereby becoming ever quicker). The searches involving each different data field 2134 then continue until there are no longer any data records 2134 that meet the search criteria for all data fields 2134 that have been searched so far, such that there can be no data records 2133 in the data cell 2130ab that meet all of the search criteria for all of the data fields 2134 included in the search criteria; or until there are no more data fields 2134 for which another search is required, such that there may be one or more data records 2133 that do meet all of the search criteria for all of the data fields 2134. In the latter case, where there is at least one of the data records 2133 that does meet the entirety of the search criteria, then a resultant search bitfield indicating the data records 2133 that do so meet the search criteria may be generated. The resultant search bitfield 2370, the data records 2133 so identified as meeting the search criteria, and/or a subset of the data values of each such data record 2133 may then be transmitted by the processor 2350 to the control device 2500 or controller 2503 for inclusion in the results data 2770 transmitted to the requesting device 2700.

However, where the search criteria employs one or more other logical operators to combine search criteria associated with each of multiple data fields 2134 (e.g., a logical OR), then the intermediate search bitfields 2370 may not be used to in any way narrow such searching through the data fields 2134. Instead, each intermediate search bitfield 2370 may be separately generated for a corresponding one of the data fields 2134 included in the search criteria, and then the bits of the resulting multiple intermediate search bitfields 2370 may be combined in a manner that employs the one or more logical operators specified in the search criteria for combining the search criteria of the data fields 2134 included in the search criteria.

FIG. 20F depicts aspects of the performance of a search through the data records 2133 of the data cell 2130ab in connection with a single data field 2134 thereof. It should be noted that this depiction of a search involving just a single data field 2134 is to provide a deliberately simplified example of directly searching data records 2133 for purposes of illustration. Such details as are depicted in FIG. 20F are applicable regardless of whether the search criteria includes just a single data field 2134 such that there may be just single search through the data records 2133, or the search criteria includes more than one of the data fields 2134 such that there may be multiple searches through the data records 2133. It is envisioned that real search criteria provided in an instance of the query instructions 2710 will often include specified data values and/or ranges of data values for multiple data fields 2134.

In some embodiments, each search in connection with a single data field 2134 may be performed as a binary search guided by the order of record identifiers 2132 provided in the unique values index 2334 associated with the single data field 2134. In some of such embodiments, the use of binary searching may continue throughout the entirety of the search. However, in others of such embodiments, after binary searching is employed to locate a first unique data value within the single data field 2134 that meets the search criteria for the single data field 2134, skip list searching, sequential forward or backward traversal, or any of a variety of other searching techniques, including the use of regular expressions and/or other means of flexibly matching patterns within character strings that may be applied to indexed field values of fixed or variable-length character data types, may then be used to locate one or more subsequent unique values within the single data field that meet the search criteria for the single data field 2134. For any data record 2133 that is identified as including a unique data value in the single data field 2134 that meets the search criteria for the single data field 2134, an indication thereof may be made in a search bitfield 2370, as previously discussed. Additionally, where any such unique value is identified, and there is a duplicate value index 2337 that corresponds to that unique value, indications of the one or more data records 2134 that include a duplicate of that unique value may also be made in the search bitfield 2370.

Figure 21:
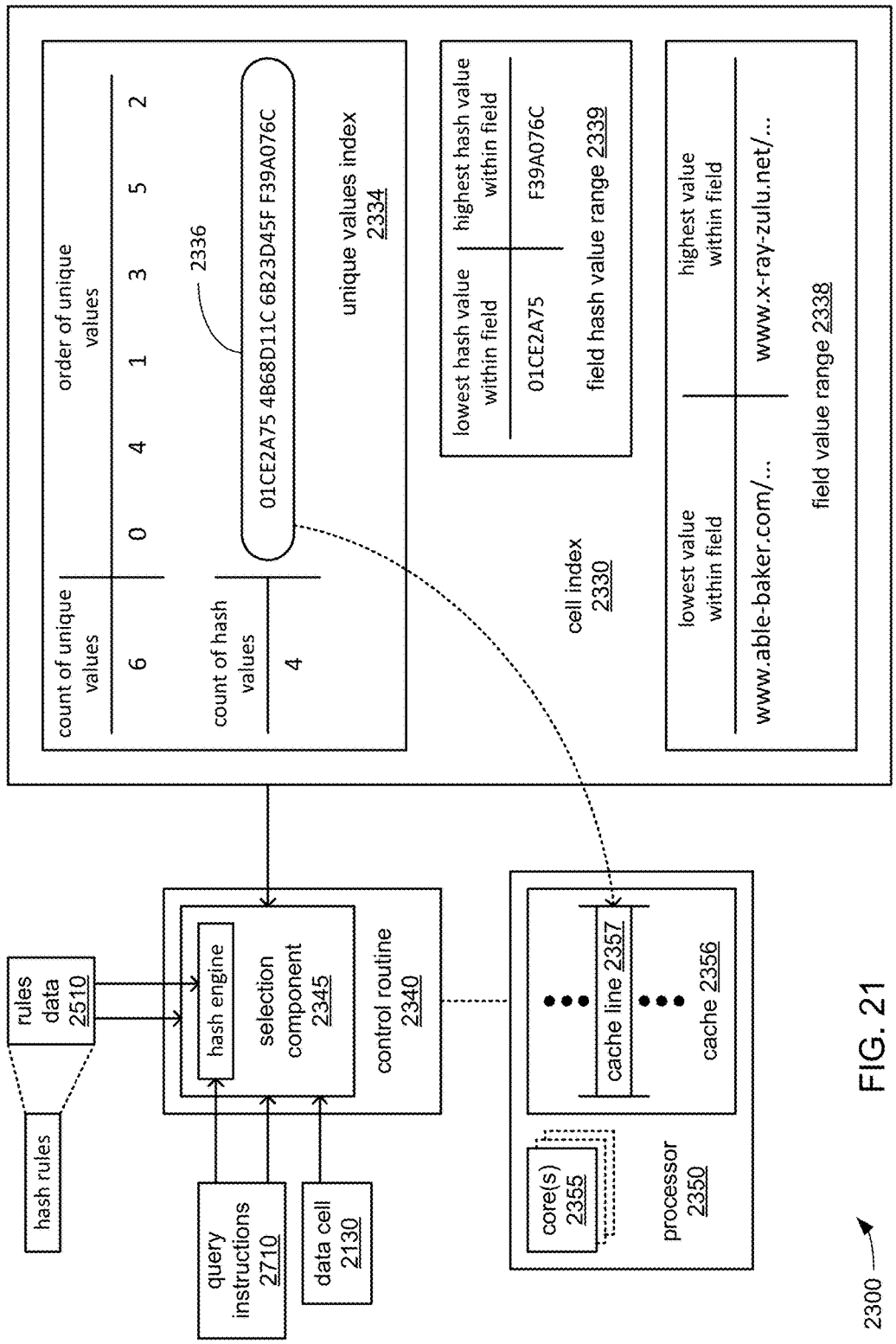
FIG. 21 illustrates an alternate example of searching within a portion of the data set OF FIGS. 19A-C within a node device.

Turning to FIG. 21, an alternate example is presented of a cell index 2330 including additional information, beyond unique values indexes 2334 and/or duplicate value indexes 2337, by which the corresponding data cell 2130 is able to be ruled out as candidate data cell. More specifically, the cell index 2330 generated from the example data cell 2130 in FIGS. 19A-C is presented to provide an example of the use of the hash values to determine whether the data cell 2130 of FIGS. 19A-C is a candidate data cell in a search specified by an instance of the query instructions 2710.

As was earlier discussed in reference to FIGS. 19A-C, where the data values of a data field 2134 each occupy a large amount of storage space and/or where the data values of a data field 2134 are of variable length (e.g., text strings, audio data, video data, etc.), either generating or using a unique values vector 2335 in which multiple ones of such data values are combined to form a vector data structure may be deemed impractical. Therefore, as was also discussed, hash values that are each of a smaller and fixed data size may be generated from each of such unwieldy data values, and such hash values may then be combined to form hash values vector 2336. Alternatively or additionally, the highest and lowest hash values so generated may be used to define a field hash value range 2339.

Further, very much like the manner in which highest and lowest unique values specified in field value ranges 2338 of multiple cell indexes 2330 may be used to form a super cell field value range 2438 within a corresponding super cell index 2430, the highest and lowest hash values in field hash value ranges 2339 of multiple cell indexes 2330 may be used to form a super cell field hash value range 2439 within a corresponding super cell index 2430 (see FIG. 19C). Where the search criteria specified in an instance of the query instructions specifies one or more data values (each specified explicitly as a discrete value, and not by specifying a range) for a specified data field 2134, a hash value may be generated of each specified data value, and the resulting one or more hash values may each be compared to a super cell field hash value range 2439 included in a super cell index 2430 for that specified data field 2134 as part of determining whether the corresponding super cell 2233 is a candidate super cell.

Returning more specifically to FIG. 21, the processor 2350 may be caused by the selection component 2345 to similarly use the depicted field hash value range 2339 in a comparison with one or more hash values generated from one or more discrete data values specified for a specific data field 2134 in the search criteria as part of determining whether the corresponding data cell 2130 is ruled out as being a candidate data cell prior to the performance of any search of its data records 2133. This may be done alongside the processor 2350 also being caused to similarly also use the field value range 2338 in a comparison with the single data value specified in the search criteria as part of determining whether the corresponding data cell 2130 is so ruled out. It should be noted that, in some embodiments where the data values of specified data field 2134 are of unwieldy size and/or of variable length such that each comparison involving one of the data values may consume considerably more processing and/or storage resources than each comparison involving a hash value generated therefrom, the comparison(s) involving the hash values may be performed before the comparison(s) involving the unique values. This may be deemed desirable to provide an opportunity for the corresponding super cell 2130 to be ruled out, which may allow the comparison(s) involving the unique values to be entirely avoided.

Presuming that the corresponding data cell 2130 is not ruled out as a candidate data cell through such comparisons involving ranges of values, each hash value generated from a data value specified in the search criteria for the specific data field 2134 may then be compared to the hash values within the hash value vector 2336 corresponding to the specific data field 2134 to again determine whether the corresponding data cell 2130 is ruled out as a candidate data cell. As previously discussed, the hash values within the hash values vector 2336 may be arranged in either ascending or descending order by their values. This enables a binary search (or other type of search) to be performed within the hash values vector 2336 to determine whether each discrete single data value specified in the search criteria for the specific data field 2134 is present within the hash values vector 2336 as part of determining whether the corresponding data cell 2130 is ruled out as a candidate data cell. As depicted, the use of a vector data structure enables at least sizable portions of the hash values vector 2336 to be loaded within a single cache line 2357 of a cache 2356 of the processor 2350, thereby allowing such a search to be performed more speedily. Also, due to the hash values vector 2336 including hash values that are all of the same data size, the use of a vector data structure enables advantage to be taken of SIMD instructions and/or other SIMD features that may be supported by the one or more processor cores 2355 of each of the processors 2300 of the node devices 2300.

As previously discussed, within a unique values vector 2335 the unique values are organized in an order that mirrors the order in which the record identifiers 2132 are organized within the unique values index 2334, thereby correlating each of the unique values to the record identifier 2132 of the data record in which the unique value is present. However, as also previously discussed, the fact that the hash values are organized in a different order according to their values (e.g., an ascending or descending order by value) to enable searches of the hash value vector 2336 to be more efficiently performed results in the hash values within the hash value vector 2336 not being so correlated to record identifiers 2132. As a result, although the hash value vector 2336 may be used as another mechanism by which to rule out its corresponding data cell 2130 as a candidate data cell 2130, the hash value vector 2336 is not able to be used as a mechanism to search for data records 2133 of the corresponding data cell 2130 that meet the search criteria in the same manner in which a unique values vectors 2335 may be used. Thus, presuming that the corresponding data cell 2130 is not ruled out as a candidate data cell, a search will need to be performed that entails accessing data records 2133 within the corresponding data cell 2130, unless there is also a corresponding unique values vector 2335 that may be used to perform the search in lieu of making such direct accesses to data records 2133.

Referring briefly back to the above discussions of using unique values vectors 2335 (as described in regard to FIG. 20C) and hash values vectors 2336 (as described in regard to FIG. 21) to narrow down the candidate data cells, in situations where both unique values vectors 2335 and hash values vectors 2336 may be provided in cell indexes 2330 for one or more data fields 2134 included in the search criteria, it may be possible to forego using one or the other of the unique values vectors 2335 and the hash values vectors 2336 if the logical operator used in the search criteria to combine the individual search criteria for the different data fields 2134 is a logical OR. As will be recognized by those skilled in the art, this is because the logical OR operator indicates that a candidate data cell 2130 may remain a candidate data cell (i.e., may not be ruled out as a candidate data cell) insofar as meeting the individual search criteria for a particular data field 2134 as long one or the other of the unique values vector 2335 and the hash values vector 2336 for that particular data field 2134 fail to rule out that candidate data cell 2130. In some embodiments, where the search criteria makes such use of a logical OR, the processor 2350 of a node device 2300 may be caused to take advantage of such a situation to increase the speed and/or efficiency with which a search is performed by so foregoing the use of one or the other of unique values vectors 2335 or hash values vectors 2336 for one or more data fields.

Returning to FIG. 15A, as has been discussed, upon completion of a search of the data set 2230 for data records 2133 that meet the search criteria specified by a received instance of the query instructions 2710, the node devices 2300 may provide the control device 2500 or controller 2503 with either bitfields indicating which data records 2133 meet the search criteria, or at least some of the data values of each of data records 2133 that meet the search criteria (if not the entirety of each of those data records 2133). Upon receiving either such bitfields or such data values, the processor 2550 of the control device 2500 or controller 2503 may be caused by the query component 2545 to combine such provided results of the search to form the results data 2770, and then transmit the results data 2770 to the requesting device 2700 in response to the query instructions 2710.

However, in some embodiments, the query instructions 2710 may, in addition to providing the search criteria of a search for data records 2133, include executable task instructions specifying one or more operations to be performed with data values of any data records 2133 that may be identified as meeting the specified search criteria. In such embodiments, such specified one or more operations may be performed within each of the node devices 2300 in which at least one of such data records 2133 is identified within a super cell 2233 stored therein, and these operations may also be performed on the same thread(s) of execution within each corresponding node device that performed the search that identified at least one of such records.

FIG. 22 depicts aspects of the performance of such operations within a node device 2300 in which at least one data record 2133 was identified as meeting the search criteria of a search performed therein by the processor 2350. In executing the control routine 2340, the processor 2350 of the example node device 2300 may be caused by the execution component 2347 to employ indications in a search bitfield 2370 of there being at least one data record 2133 that meets the search criteria within a data cell 2130 of a super cell 2233 to retrieve the one or more data records 2133. The processor 2350 may then be caused by the execution component 2347 to execute the task instructions within the query instructions 2710 to thereby perform the one or more operations with data values of the retrieved data records 2133. As previously discussed, as a measure to improve the speed and/or efficiency of executing the task instructions from the query instructions 2710, performance of the task instructions with each retrieved data record 2133 or with the retrieved data records 2133 of each data cell 2130 from which they may be retrieved may be executed in a separate process, with the separate processes being distributed among multiple threads of execution supported by the processor 2350. As the results of the performance of the task instructions with each such data record 2133 is completed, and/or as the results of the performance of the task instructions with the data records 2133 of each data cell 2130 is completed, the processor 2350 may be caused by the execution component 2347 to transmit indications of the results to the control device 2500 or controller 2503 to be combined with corresponding results from other node devices 2300 to form the results data 2770 transmitted to the requesting device 2700.

Returning to FIGS. 15A and 15B, in various embodiments, each of the processors 2350 and 2550 may include any of a wide variety of commercially available processors. Further, one or more of these processor components may include multiple processors, a multi-threaded processor, a multi-core processor (whether the multiple processor cores coexist on the same or separate dies), and/or a multi-processor architecture of some other variety by which multiple physically separate processors are linked.

However, in a specific embodiment, the processor 2350 of each of the node devices 2300 may be selected to efficiently perform processing tasks with multiple portions of a data set or a data set index in parallel. By way of example, the processor 2350 may incorporate a single-instruction multiple-data (SIMD) architecture, may incorporate multiple processor cores, and/or may incorporate the ability to support multiple simultaneous threads of execution per processor core.

In various embodiments, each of the storages 2360 and 2560 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, a plurality of storage devices organized into one or more arrays (e.g., multiple ferromagnetic disk drives organized into a Redundant Array of Independent Disks array, or RAID array), or layered or array). redundant sets of storage devices in which non-volatile storage devices serve to preserve the contents of volatile storage devices in the event of an error condition or power failure (e.g., storage class memory accompanying RAM). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2360 of one or more of the node devices 2300 used to store a portion of a data set and/or of a data set index may be implemented with a redundant array of independent discs (RAID) of a RAID level selected to provide fault tolerance to prevent loss of one or more of these datasets and/or to provide increased speed in accessing one or more of these datasets.

In various embodiments, the input device 2720 may be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, the display 2780 may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2780 of the requesting device 2700 may be a touchscreen display such that the input device 2720 may be incorporated into the display 2780. In such embodiments, the input device 2720 may be a touch-sensitive component of the display 2780, respectively.

In various embodiments, the network interfaces 2390 and 2590 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, NVMe, PCIe, etc.

However, in a specific embodiment, the network interface 2390 of one or more of the node devices 2300 may be implemented with multiple copper-based or fiber-optic based network interface ports to provide redundant and/or parallel pathways in exchanging one or more of the super cells 2233 with the one or more data devices 2100.

Figure 23B:
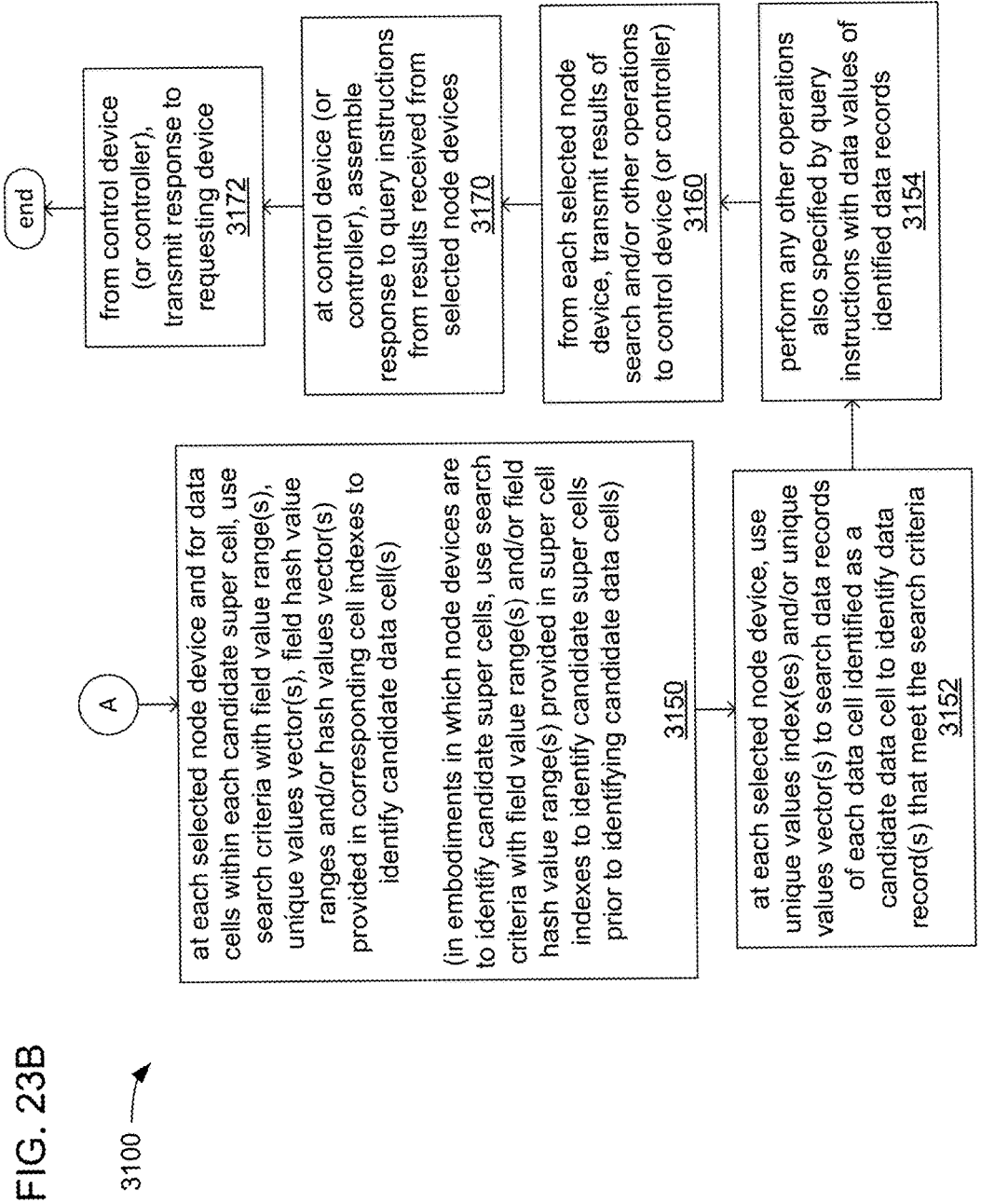

FIGS. 23A and 23B, taken together, illustrate an example embodiment of a logic flow 3100. The logic flow 3100 may be representative of some or all of the operations executed by one or more embodiments described herein. More specifically, the logic flow 3100 may illustrate operations performed by the processors 2350 and 2550 in executing the control routine 2340 and 2540, and/or performed by other component(s) of at least one of the node devices 2300, the control device 2500 and/or the controller 2503.

At 3110, the processor of each of multiple node devices (e.g., the processor 2350 of each of multiple node devices 2300) may generate data records (e.g., the data records 2133) from data values and/or stream(s) of data values received from one or more data devices serving as a data source (e.g., the one or more data devices 2100). At 3112, the processors of each of the multiple node devices may group the generated data records into data cells (e.g., the data cells 2130). As has been discussed, the processor may so generate and group data records in accordance with one or more rules specifying such parameters as what data fields are to be provided in each data record, the field labels for the data fields, minimum and/or maximum quantities of the data records to include in each data cell, and/or minimum and/or maximum data sizes of each data cell.

At 3114, the processor of each of the multiple node devices may generate a corresponding cell index for each generated data cell (e.g., the cell indexes 2330). As has been discussed, within each node device the generation of each cell index therein may be performed within a separate process, and those separate processes may be distributed among multiple threads of execution supported by the processor thereof.

At 3116, the processor of each of the multiple node devices may group multiple ones of the generated data cells within each node device into one or more super cells (e.g., the super cells 2233). At 3118, the processors of each of the multiple node devices may group indications of ranges of data values from the cell indexes into one or more super cell indexes, and in a manner that corresponds to the grouping of multiple data cells into one or more super cells at 3116. As has been discussed, the processor may so group the data cells in accordance with one or more rules specifying such parameters as minimum and/or maximum quantities of the data cells to include in each super cell, and/or minimum and/or maximum data sizes of each super cell.

As has been discussed, in some embodiments, a control device (e.g., the control device 2500) or a controller incorporated into one of the multiple node devices (e.g., the controller 2503 incorporated into one of the node devices 2300) may participate in responding to a query of the data set that may be received in the form of an instance of query instructions (e.g., an instance of query instructions 2710). More specifically, in such embodiments, the control device or controller may perform operations to identify one or more candidate super cells that may include one or more data cells that may include one or more data records that meet search criteria specified in the instance of query instructions. In support of the control device or controller performing such a function in such embodiments, the processors of each of the multiple node devices may transmit the super cell index(es) they generate to the control device or controller at 3120.

At 3130, the processor of the control device or controller (e.g., the processor 2550) may receive an instance of query instructions from a requesting device (e.g., one of the requesting devices 2700). The query instructions may include search criteria for a search for data records within the data set that may meet the search criteria. As has been discussed, such search criteria may include a specification of a single data value, multiple discrete data values and/or a range of data values to be searched for within one or more specified data fields of the data records of the data set.

At 3132, the processor of the control device or controller may select one or more node devices of the multiple node devices to which to relay the received instance of query instructions. In embodiments in which the control device or controller does not perform the function of identifying candidate super cells, but in which multiple copies of each super cell are distributed among the multiple node devices, the processor of the control device or controller may use stored indications of the manner in which each super cell is distributed among the multiple node devices and/or recurringly updated and stored indications of current status of each node device as factors in selecting the one or more node devices to which to relay the received instance of the query instructions. However, in embodiments in which the control device or controller does perform the function of identifying candidate super cells, the processor of the control device or controller, prior to selecting node devices to which to relay the received instance of the query instructions, may use the search criteria with super cell field value range(s) and/or super cell field hash value range(s) provided in the super cell indexes (e.g., the super cell field value ranges 2438 and/or the super cell field hash value ranges 2439 within the super cell indexes 2430) received from the multiple node devices to identify one or more candidate super cells (if any). The processor of the control device or controller may then use the identification of one or more super cells as another factor in selecting node devices to which to relay the received instance of query instructions.

At 3140, the processor of the control device or controller may then transmit the received instance of the query instructions to the selected node devices. As has been discussed, in embodiments in which the control device or controller that performs the function of identifying candidate super cells, the processor of the control device or controller may also transmit an indication to the selected node devices of which super cell(s) stored by each of the selected node devices has been identified as a candidate super cell.

At 3150, the processor of each of the selected node devices may, for each candidate super cell, identify one or more candidate data cells that may include one or more data records that may meet the search criteria. More specifically, the processors of each of the node devices may use the search criteria with field value range(s) and/or field hash value range(s) provided in the cell indexes (e.g., the field value ranges 2338 and/or the field hash value ranges 2339 within the cell indexes 2330) corresponding to the data cells within the super cell(s) identified as candidate super cells to identify one or more candidate data cells (if any). In embodiments in which the control device or controller does not perform the function of identifying candidate super cells, the processor of the each of the selected node devices may do so, prior to identifying candidate data cells. More specifically, prior to identifying candidate data cells, the processor of each of the selected node devices, may use the search criteria with field value range(s) and/or field hash value range(s) provided in the super cell indexes within each of the selected node devices to identify one or more candidate super cells (if any).

At 3152, the processor of each of the selected node devices in which at least one candidate data cell is identified may use unique values vectors (if any) and/or unique values indexes to perform search(es) for data records within each candidate data cell that meet the search criteria. As has been discussed, where unique values vectors are available in cell indexes corresponding to candidate data cells, such unique values vectors may be used to perform at least part of the search for data records that meet the search criteria.

At 3154, the processor of each of the selected node devices may execute task instructions within the received instance of the query instructions for performing one or more processing operations of a task with data values of the data records identified as meeting the search criteria, if any such task instructions are present. At 3160, the processor of each of the selected node devices may transmit the results of the search and/or of the performance of the task to the control device or controller.

At 3170, the processor of the control device or controller may assemble the results of the search, and/or of the performance of the task, received from each of the selected node devices into a response to the instance of the query instructions received from the requesting device. At 3172, the processor of the control device or controller may transmit the assembled response to the requesting device.

Figure 24B:
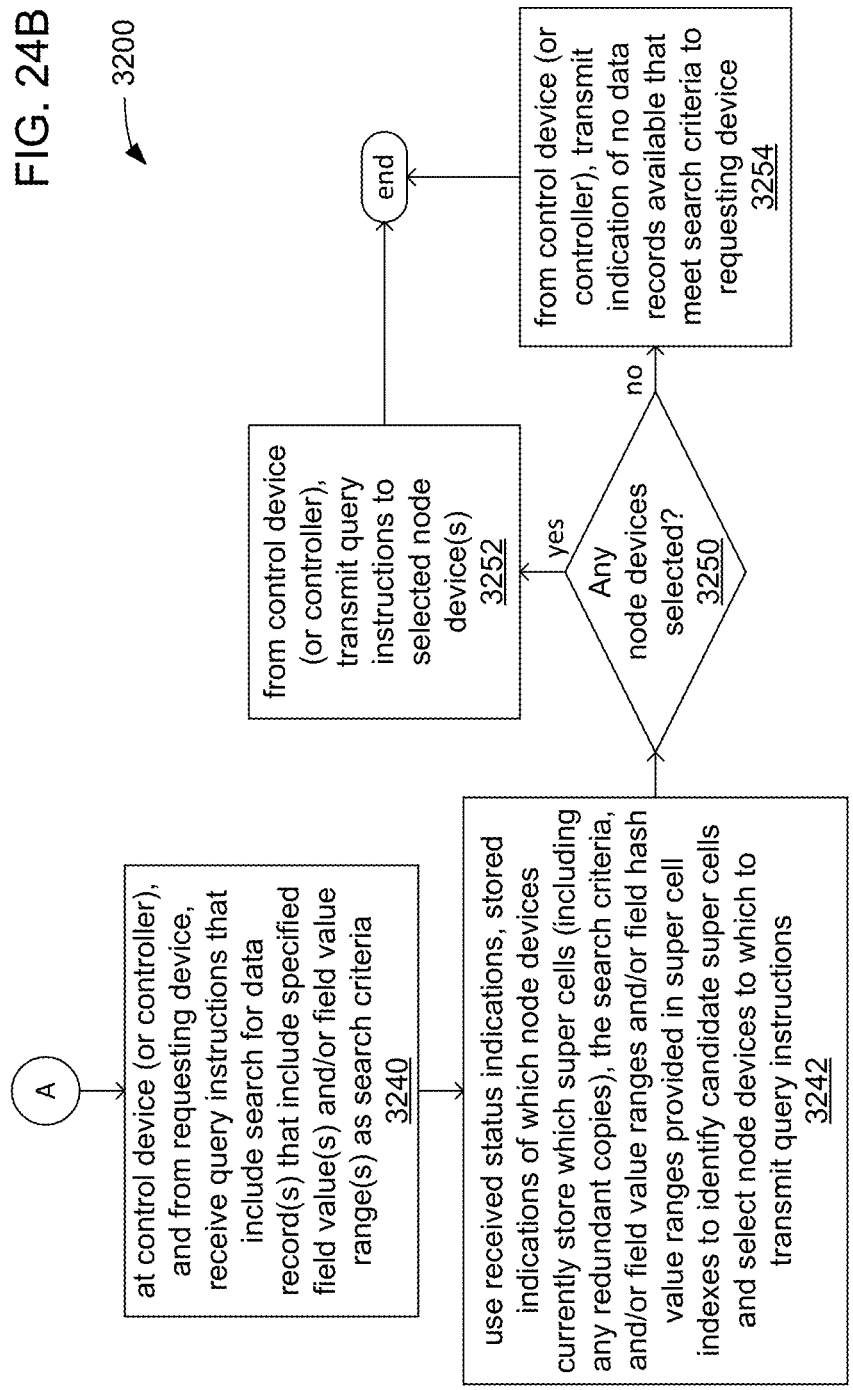
Figure 26A:
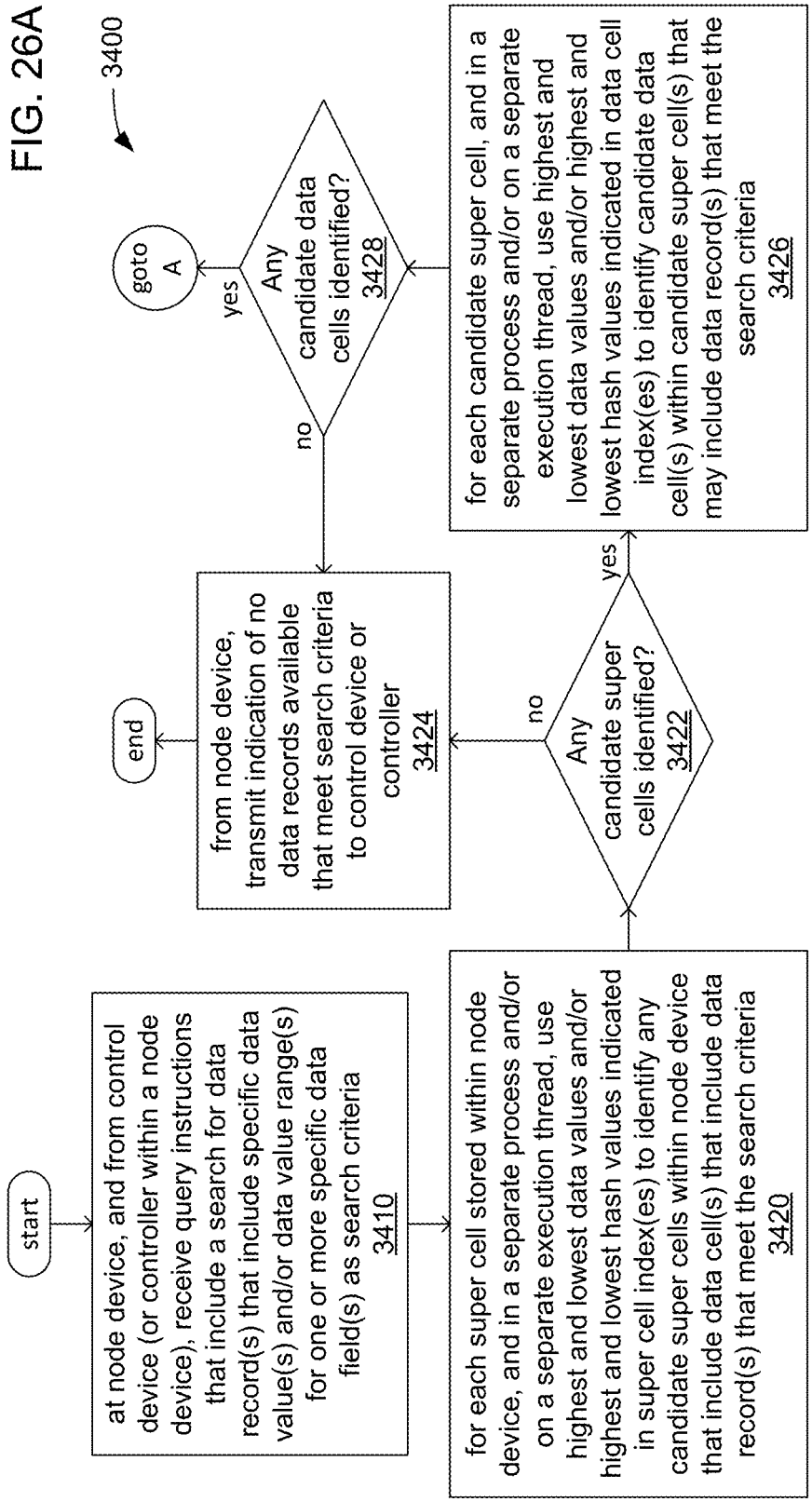
FIGS. 26A, 26B, 26C, 26D, 26E and 26F, taken together, illustrates an example embodiment of a logic flow of performing a search of a search.
Figure 26B:
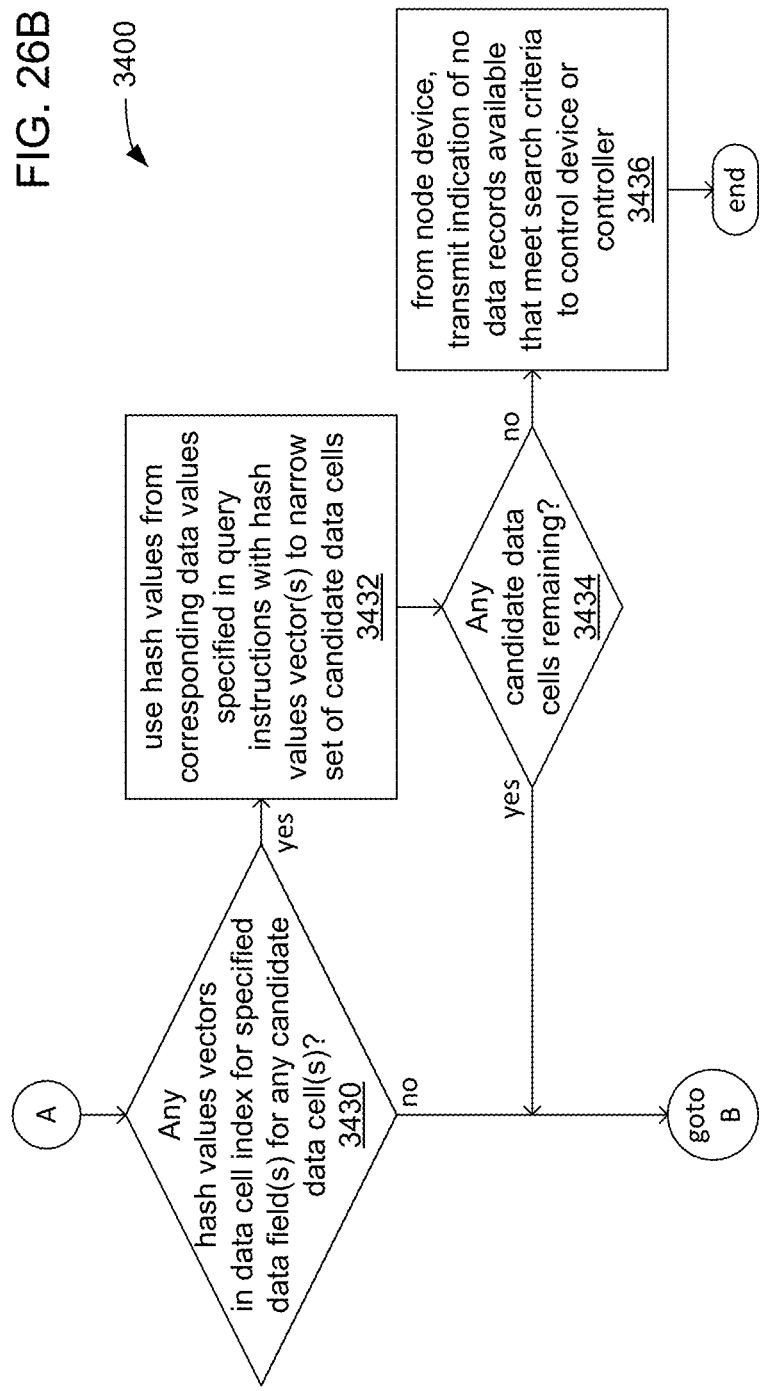
Figure 26C:
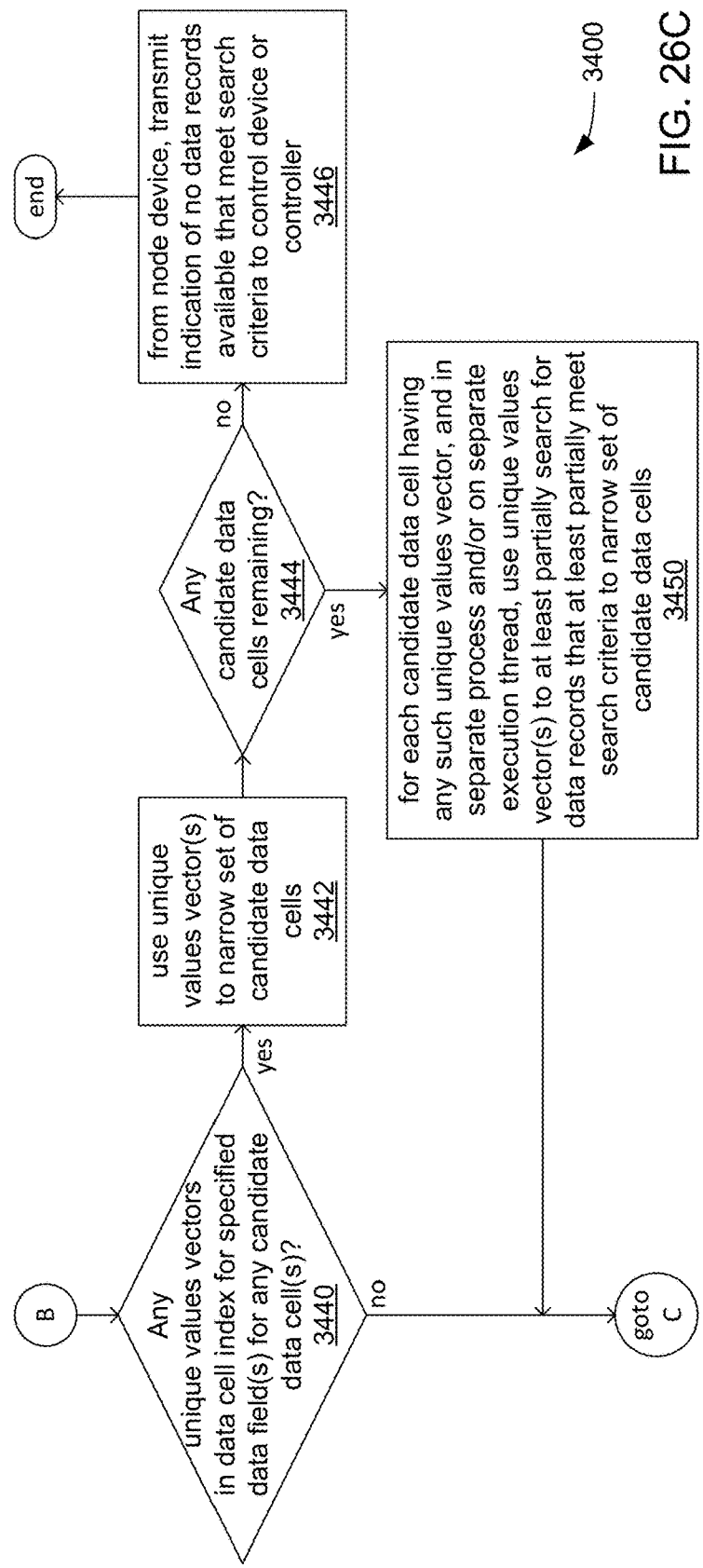
Figure 26D:
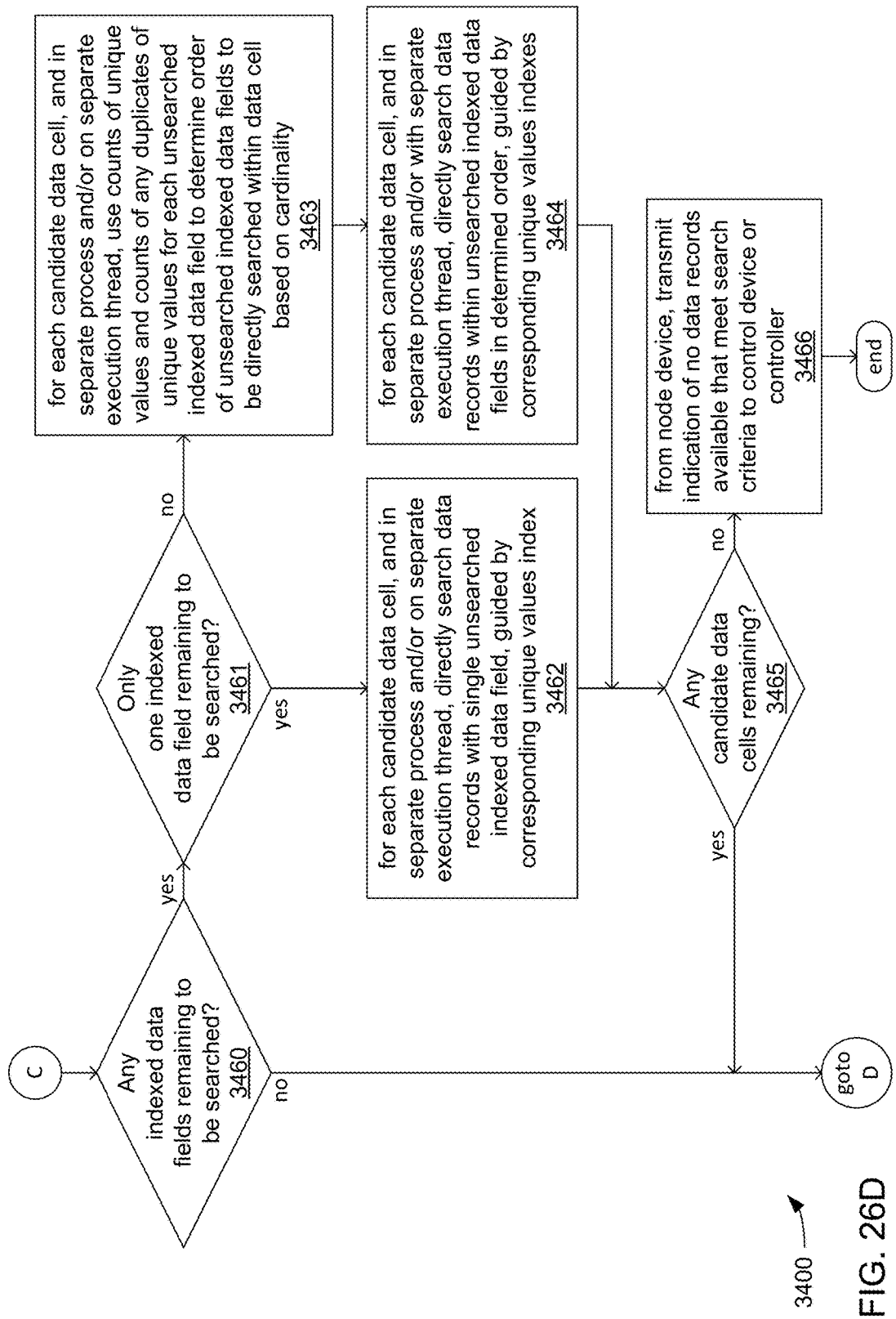
Figure 26E:
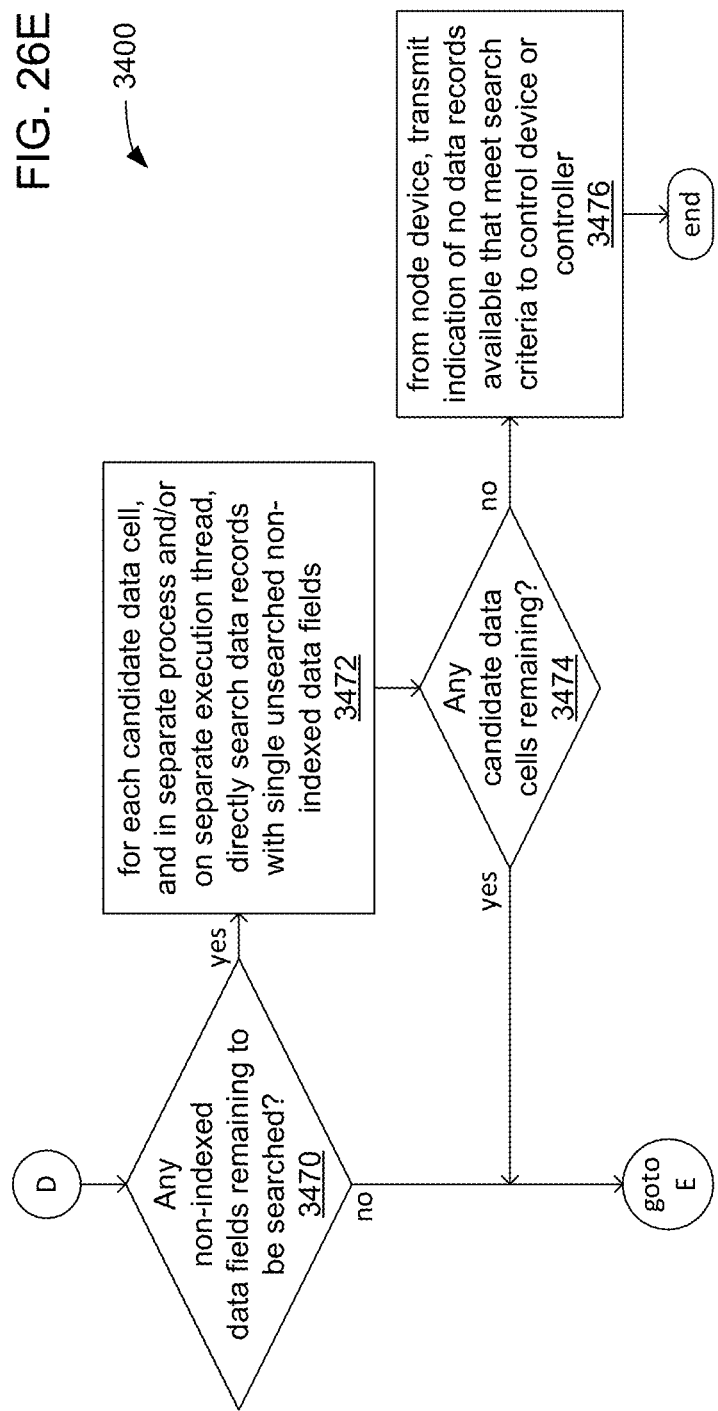
Figure 26F:
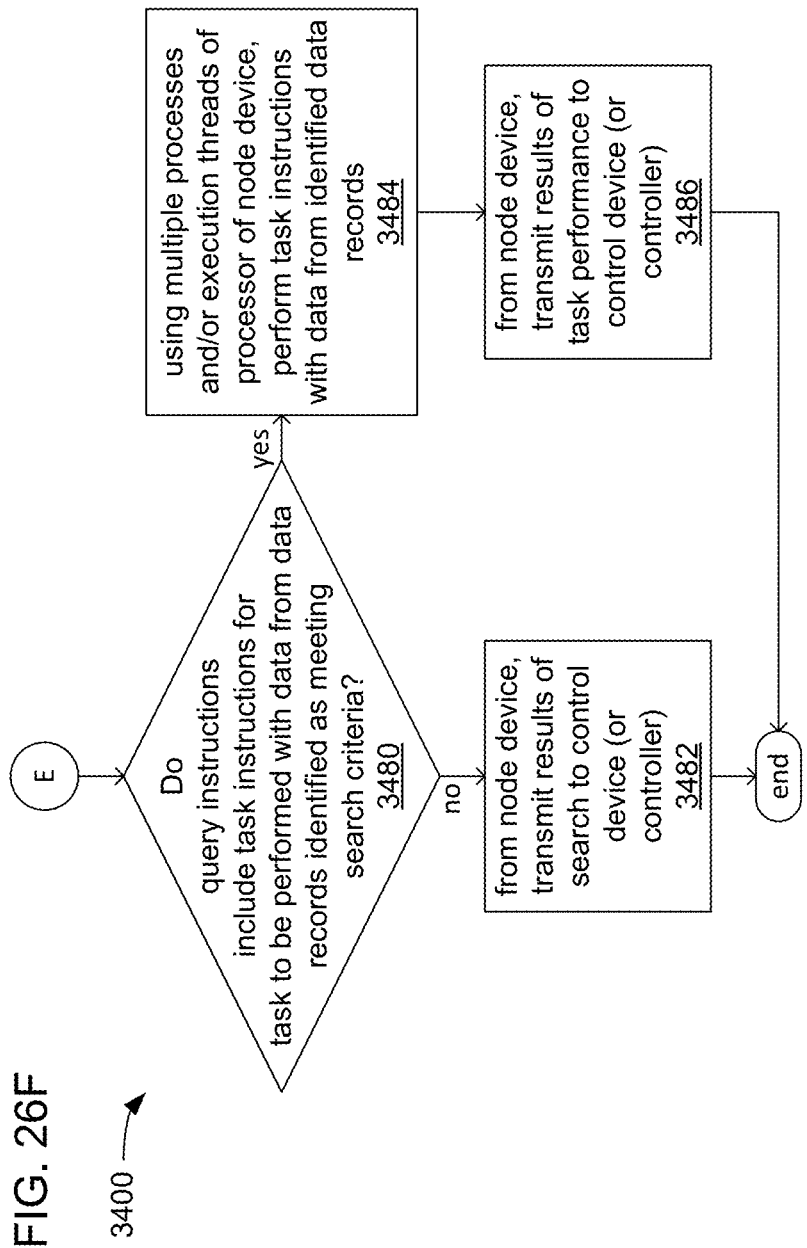

FIGS. 24A and 24B, taken together, illustrate an example embodiment of a logic flow 3200. The logic flow 3200 may be representative of some or all of the operations executed by one or more embodiments described herein. More specifically, the logic flow 3200 may illustrate operations performed by the processor 2550 in executing the control routine 2540, and/or performed by other component(s) of the control device 2500 or controller 2503.

At 3210, the processor of a control device or of a controller incorporated into a node device of multiple node devices (e.g., the processor 2550 of the control device 2500 or of a controller 2503 incorporated into one of the node devices 2300) may recurringly receive indications of status from each node device of the multiple node devices. As has been discussed, such indications of status may be indications of availability of the each of the node devices to perform processing operations, and such indications of availability may include indications of degree of availability of processing, storage, network and/or other resources provided by each of the node devices. As has also been discussed, the processor of the control device or controller may recurringly update node data (e.g., the node data 2539) with the recurringly received indications of node device status.

At 3212, the processor of the control device may use such indications of status of each of the node devices of the multiple node devices to derive an assignment of super cells of a data set (e.g., the super cells 2233 of the data set 2230) to each of the node devices. Stated differently, the processor of the control device or controller may derive the manner in which the data set is to be distributed among the multiple node devices. As has been explained, in embodiments in which a data set is to be generated by the multiple node devices, the processor of the control device or controller may derive a distribution of what super cells are to be generated within each of the node devices. However, in embodiments in which a complete data set is to be provided to the multiple node devices, the processor of the control device may derive a distribution of what super cells are to be provided to each of the node devices.

At 3214, the processor of the control device or controller may store indications of the derived per-node assignments (i.e., indications of the derived distribution), and may do so as another part of the node data. At 3216, the processor of the control device or controller may transmit, to each node device of the multiple node devices, an indication of which super cells are assigned to it.

At 3220, the processor of the control device or controller may retrieve from rules data (e.g., the rules data 2510) one or more rules that may provide either an explicit indication of which data fields within the data records within the data cells of the super cells of the data set (e.g., which ones of the data fields 2134 within the data records 2133 of the data cells 2130) are selected to be indexed. Alternatively or additionally, the processor of the control device or controller may retrieve one or more rules for use by the processor of the control device or controller in determining which of such data fields are to be selected to be indexed based on a stored history of past search criteria used in past searches and/or various heuristic algorithms, or for use by the processors of the node devices in doing so. In embodiments in which the retrieved one or more rules are for use by the processor of the control device or controller in determining, itself, which of such data fields are to be selected to be indexed, then the processor may proceed to use the retrieved one or more rules to do so. At 3222, the processor of the control device or controller may then transmit an indication of which ones of such data fields are so selected (regardless of whether explicitly specified by the one or more rules, or determined by the processor) to the node devices to enable the node devices to generate indexes therefor. Alternatively or additionally, the processor may transmit one or more retrieved rules for use by the processors of the node devices in determining which ones of such data fields are to be selected to be indexed to the multiple node devices to enable the processor of each node device of the multiple node devices to do so.

Again, as has been discussed, in some embodiments, the control device or controller may participate in responding to a query of the data set that may be received in the form of an instance of query instructions (e.g., an instance of query instructions 2710). More specifically, in such embodiments, the processor of the control device or controller may perform operations to identify one or more candidate super cells that may include one or more data cells that may include one or more data records that meet search criteria specified in the instance of query instructions. At 3230, in support of the control device or controller performing such a function in such embodiments, following the generation of, and/or a repetition of the generation of, cell indexes and super cell indexes of a data set index (e.g., the cell indexes 2330 and super cell indexes 2430 of the data set index 2530) by the node devices, the processor of the control device or controller may receive a generated (or re-generated) super cell index from the multiple node devices for each super cell of the data set. At 3232, in such embodiments, the processor of the control device or controller may store the super cell indexes.

At 3240, the processor of the control device or controller may receive an instance of query instructions from a requesting device (e.g., one of the requesting devices 2700). The query instructions may include search criteria for a search for data records within the data set that may meet the search criteria. As has been discussed, such search criteria may include a specification of a single data value, multiple discrete data values and/or a range of data values to be searched for within one or more specified data fields of the data records of the data set. Additionally, for data fields in which the data type is a character string of fixed or variable length, the search criteria may further include regular expressions and/or other means of flexibly matching patterns within such character strings.

At 3242, the processor of the control device or controller may select one or more node devices of the multiple node devices to which to relay the received instance of query instructions. Again, in embodiments in which the control device or controller does not perform the function of identifying candidate super cells, but in which multiple copies of each super cell are distributed among the multiple node devices, the processor of the control device or controller may use stored indications of the manner in which each super cell is distributed among the multiple node devices and/or recurringly updated and stored indications of current status of each node device as factors in selecting the one or more node devices to which to relay the received instance of the query instructions. However, in embodiments in which the control device or controller does perform the function of identifying candidate super cells, the processor of the control device or controller, prior to selecting node devices to which to relay the received instance of the query instructions, may use the search criteria with field value range(s) and/or field hash value range(s) provided in the super cell indexes received from the multiple node devices to identify one or more candidate super cells (if any). The processor of the control device or controller may then use the identification of one or more super cells as another factor in selecting node devices to which to relay the received instance of query instructions.

At 3250, In embodiments in which the control device or controller does perform the function of identifying candidate super cells, the processor of the control device or controller may check whether any node devices have been selected to relay the received instance of the query instructions to. If no node devices have been selected (e.g., as a result of the processor having determined that there are no candidate super cells), then the processor may transmit an indication to the requesting device of there being no data records available in the data set that meet the search criteria at 3254. However, at least one node device has been selected, then the processor may transmit the received instance of the query instructions to the selected node devices at 3252. As has also been discussed, in embodiments in which the control device or controller that performs the function of identifying candidate super cells, processor of the control device or controller may also transmit an indication to the selected node devices of which super cell(s) stored by each of the selected node devices has been identified as a candidate super cell.

FIGS. 25A and 25B, taken together, illustrate an example embodiment of a logic flow 3300. The logic flow 3300 may be representative of some or all of the operations executed by one or more embodiments described herein. More specifically, the logic flow 3300 may illustrate operations performed by the processor 2350 in executing the control routine 2340, and/or performed by other component(s) of at least one of the node devices 2300.

At 3310, the processor of each of multiple node devices (e.g., the processor 2350 of each of multiple node devices 2300) may receive, from a control device or controller incorporated into either the same node device or another node device (e.g., from the control device 2500, or from a controller 2503 incorporated into either another node device 2300 or the same node device 2300), one or more rules that may provide either an explicit indication of which data fields within data records within data cells of one or more super cells stored within the node device that form a portion of a data set (e.g., which ones of the data fields 2134 within the data records 2133 of the data cells 2130 of the data set 2230) are selected to be indexed. Alternatively or additionally, the processor of the node device may receive, from the control device or controller, one or more rules for use by the processor of the node device in determining which of such data fields are to be selected to be indexed based on a stored history of past search criteria used in past searches and/or various heuristic algorithms. At 3312, in embodiments in which the received one or more rules are for use by the processor of the node device, itself, in determining which of such data fields are to be selected to be indexed, then the processor may proceed to use the received one or more rules to do so.

At 3320, the processor of the node device may parse the selected data fields within each data cell of each super cell stored within the node device to retrieve the data values of the selected data fields. As has been discussed, as a measure to increase the speed and/or efficiency of generating a corresponding cell index (e.g., one of the cell indexes 2330) for each data cell, the parsing to retrieve data values of all of the selected data fields may be performed in a single read pass through all of the data records within each data cell.

At 3322, the processor of the node device may, separately for each selected data field within each data cell stored within the node device, use the data values retrieved from the data field across all of the data records within the data cell to generate a binary tree (e.g., one of the unique values ordering trees 2314). In so doing, the processor may identify (i.e., distinguish between) unique ones of the data values that are encountered for the first time within the data field within the data records of the data cell and duplicates of such unique data values. As has been discussed and as will be familiar to those skilled in the art, the process of generating a binary tree provides the opportunity to determine whether each data value with the data field from each one of the data records is a data value that is being encountered for the first time, such that it is added to the binary tree, and which such data value has been encountered before, such that it is already within the binary tree. As has also been discussed, and as will also be familiar to those skilled in the art, the process of generating a binary tree provides the opportunity to sort the unique values in either an ascending or descending order. Additionally, and as also previously discussed, as each unique value is identified and added to the binary tree, that unique value may be correlated within the binary tree to a record identifier (e.g., one of the record identifiers 2132) that identifies the data record within the data cell from which the unique value was retrieved. Thus, upon being fully generated, the binary tree includes unique values and not their duplicates. Instead, at 3324, for each duplicate that is identified of one of the unique values that is already stored in the binary tree, an indication of the duplicate value is added to a table of all identified duplicate values (e.g., one of the duplicate values tables 2317). Within such a duplicate values table, the record identifier of the data record from which the duplicate value is retrieved is stored and correlated to the record identifier of the data record in which the unique value that the duplicate value is a duplicate of. Also, within such a duplicate values table may be a count of how many duplicates there are of each unique value.

At 3330, from each binary tree, the processor of the node device may generate a corresponding unique values index (e.g., a unique values index 2334) within the cell index that corresponds to the data cell from which the unique values within the binary tree were retrieved. In each such unique values index, at least the record identifiers of the unique values are arranged in an order that corresponds to the order into which the unique values were sorted as the unique values were added to the binary tree. At 3332, from each binary tree, the processor of the node device may also retrieve indications of the highest and lowest unique values identified in the corresponding data field among the data records within the corresponding data cell, and may use the highest and lowest values to generate an indication of the range of unique values (i.e., one of the field value ranges 2338). As has been discussed, and as will be familiar to those skilled in the art, the unique values and their corresponding record identifiers within the binary tree may be retrieved in the sorted order by performing an in-order traversal of the binary tree. As has also been discussed, each unique values index may also include a count of the unique values identified within the corresponding data field among the data records of the corresponding data cell.

It should again be noted that such use of a binary tree is but one approach to identifying unique values and duplicates thereof, and to sorting the unique values. Again, other embodiments are possible in which other approaches that may be based on other data structure(s) may be used, including and not limited to a multi-layered skip list, etc.

At 3340, for each data cell, the processor of the node device may check whether any of the data fields that were selected to be indexed is of a data type for which a unique values vector (e.g., one of the unique values vectors 2335) is to be generated. If so, then at 3342, the processor may so generate a unique values vector for each such data field within the corresponding cell index. As has been discussed, the processor may retrieve, and/or may be provided by the control device or controller, one or more rules specifying one or more data types for which unique values vectors are to be generated. By way of example, it may be deemed desirable to generate a unique values vector for the unique values of each of data fields of a data cell that are selected to be indexed where the data type is such that each data value is of identical and/or relatively small data size (e.g., all are a byte, a word, a doubleword, a quadword, a single-precision floating point value, a double-precision floating point value, an eight-character text string, etc.).

At 3350, for each data cell, the processor of the node device may check whether any of the data fields that were selected to be indexed is of a data type for which a hash values vector (e.g., one of the hash values vectors 2336) is to be generated. If not, then at 3360, from each duplicate values table, the processor of the node device may generate one or more corresponding duplicate value indexes (e.g., one or more of the duplicate value indexes 2337) within the cell index that corresponds to the data cell from which the unique values that are duplicated by the duplicate values were retrieved. In each such duplicate value index, at least the record identifier of the unique value that is duplicated, the unique value itself, or another form of correspondence to the unique value is included, along with the record identifier of each duplicate of that unique value. Alternatively or additionally, the correspondence of each duplicate value index to its corresponding unique value may be maintained by any of a variety of types of pointer to the duplicate value index or relative positioning of the duplicate value index, such as an offset relative to the corresponding unique value within the unique values index. As has also been discussed, each duplicate value index may also include a count of the duplicates of the unique value.

However, if at 3350, there are one or more data fields that were selected to be indexed that are of a data type for which a hash value vector is to be generated, then 3352, the processor of the node device may generate a hash value from each unique value identified in each such data field. Then, for each such data field, the hash values generated from the unique values thereof may be sorted into ascending or descending order, and unique ones of the hash values may be distinguished by the processor from the duplicates thereof. As has been discussed, this may be done at 3354 by using the hash values generated from the unique values of such a data field to generate a binary tree of the hash values (i.e., a hash binary tree). Again, it should be noted that, as in the earlier described identification and sorting of unique values, the use of a binary tree is but one approach, and other approaches that may involve other data structure(s) may be used in other embodiments.

At 3356, from each hash binary tree, the processor of the node device may generate a corresponding hash values vector within the cell index that corresponds to the data cell from which the unique values were retrieved and used to generate the hash values. Like the unique values within each unique values vector, the hash values within each hash value vector may be arranged in the order into which the hash values were sorted within the hash binary tree. At 3358, from each hash binary tree, the processor of the node device may also retrieve indications of the highest and lowest unique hash values identified in the corresponding data field among the data records within the corresponding data cell, and may use the highest and lowest hash values to generate an indication of the range of unique hash values (i.e., one of the field hash value ranges 2339). The processor may then proceed to generate duplicate value index(es) at 3360.

At 3370, for each super cell stored within the node device, the processor of the node device may generate a corresponding super cell index (e.g., one of the super cell indexes 2430) from indications of ranges of unique values defined by highest and lowest unique values (e.g., the field value ranges 2338) indicated in the cell indexes corresponding to the data cells of the corresponding super cell, and from any indications that may also be provided of ranges of hash values defined by highest and lowest hash values (e.g., the field hash value ranges 2339) in those same cell indexes. More specifically, for each super cell index, and for each data field that has been selected to be indexed, the processor may generate another binary tree (or again, some other data structure) from corresponding indications in each corresponding cell index of the highest and lowest unique values. From each such binary tree (or other data structure), the processor may then identify the highest and lowest unique values found within the corresponding data field across all data records within all data cells of the corresponding super cell, and may use such highest and lowest values to generate an indication within the super cell index of the range of unique values for that data field throughout the corresponding super cell (i.e., one of the super cell field value ranges 2438). Where there are any data fields among the data fields selected to be indexed for which field hash value ranges are provided within the cell indexes of the data cells within the corresponding super cell, the processor may similarly generate an indication within the super cell index of the range of unique hash values for that data field throughout the corresponding super cell (i.e., one of the super cell field hash value ranges 2439).

FIGS. 26A, 26B, 26C, 26D, 26E and 26F, taken together, illustrate an example embodiment of a logic flow 3400. The logic flow 3400 may be representative of some or all of the operations executed by one or more embodiments described herein. More specifically, the logic flow 3400 may illustrate operations performed by the processor 2350 in executing the control routine 2340, and/or performed by other component(s) of at least one of the node devices 2300.

At 3410, the processor of each node device of multiple node devices (e.g., the processor 2350 of each of multiple node devices 2300) may receive, from a control device or controller incorporated into either the same node device or another node device (e.g., from the control device 2500, or from a controller 2503 incorporated into either another node device 2300 or the same node device 2300), an instance of query instructions that may been transmitted to the control device or controller from a requesting device (e.g., the an instance of the query instructions 2710 received from one of the requesting devices 2700). The query instructions may include search criteria for a search for data records within the data set that may meet the search criteria. As has been discussed, such search criteria may include a specification of a single data value, multiple discrete data values and/or a range of data values to be searched for within one or more specified data fields of the data records of the data set.

As has been discussed, in some embodiments, the control device or controller may participate in responding to a received instance of query instructions by performing operations to identify one or more candidate super cells of a data set that may include one or more data cells that may include one or more data records (e.g., candidate super cells of the super cells 2233 of the data set 2230 that may include one or more data cells 2130 that may include one or more data records 2133) that meet search criteria specified in the instance of query instructions. In such embodiments, the control device or controller may provide an indication of which super cell(s) stored within the node device were identified by the control device or controller along with the query instructions. In such embodiments, following receipt of query instructions and accompanying indication of which super cell(s) within the node device have been identified as candidate super cells at 3410, the processor may proceed to performing operations to identify candidate data cells at 3426.

However, in other embodiments in which the control device or controller does not perform operations to identify candidate super cells, the processor within each of the node devices that is provided with the query instructions may perform such operations to identify any candidate super cells that may be present among the one or more super cells that may be stored therein. More precisely, in such other embodiments at 3420, and prior to performing operations to identify candidate data cells at 3426, the processor of the node device may use the search criteria with super cell field value range(s) and/or super cell field hash value range(s) provided in each of the super cell indexes that corresponds to a super cell stored within the node device (e.g., the super cell field value ranges 2438 and/or the super cell field hash value ranges 2439 within the super cell indexes 2430) to determine whether the corresponding super cell is a candidate super cell. At 3422, after the super cell index(es) of all of the super cells stored within the node device have been so analyzed, the processor of the node device may check whether any of the one or more super cells stored within the node device has been identified as a candidate super cell. If no super cell stored within the node device has been identified as a candidate super cell, then at 3424, the processor may transmit an indication to the control device or controller that the node device has no data records available that meet the search criteria. However, if at least one super cell stored within the node device has been identified as a candidate super cell, then the processor may proceed with performing operations to identify candidate data cells at 3426.

At 3426, the processor of the node device may use the search criteria with field value range(s) and/or field hash value range(s) provided in each of the cell indexes that corresponds to a data cell within a candidate data cell stored within the node device (e.g., the field value ranges 2338 and/or the field hash value ranges 2339 within the cell indexes 2330) to determine whether the corresponding data cell is a candidate data cell. At 3428, after the cell index(es) of all of the data cells within a candidate super cell stored within the node device have been so analyzed, the processor of the node device may check whether any of the one or more data cells within a candidate super cell stored within the node device has been identified as a candidate data cell. If no such data cell stored within the node device has been identified as a candidate data cell, then at 3424, the processor may transmit an indication to the control device or controller that the node device has no data records available that meet the search criteria. However, if at least one data cell stored within the node device has been identified as a candidate data cell, then the processor may proceed with performing operations to narrow down and then search for data records that meet the search criteria.

At 3430, the processor of the node device may check whether any of the cell indexes that correspond to one of the candidate data cells includes a hash values vector (e.g., one of the hash values vectors 2336) for any of the data fields included in the search criteria. If so, then the processor may use such hash values vectors to narrow the set of candidate data cells at 3432. More specifically, where the search criteria specifies one or more discrete data values, and not a range of data values, as part of the search criteria for an individual data field for which there hash values vectors in the cell indexes of candidate data cells, the processor may generate hash values from each of the one or more discrete data values, and may then compare those hash values to the hash values within the hash values vectors to determine whether one or more of the candidate data cells are able to be ruled out as having any data records that meet the search criteria (i.e., ruled out of continuing to be candidate data cells). In some embodiments, if there are hash values vectors for more than one of the data fields included in the search criteria where the search criteria for each of those data fields includes one or more discrete data values and no ranges of data values, then the processor may retrieve counts of the unique values present within each such data field within the data records of each candidate data cell. As previously discussed, the unique values indexes within the data cells may include such counts (e.g., the unique values indexes 2334). The processor may use those retrieved counts to determine the relative cardinality of the data values for each of such data fields. The processor may then perform the comparisons of hash values just described in an order based on the relative cardinalities, starting with the hash value vectors that correspond to the one of such data fields where the data values demonstrate the highest cardinality, and then proceeding to the others of such data fields in order of decreasing cardinality. As the hash values vectors corresponding to each data field are used to narrow the candidate data cells, the use of hash values vectors corresponding to the next data field is able to be performed more speedily and/or efficiently as a result of involving an ever narrower set of candidate data cells. In this way, the narrowing down of the candidate data cells may be performed more quickly.

At 3434, the processor may check whether the candidate data cells have been narrowed down to the point where there are no longer any candidate data cells remaining. If no candidate data cells remain, then at 3436, the processor may transmit an indication to the control device or controller that the node device has no data records available that meet the search criteria. However, if at least one candidate data cell remains among the data cells stored within the node device, then the processor may proceed with performing more operations to narrow down and then search for data records that meet the search criteria.

At 3440, the processor of the node device may check whether any of the cell indexes that correspond to one of the candidate data cells includes a unique values vector (e.g., one of the unique values vectors 2335) for any of the data fields included in the search criteria. If so, then the processor may use such unique values vectors to narrow the set of candidate data cells at 3442. More specifically, the processor may compare data values specified for each such data field within the search criteria to the unique values within the unique values vectors to determine whether one or more of the candidate data cells are able to be ruled out as having any data records that meet the search criteria (i.e., ruled out of continuing to be candidate data cells). In some embodiments, if there are unique values vectors for more than one of the data fields included in the search criteria, then the processor may retrieve counts of the unique values present within each such data field within the data records of each candidate data cell. Again, the unique values indexes within the data cells may include such counts. The processor may use those retrieved counts to determine the relative cardinality of the data values for each of such data fields. The processor may then perform the comparisons of unique values just described in an order based on the relative cardinalities of the corresponding data fields, starting with the unique value vectors that correspond to the one of such data fields where the data values demonstrate the highest cardinality, and then proceeding to the others of such data fields in order of decreasing cardinality. As the unique values vectors corresponding to each data field are used to narrow the candidate data cells, the use of unique values vectors corresponding to the next data field is able to be performed more speedily and/or efficiently as a result of involving an ever narrower set of candidate data cells. In this way, the narrowing down of the candidate data cells may be performed more quickly.

At 3444, the processor may check whether the candidate data cells have been narrowed down to the point where there are no longer any candidate data cells remaining. If no candidate data cells remain, then at 3446, the processor may transmit an indication to the control device or controller that the node device has no data records available that meet the search criteria. However, if at least one candidate data cell remains among the data cells stored within the node device, then the processor may proceed with performing operations to search for data records that meet the search criteria. More specifically, at 3450, the processor may use the same unique values vectors just used at 3442 to narrow down the candidate data cells to then search for and identify data records within the remaining candidate data cells that meet the search criteria for at least the data fields included in the search criteria for which there are unique values vectors. Stated differently, the processor may re-use the same unique values vectors to narrow down the candidate data records within each of the remaining candidate data cells. The processor may then proceed with performing further operations to search through and/or narrow down the data records that meet the search criteria so far (i.e., narrow down the candidate data records further). It should be noted that the narrowing down of candidate records can have the effect of further narrowing down candidate data cells in where there are instances in which the narrowing down of data records results in a candidate data cell no longer having any candidate data records therein.

Referring briefly back to the above discussions of using unique values vectors to narrow down the candidate data cells at 3442 and to search the data records within the remaining candidate data cells (i.e., narrowing down candidate data records) at 3450, although these two activities are depicted as separate and sequentially performed steps, other embodiments are possible in which both activities may be performed at least partially simultaneously. More specifically, a single read pass may be made through each unique values vector as part of using the unique values therein for both narrowing down candidate data cells and searching data records (i.e., narrowing down candidate data records) at least partially in parallel, and thereby avoiding repeated accesses to each of the unique values vectors.

Referring briefly back to the above discussions of using unique values vectors and hash values vectors to narrow down the candidate data cells, and as previously discussed, in situations where both unique values vectors and hash values vectors may be provided in cell indexes for one or more data fields included in the search criteria, it may be possible to forego using one or the other of the unique values vectors and the hash values vectors if the logical operator used in the search criteria to combine the individual search criteria for the different data fields is a logical OR. As will be recognized by those skilled in the art, this is because the logical OR operator indicates that a candidate data cell may remain a candidate data cell (i.e., may not be ruled out as a candidate data cell) insofar as meeting the individual search criteria for a particular data field as long one or the other of the unique values vector and the hash values vector for that particular data field fail to rule out that candidate data cell. In some embodiments, where the search criteria makes such use of a logical OR, the processor of a node device may be caused to take advantage of such a situation to increase the speed and/or efficiency with which a search is performed by so foregoing the use of one or the other of unique values vectors or hash values vectors for one or more data fields.

At 3460, the processor may check whether there remain any data fields included in the search criteria that have not yet been searched, and that have been indexed such that there are at least unique values indexes present within the cell indexes. If so, then at 3461, the processor may check whether there is only one of such remaining unsearched data fields. If so, then at 3462, the processor may directly search such remaining unsearched data fields within the data records within the remaining candidate data cells to identify data records within the remaining candidate data cells that meet the search criteria for such remaining unsearched data fields. In so doing, the processor may employ the indications of which data records within each of the remaining candidate data cells have unique data values within such remaining unsearched data fields. As has been discussed, the processor may employ any of a variety of approaches to performing such searches, including and not limited to one or both of approaches based on binary searching or skip lists. Additionally, where searching through use of unique values vectors corresponding to one or more other data fields was able to be performed, as described earlier, such that the candidate data records within each of the remaining candidate data cells have already been narrowed to at least some degree, the processor may take advantage of such narrowing to reduce the quantity of data records that are directly searched at 3462. And thus, the direct searching of data records at 3462 may serve to further narrow the candidate data records.

However, if at 3461, there is more than one data field included in the search criteria that have not yet been searched, and that have been indexed such that there are at least unique values indexes present within the cell indexes, then at 3463, the processor may retrieve counts of the unique values present within each such data field within the data records of each of the remaining candidate data cell. Again, the unique values indexes within the data cells may include such counts. The processor may use those retrieved counts to determine the relative cardinality of the data values for each of such data fields. At 3464, the processor may then perform searches similar to what was just described at 3462 in an order based on the relative cardinalities of the corresponding data fields, starting with the one of such data fields where the data values demonstrate the highest cardinality, and then proceeding to the others of such data fields in order of decreasing cardinality. In this way, the narrowing down of the candidate data records may be performed more quickly.

Regardless of whether the processor of the node device is caused to perform such searching for a single data field at 3462 or for multiple data fields at 3464, such narrowing down of candidate data records may lead to a narrowing of the candidate data cells. At 3465, the processor may check whether the candidate data cells have been narrowed down to the point where there are no longer any candidate data cells remaining. If no candidate data cells remain, then at 3466, the processor may transmit an indication to the control device or controller that the node device has no data records available that meet the search criteria. However, if at least one candidate data cell remains among the data cells stored within the node device, then the processor may proceed with performing more operations to search for and/or narrow down the data records that meet the search criteria.

At 3470, the processor may check whether there remain any data fields included in the search criteria that have not yet been searched, and that have not been indexed such that there is no indexing information present within the cell indexes. If so, then at 3472, the processor may directly search such remaining unsearched data fields within the data records within the remaining candidate data cells to identify data records within the remaining candidate data cells that meet the search criteria for such remaining unsearched data fields. Additionally, where searching through use of unique values vectors and/or unique values indexes corresponding to one or more other data fields was able to be performed, as described earlier, such that the candidate data records within each of the remaining candidate data cells have already been narrowed to at least some degree, the processor may take advantage of such narrowing to reduce the quantity of data records that are directly searched at 3472. And thus, the direct searching of data records at 3472 may serve to still further narrow the candidate data records. In this way, the further narrowing down of the candidate data records may be performed more quickly.

Again, such narrowing down of candidate data records may lead to a narrowing of the candidate data cells. At 3474, the processor may check whether the candidate data cells have been narrowed down to the point where there are no longer any candidate data cells remaining. If no candidate data cells remain, then at 3476, the processor may transmit an indication to the control device or controller that the node device has no data records available that meet the search criteria. However, if at least one candidate data cell remains among the data cells stored within the node device, then the processor may proceed with performing operations to provide the control device or controller with an indication of results from the search within the node device.

At 3480, the processor of the node device may check whether the received instance of the query instructions includes task instructions for performing one or more processing operations of a task with data values of the data records that are identified in the search just performed as meeting the search criteria. If not, then at 3482, the processor may transmit an indication of the results of the search to the control device or controller. As has been discussed, where the query instructions request an indication of which data records meet the search criteria, a bitfield or other data structure indicating at least which data records within the node device meet the search criteria may be transmitted to the control device or controller. However, as has also been discussed, where the query instructions request at least a subset of the data values of each record that meets the search criteria, those data values or the entirety of each data record that meets the search criteria may be transmitted to the control device or controller.

However, if at 3480, the received instance of the query instructions does include task instructions for performing such processing operations, then at 3484, the processor may execute the task instructions to perform the operations of the task with data values of the data records identified in the search as meeting the search criteria. In so doing, the execution of the task instructions with data values of each such data record, or with the data records of each data cell in which at least one data record meeting the search criteria was found, may be performed in a separate process, and those processes may be distributed across multiple threads of execution supported by the processor. Following and/or during such at least partially parallel execution of multiple instances of the task instructions, the processor may transmit indications of the results of the performance of the task to the control device or controller.

It should be noted that, as an alternative to the separate performances of retrieving and analysis of counts of unique values described as occurring at 3432, 3442 and/or 3463, the processor may instead, for each candidate data cell, retrieve all counts of unique values available from all unique values indexes that may be present within each corresponding cell index 2330 for any of the data fields included in the search criteria, and may derive an order of the data fields based on relative cardinality, separately for each candidate data cell. Such an order for each candidate data cell may then be relied up on when determining an order in which to use hash values vectors for multiple data fields, when determining an order in which to use unique values vectors for multiple data fields, and/or when determining an order in which to proceed through multiple data fields while directly searching data records.

In various embodiments, the division of processing and/or storage resources among the devices, and/or the API architectures supporting communications among the devices, may be configured to and/or selected to conform to any of a variety of standards for distributed processing, including without limitation, IEEE P2413, the ALLJOYN® standard, the IOTIVITY™ standard, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data set portions of data set(s) are not dependent on, nor constrained by, existing API architectures and/or supporting communications protocols. More broadly, there is nothing in the manner in which data set(s) may be organized in storage, transmission and/or distribution via a network that is bound to existing API architectures or protocols.

Some systems may use the HADOOP® framework, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node HADOOP® cluster, as understood by a person of skill in the art. The APACHE™ HADOOP® framework is an open-source software framework for distributed computing.

Implementing some examples at least in part by using machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, and/or some other machine-learning specific processor that implements one or more neural networks using semiconductor (e.g., silicon (Si), gallium arsenide (GaAs)) devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising a processor of a first node device of multiple node devices, and a storage of the first node device to store instructions that, when executed by the processor, cause the processor to perform operations comprising:

store, at the first node device, a first super cell of multiple super cells into which a data set is divided from a data file maintained by at least one data device, wherein:
  the multiple super cells are distributed among the multiple node devices;
  each super cell comprises multiple data cells;
  each data cell of the multiple data cells comprises multiple data records; and
  each data record of the multiple data records comprises a set of fields at which data values of the data set are stored;

store, for each data cell within the first super cell, a cell index that corresponds to the data cell, wherein the cell index comprises:
  an indication of a range of values stored within a first data field of the set of fields among the data records within the data cell; and
  a first unique values index that corresponds to the first data field, wherein for each data value that is stored within the first data field among the data records within the data cell, the first unique values index includes an identifier of a single data record within the data cell in which the data value is stored within the first data field;

receive, at the first node device, from a control device, and at least partially in parallel with other node devices of the multiple node devices, query instructions specifying search criteria of a search to be performed of the data set for data records that meet the specified search criteria, wherein the search criteria comprises at least one data value to be searched for within the first data field;

in response to the receipt of the query instructions, and for each data cell within the first super cell, the processor is caused to perform operations of the specified search, the operations comprising:
  compare the data value to the range of values indicated in the corresponding cell index to determine whether the data cell includes at least one data record that meets the specified search criteria; and
  in response to a determination that the data cell includes at least one data record that meets the specified search criteria, use at least the first unique values index to perform a search of the data records of the data cell to identify one or more data records that meet the search criteria; and in response to identifying at least one data record that meets the specified search criteria, the processor is caused to perform operations comprising:

generate results data indicative of the first super cell including at least one data record that meets the specified search criteria; and provide the results data to the control device.

2. The apparatus of claim 1, wherein:

the multiple data cells of the first super cell comprises a first data cell and a second data cell;

the processor is caused to perform the specified search within the first data cell on a first thread of execution; and the processor is caused to perform the specified search within the second data cell on a second thread of execution.

3. The apparatus of claim 2, wherein the processor is caused to allocate a separate processor core of the processor to each of the first and second threads of execution.

4. The apparatus of claim 1, wherein:

a cell index corresponding to a data cell of the first super cell comprises a first set of duplicate value indexes, wherein for at least one data value that is stored within the first data field of a data record identified in the first unique values index, a duplicate value index of the first set of duplicate value indexes includes at least one identifier of an additional data record within the data cell in which the data value is also stored within the first data field; and the processor is caused, in response to identifying at least one data record within the data cell that meets the specified search criteria, to perform operations comprising:

search within the first set of duplicate value indexes for a duplicate value index that identifies one or more additional data records of the data cell that also meet the specified search criteria; and generate the results data to be indicative of the one or more additional data records.

5. The apparatus of claim 4, wherein:

the cell index comprises a second unique values index that corresponds to a second data field of the set of fields within the data records of the data cell;

for each data value that is stored within the second data field among the data records within the data cell, the second unique values index includes an identifier of a single data record within the data cell in which the data value is stored within the second data field;

the cell index comprises a second set of duplicate value indexes, wherein for at least one data value that is stored within the second data field of a data record identified in the second unique values index, a duplicate value index of the second set of duplicate value indexes includes at least one identifier of an additional data record within the data cell in which the data value is also stored within the first data field;

the first unique values index comprises a count of identifiers of data records included in the first unique values index;

the second unique values index comprises a count of identifiers of data records included in the second unique values index;

each duplicate value index within the first set of duplicate value indexes comprises a count of identifiers of data records included in the duplicate value index;

each duplicate value index within the second set of duplicate value indexes comprises a count of identifiers of data records included in the duplicate value index;

the search criteria comprises at least one data value that to be searched for within the second data field; and the processor is caused to perform operations comprising:

analyze the count of identifiers of data records within the first unique values index, the second unique values index, each duplicate value index within the first set of duplicate value indexes and each duplicate value index within the second set of duplicate value indexes to determine relative degrees of cardinality of the data values of the first data field and the second data field; and determine whether to begin the performance of the specified search of the data records within the data cell with the first unique values index or the second unique values index based on the relative degrees of cardinality of the data values of the first data field and the second data field.

6. The apparatus of claim 1, wherein the processor is caused to perform operations comprising:

parse the query instructions to determine whether the query instructions include task instructions for the performance of a task with data retrieved from one or more data records identified as meeting the search criteria; and in response to a determination that the query instructions do include task instructions for the performance of a task, perform operations comprising:

execute the instructions to perform the task at least partially in parallel with at least one other node device of the multiple node devices; and generate the results data to include results of the performance of the task as the indication that the super cell includes at least one data record that meets the specified search criteria.

7. The apparatus of claim 1, wherein the processor is caused to perform operations comprising:

store, at the first node device, a first super cell index corresponding to the first super cell, wherein the first super cell index comprises an indication of a range of values stored within the first data field within the multiple data cells of the first super cell;

in response to the receipt of the query instructions, compare the at least one data value of the search criteria to the range of values indicated in the first super cell index to determine whether the first super cell includes at least one data record within at least one data cell of the first super cell that meets the specified search criteria; and condition the performance of the operations of the specified search for each data cell within the first super cell on a determination that the first super cell does include at least one data record within at least one data cell of the first super cell that meets the specified search criteria.

8. The apparatus of claim 7, comprising a controller, the controller comprises a controller processor and a controller storage to store other instructions that, when executed by the controller processor, cause the controller processor to perform operations to serve as the control device, the operations comprising:

receive, at the first node device and from a second node device of the multiple node devices, a second super cell index corresponding to a second super cell stored by the second node device, wherein the second super cell index comprises an indication of a range of values stored within the first data field within the at least one data cell of the second super cell;

in response to the receipt of the query instructions, compare the data value to the range of values indicated in the second super cell index to determine whether the second super cell includes at least one data record within at least one data cell of the second super cell that meets the specified search criteria; and in response to a determination that the second super cell includes at least one data record that meets the specified search criteria, transmit the query instructions to the second node device to enable the second node device to perform the specified search within the at least one data cell of the second super cell.

9. The apparatus of claim 1, wherein the processor is caused to perform operations comprising:

store, within each cell index corresponding to a data cell of the multiple data cells within the first super cell, a unique values vector that comprises a single instance of each data value that is stored within the first data field among the data records within the corresponding data cell, wherein the single instances of data values within the unique values vector within each cell index are sorted by value;

in response to the receipt of the query instructions, compare the at least one data value of the search criteria to at least one of the single instances of data values within the unique values vector within each cell index to determine whether the first super cell includes at least one data cell that meets the specified search criteria; and condition the performance of the operations of the specified search for each data cell within the first super cell on a determination that the first super cell does include at least one data cell that meets the specified search criteria.

10. The apparatus of claim 1, wherein the processor is caused to perform operations comprising:

receive, at the first node device, the first super cell from a data file maintained by at least one data device;

index, at the first node device, and at least partially in parallel with other node devices of the multiple node devices, the multiple data records within each data cell of the multiple data cells by the first data field of the set of fields in a single read pass through each data cell of the multiple data cells, wherein for each data record within the data cell, the processor is caused to:

retrieve a data value from the first data field;

determine, based on the data value retrieved from the first data field, whether the first data field of the data record stores a unique data value that has not yet retrieved by the processor from the first data field of any data record of the data cell; and in response to a determination that the first data field of the data record stores a unique data value, add an identifier of the data record to the first unique values index, wherein identifiers of data records within the first unique values index are ordered into a vector of identifiers based on an ordering of the corresponding unique data values in the first data field that is selected to enable use of the first unique values index to perform the search of the data records of the data cell; and generate, within a super cell index corresponding to the super cell, an indication of a range of the data values of the first data field within the data records of the data cell to enable use of the super cell index to determine whether the at least one data value of the search criteria is are present within the first data field of any data record of the data cell.

11. A computer-program product tangibly embodied in a non-transitory machine-readable storage medium, the computer-program product including instructions operable to cause a processor of a first node device of multiple node devices to perform operations comprising:

store, at the first node device, a first super cell of multiple super cells into which a data set is divided from a data file maintained by at least one data device, wherein:

the multiple super cells are distributed among the multiple node devices;

each super cell comprises multiple data cells;

each data cell of the multiple data cells comprises multiple data records; and each data record of the multiple data records comprises a set of fields at which data values of the data set are stored;

store, for each data cell within the first super cell, a cell index that corresponds to the data cell, wherein the cell index comprises:

an indication of a range of values stored within a first data field of the set of fields among the data records within the data cell; and a first unique values index that corresponds to the first data field, wherein for each data value that is stored within the first data field among the data records within the data cell, the first unique values index includes an identifier of a single data record within the data cell in which the data value is stored within the first data field;

receive, at the first node device, from a control device, and at least partially in parallel with other node devices of the multiple node devices, query instructions specifying search criteria of a search to be performed of the data set for data records that meet the specified search criteria, wherein the search criteria comprises at least one data value to be searched for within the first data field;

in response to the receipt of the query instructions, and for each data cell within the first super cell, the processor is caused to perform operations of the specified search, the operations comprising:

compare the specified data value to the range of values indicated in the corresponding cell index to determine whether the data cell includes at least one data record that meets the specified search criteria; and in response to a determination that the data cell includes at least one data record that meets the specified search criteria, use at least the first unique values index to perform a search of the data records of the data cell to identify one or more data records that meet the search criteria; and in response to identifying at least one data record that meets the specified search criteria, the processor is caused to perform operations comprising:

generate results data indicative of the first super cell including at least one data record that meets the specified search criteria; and provide the results data to the control device.

12. The computer-program product of claim 11, wherein:

the multiple data cells of the first super cell comprises a first data cell and a second data cell;

the processor is caused to perform the specified search within the first data cell on a first thread of execution; and the processor is caused to perform the specified search within the second data cell on a second thread of execution.

13. The computer-program product of claim 12, wherein the processor is caused to allocate a separate processor core of the processor to each of the first and second threads of execution.

14. The computer-program product of claim 11, wherein:

a cell index corresponding to a data cell of the first super cell comprises a first set of duplicate value indexes, wherein for at least one data value that is stored within the first data field of a data record identified in the first unique values index, a duplicate value index of the first set of duplicate value indexes includes at least one identifier of an additional data record within the data cell in which the data value is also stored within the first data field; and the processor is caused, in response to identifying at least one data record within the data cell that meets the specified search criteria, to perform operations comprising:

search within the first set of duplicate value indexes for a duplicate value index that identifies one or more additional data records of the data cell that also meet the specified search criteria; and generate the results data to be indicative of the one or more additional data records.

15. The computer-program product of claim 14, wherein:

the cell index comprises a second unique values index that corresponds to a second data field of the set of fields within the data records of the data cell;

for each data value that is stored within the second data field among the data records within the data cell, the second unique values index includes an identifier of a single data record within the data cell in which the data value is stored within the second data field;

the cell index comprises a second set of duplicate value indexes, wherein for at least one data value that is stored within the second data field of a data record identified in the second unique values index, a duplicate value index of the second set of duplicate value indexes includes at least one identifier of an additional data record within the data cell in which the data value is also stored within the first data field;

the first unique values index comprises a count of identifiers of data records included in the first unique values index;

the second unique values index comprises a count of identifiers of data records included in the second unique values index;

each duplicate value index within the first set of duplicate value indexes comprises a count of identifiers of data records included in the duplicate value index;

each duplicate value index within the second set of duplicate value indexes comprises a count of identifiers of data records included in the duplicate value index;

the search criteria comprises at least one data value that to be searched for within the second data field; and the processor is caused to perform operations comprising:

analyze the count of identifiers of data records within the first unique values index, the second unique values index, each duplicate value index within the first set of duplicate value indexes and each duplicate value index within the second set of duplicate value indexes to determine relative degrees of cardinality of the data values of the first data field and the second data field; and determine whether to begin the performance of the specified search of the data records within the data cell with the first unique values index or the second unique values index based on the relative degrees of cardinality of the data values of the first data field and the second data field.

16. The computer-program product of claim 11, wherein the processor is caused to perform operations comprising:

parse the query instructions to determine whether the query instructions include task instructions for the performance of a task with data retrieved from one or more data records identified as meeting the search criteria; and in response to a determination that the query instructions do include task instructions for the performance of a task, perform operations comprising:

execute the instructions to perform the task at least partially in parallel with at least one other node device of the multiple node devices; and generate the results data to include results of the performance of the task as the indication that the super cell includes at least one data record that meets the specified search criteria.

17. The computer-program product of claim 11, wherein the processor is caused to perform operations comprising:

store, at the first node device, a first super cell index corresponding to the first super cell, wherein the first super cell index comprises an indication of a range of values stored within the first data field within the multiple data cells of the first super cell;

in response to the receipt of the query instructions, compare the at least one data value of the search criteria to the range of values indicated in the first super cell index to determine whether the first super cell includes at least one data record within at least one data cell of the first super cell that meets the specified search criteria; and condition the performance of the operations of the specified search for each data cell within the first super cell on a determination that the first super cell does include at least one data record within at least one data cell of the first super cell that meets the specified search criteria.

18. The computer-program product of claim 17, comprising a controller, the controller comprises a controller processor and a controller storage to store other instructions that, when executed by the controller processor, cause the controller processor to perform operations to serve as the control device, the operations comprising:

receive, at the first node device and from a second node device of the multiple node devices, a second super cell index corresponding to a second super cell stored by the second node device, wherein the second super cell index comprises an indication of a range of values stored within the first data field within the at least one data cell of the second super cell;

in response to the receipt of the query instructions, compare the data value to the range of values indicated in the second super cell index to determine whether the second super cell includes at least one data record within at least one data cell of the second super cell that meets the specified search criteria; and in response to a determination that the second super cell includes at least one data record that meets the specified search criteria, transmit the query instructions to the second node device to enable the second node device to perform the specified search within the at least one data cell of the second super cell.

19. The computer-program product of claim 11, wherein the processor is caused to perform operations comprising:
store, within each cell index corresponding to a data cell of the multiple data cells within the first super cell, a unique values vector that comprises a single instance of each data value that is stored within the first data field among the data records within the corresponding data cell, wherein the single instances of data values within the unique values vector within each cell index are sorted by value;
in response to the receipt of the query instructions, compare the at least one data value of the search criteria to at least one of the single instances of data values within the unique values vector within each cell index to determine whether the first super cell includes at least one data cell that meets the specified search criteria; and
condition the performance of the operations of the specified search for each data cell within the first super cell on a determination that the first super cell does include at least one data cell that meets the specified search criteria.

20. The computer-program product of claim 11, wherein the processor is caused to perform operations comprising:
receive, at the first node device, the first super cell from a data file maintained by at least one data device;
index, at the first node device, and at least partially in parallel with other node devices of the multiple node devices, the multiple data records within each data cell of the multiple data cells by the first data field of the set of fields in a single read pass through each data cell of the multiple data cells, wherein for each data record within the data cell, the processor is caused to:
retrieve a data value from the first data field;
determine, based on the data value retrieved from the first data field, whether the first data field of the data record stores a unique data value that has not yet retrieved by the processor from the first data field of any data record of the data cell; and
in response to a determination that the first data field of the data record stores a unique data value, add an identifier of the data record to the first unique values index, wherein identifiers of data records within the first unique values index are ordered into a vector of identifiers based on an ordering of the corresponding unique data values in the first data field that is selected to enable use of the first unique values index to perform the search of the data records of the data cell; and
generate, within a super cell index corresponding to the super cell, an indication of a range of the data values of the first data field within the data records of the data cell to enable use of the super cell index to determine whether the at least one data value of the search criteria is are present within the first data field of any data record of the data cell.

21. A computer-implemented method comprising:
storing, at a first node device of multiple node devices, a first super cell of multiple super cells into which a data set is divided from a data file maintained by at least one data device, wherein:
the multiple super cells are distributed among the multiple node devices;
each super cell comprises multiple data cells;
each data cell of the multiple data cells comprises multiple data records; and
each data record of the multiple data records comprises a set of fields at which data values of the data set are stored;
storing, for each data cell within the first super cell, a cell index that corresponds to the data cell, wherein the cell index comprises:
an indication of a range of values stored within a first data field of the set of fields among the data records within the data cell; and
a first unique values index that corresponds to the first data field, wherein for each data value that is stored within the first data field among the data records within the data cell, the first unique values index includes an identifier of a single data record within the data cell in which the data value is stored within the first data field;
receiving, at the first node device, from a control device, and at least partially in parallel with other node devices of the multiple node devices, query instructions specifying search criteria of a search to be performed of the data set for data records that meet the specified search criteria, wherein the search criteria comprises at least one data value to be searched for within the first data field;
in response to the receipt of the query instructions, and for each data cell within the first super cell, performing operations of the specified search, the operations comprising:
comparing the at least one data value of the search criteria to the range of values indicated in the corresponding cell index to determine whether the data cell includes at least one data record that meets the specified search criteria; and
in response to a determination that the data cell includes at least one data record that meets the specified search criteria, using at least the first unique values index to perform a search of the data records of the data cell to identify one or more data records that meet the search criteria; and
in response to identifying at least one data record that meets the specified search criteria, performing operations comprising:
generating results data indicative of the first super cell including at least one data record that meets the specified search criteria; and
providing the results data to the control device.

22. The computer-implemented method of claim 21, wherein:
the multiple data cells of the first super cell comprises a first data cell and a second data cell; and
the method comprises:
performing the specified search within the first data cell on a first thread of execution of a processor of the first node device; and
performing the specified search within the second data cell on a second thread of execution of the processor.

23. The computer-implemented method of claim 22, comprising allocating a separate processor core of the processor to each of the first and second threads of execution.

24. The computer-implemented method of claim 21, wherein:
a cell index corresponding to a data cell of the first super cell comprises a first set of duplicate value indexes, wherein for at least one data value that is stored within the first data field of a data record identified in the first unique values index, a duplicate value index within the first set of duplicate value indexes includes at least one identifier of an additional data record within the data cell in which the data value is also stored within the first data field; and the method comprises, in response to identifying at least one data record within the data cell that meets the specified search criteria, performing operations comprising:

searching within the first set of duplicate value indexes for a duplicate value index that identifies one or more additional data records of the data cell that also meet the specified search criteria; and generating the results data to be indicative of the one or more additional data records.

25. The computer-implemented method of claim 24, wherein:

the cell index comprises a second unique values index that corresponds to a second data field of the set of fields within the data records of the data cell;

for each data value that is stored within the second data field among the data records within the data cell, the second unique values index includes an identifier of a single data record within the data cell in which the data value is stored within the second data field;

the cell index comprises a second set of duplicate value indexes, wherein for at least one data value that is stored within the second data field of a data record identified in the second unique values index, a duplicate value index of the second set of duplicate value indexes includes at least one identifier of an additional data record within the data cell in which the data value is also stored within the first data field;

the first unique values index comprises a count of identifiers of data records included in the first unique values index;

the second unique values index comprises a count of identifiers of data records included in the second unique values index;

each duplicate value index within the first set of duplicate value indexes comprises a count of identifiers of data records included in the duplicate value index;

each duplicate value index within the second set of duplicate value indexes comprises a count of identifiers of data records included in the duplicate value index;

the search criteria comprises at least one data value that to be searched for within the second data field; and the method comprises:

analyzing the count of identifiers of data records within the first unique values index, the second unique values index, each duplicate value index within the first set of duplicate value indexes and each duplicate value index within the second set of duplicate value indexes to determine relative degrees of cardinality of the data values of the first data field and the second data field; and determining whether to begin the performance of the specified search of the data records within the data cell with the first unique values index or the second unique values index based on the relative degrees of cardinality of the data values of the first data field and the second data field.

26. The computer-implemented method of claim 21, comprising:

parsing the query instructions to determine whether the query instructions include task instructions for the performance of a task with data retrieved from one or more data records identified as meeting the search criteria; and in response to a determination that the query instructions do include task instructions for the performance of a task, performing operations comprising:

executing, at the first node device, the instructions to perform the task at least partially in parallel with at least one other node device of the multiple node devices; and generating the results data to include results of the performance of the task as the indication that the super cell includes at least one data record that meets the specified search criteria.

27. The computer-implemented method of claim 21, comprising:

storing, at the first node device, a first super cell index corresponding to the first super cell, wherein the first super cell index comprises an indication of a range of values stored within the first data field within the multiple data cells of the first super cell;

in response to the receipt of the query instructions, comparing the at least one data value of the search criteria to the range of values indicated in the first super cell index to determine whether the first super cell includes at least one data record within at least one data cell of the first super cell that meets the specified search criteria; and conditioning the performance of the operations of the specified search for each data cell within the first super cell on a determination that the first super cell does include at least one data record within at least one data cell of the first super cell that meets the specified search criteria.

28. The computer-implemented method of claim 27, wherein the first node device comprises a controller, the controller comprising a controller processor and a controller storage to store other instructions that, when executed by the controller processor, cause the controller processor to perform operations to serve as the control device, the operations comprising:

receiving, at the first node device and from a second node device of the multiple node devices, a second super cell index corresponding to a second super cell stored by the second node device, wherein the second super cell index comprises an indication of a range of values stored within the first data field within the at least one data cell of the second super cell;

in response to the receipt of the query instructions, comparing the at least one data value of the search criteria to the range of values indicated in the second super cell index to determine whether the second super cell includes at least one data record within at least one data cell of the second super cell that meets the specified search criteria; and in response to a determination that the second super cell includes at least one data record that meets the specified search criteria, transmitting the query instructions to the second node device to enable the second node device to perform the specified search within the at least one data cell of the second super cell.

29. The computer-implemented method of claim 21, comprising:

storing, within each cell index corresponding to a data cell of the multiple data cells within the first super cell, a unique values vector that comprises a single instance of each data value that is stored within the first data field among the data records within the corresponding data cell, wherein the single instances of data values within the unique values vector within each cell index are sorted by value;

in response to the receipt of the query instructions, comparing the at least one data value of the search criteria to at least one of the single instances of data values within the unique values vector within each cell index to determine whether the first super cell includes at least one data cell that meets the specified search criteria; and conditioning the performance of the operations of the specified search for each data cell within the first super cell on a determination that the first super cell does include at least one data cell that meets the specified search criteria.

30. The computer-implemented method of claim 21, comprising:

receiving, at the first node device, the first super cell from a data file maintained by at least one data device;

indexing, at the first node device, and at least partially in parallel with other node devices of the multiple node devices, the multiple data records within each data cell of the multiple data cells by the first data field of the set of fields in a single read pass through each data cell of the multiple data cells, wherein for each data record within the data cell, the method comprising:

retrieving a data value from the first data field;

determining, based on the data value retrieved from the first data field, whether the first data field of the data record stores a unique data value that has not yet retrieved by a processor of the first node device from the first data field of any data record of the data cell; and in response to a determination that the first data field of the data record stores a unique data value, adding an identifier of the data record to the first unique values index, wherein identifiers of data records within the first unique values index are ordered into a vector of identifiers based on an ordering of the corresponding unique data values in the first data field that is selected to enable use of the first unique values index to perform the search of the data records of the data cell; and generating, within a super cell index corresponding to the super cell, an indication of a range of the data values of the first data field within the data records of the data cell to enable use of the super cell index to determine whether the at least one data value of the search criteria is are present within the first data field of any data record of the data cell.

\* \* \* \* \*